United States Patent
Beshai

(10) Patent No.: US 8,295,698 B2
(45) Date of Patent: Oct. 23, 2012

(54) TIME-COHERENT GLOBAL NETWORK

(76) Inventor: Maged E Beshai, Maberly (CA)

(*) Notice: Subject to any disclaimer, the term of this patent is extended or adjusted under 35 U.S.C. 154(b) by 441 days.

(21) Appl. No.: 12/548,466

(22) Filed: Aug. 27, 2009

(65) Prior Publication Data

US 2011/0052199 A1    Mar. 3, 2011

Related U.S. Application Data

(63) which is a continuation-in-part of application No. 12/119,377, filed on May 12, 2008, now Pat. No. 7,760,716.

(60) Provisional application No. 61/092,062, filed on Aug. 28, 2008.

(51) Int. Cl.
*H04J 14/02* (2006.01)
*H04J 14/00* (2006.01)
*H04L 12/50* (2006.01)
*H04Q 11/00* (2006.01)

(52) U.S. Cl. .......... 398/47; 398/45; 398/79; 398/82; 398/51; 398/70; 370/386; 370/387; 370/360; 370/465

(58) Field of Classification Search ............ 398/45, 398/47
See application file for complete search history.

(56) References Cited

U.S. PATENT DOCUMENTS

| | | | |
|---|---|---|---|
| 5,544,168 A | 8/1996 | Jeffrey et al. | |
| 6,486,983 B1 | 11/2002 | Beshai et al. | |
| 6,611,519 B1 | 8/2003 | Howe | |
| 6,907,002 B2 | 6/2005 | Beshai et al. | |
| 6,920,131 B2 | 7/2005 | Beshai | |
| 6,922,501 B2 | 7/2005 | Beshai et al. | |
| 7,082,132 B1 | 7/2006 | Beshai et al. | |
| 7,117,257 B2 | 10/2006 | Beshai | |
| 7,154,887 B2 | 12/2006 | Wu | |
| 7,230,952 B2 | 6/2007 | Beshai | |
| 7,324,510 B2 | 1/2008 | Howe | |
| 7,366,412 B2 | 4/2008 | Beshai | |
| 7,394,806 B2 | 7/2008 | Beshai et al. | |
| 7,394,983 B2 * | 7/2008 | Lee et al. | 398/45 |
| 7,590,110 B2 | 9/2009 | Beshai et al. | |
| 7,602,771 B1 | 10/2009 | Beshai | |
| 7,817,627 B2 | 10/2010 | Beshai | |
| 8,050,257 B2 | 11/2011 | Beshai | |
| 8,064,341 B2 | 11/2011 | Beshai | |
| 2002/0163693 A1 * | 11/2002 | Rubissa et al. | 359/128 |
| 2004/0165887 A1 * | 8/2004 | Beshai | 398/42 |
| 2008/0075071 A1 * | 3/2008 | Beshai | 370/386 |

* cited by examiner

*Primary Examiner* — Shi K Li
*Assistant Examiner* — Oommen Jacob

(57) ABSTRACT

A network of global coverage, scalable to hundreds of petabits per second, comprises bufferless switch units each of dimension n×n, n>1, arranged in a matrix of ν columns and ν rows, ν>1, interconnecting a maximum of ν×n edge nodes. Each edge node has ν upstream channels to ν switch units in ν different columns and ν downstream channels from ν switch units in ν different rows. All upstream channels to a switch unit are time-locked to the switch unit, thus enabling coherent switching at the switch unit.

The switch units are preferably fast-switching optical nodes. Alternatively, the switch units may comprise fast-switching optical nodes each of dimension m×m, arranged in a first μ×μ matrix, and latent space switches each of dimension n×n, n>1, arranged in a second ν×ν matrix, ν>1, where μ×m=ν×n. An edge node time locks to each optical node and each latent space switch to which it connects.

25 Claims, 59 Drawing Sheets

| Switch Configuration | 3300 FIG. 33 (state 0) | 3300 FIG. 33 (state 1) |
|---|---|---|
| Static connection from switch elements to rotator | Ordinary | Transposed |
| Static connection from rotator to switch elements | Transposed | Ordinary |
| Index of rotator inlet { To Intermediate switch element | $j$ | $L - j$ |
| Index of rotator outlet { | $\{j + t_1\}$ Modulo $N$ | $\{L - j + t_1\}$ Modulo $N$ |
| Index of transit switch element | $L - (j + t_1)$ | $L - j + t_1$ |
| Index of rotator inlet { From Intermediate switch element | $L - (j + t_1)$ | $j - t_1$ |
| Index of rotator outlet { | $L - k$ | $k$ |
| Transit time $t_2$ | $\{j - k + t_1\}_{\text{modulo } N}$ | $\{k - j + t_1\}_{\text{modulo } N}$ |
| Transit delay ($t_2 - t_1$) | $\{j - k\}_{\text{modulo } N}$ | $\{k - j\}_{\text{modulo } N}$ |

*FIG. 37*

| Switch Configuration | 4120, 4320, 4520 Figures 41, 43, 45 | 4220, 4420, 4620 Figures 42, 44, 46 |
|---|---|---|
| Static connection from first rotator to transit-memory devices | Transposed | Direct |
| Static connection from transit-memory devices to second rotator | Direct | Transposed |
| Index of first-rotator inlet | $j$ | $j$ |
| Index of first-rotator outlet | $j+t_1$ | $j+t_1$ |
| Index of transit-memory device | $L-(j+t_1)$ $modulo\ N$ | $L-j-t_1$ $modulo\ N$ |
| Index of second-rotator inlet | $L-(j+t_1)$ | $k$ |
| Index of second-rotator outlet | $k$ | $\{j+k-L+t_1\}_{modulo\ N}$ |
| Transit time $t_2$ | $\{j+k-L+t_1\}_{modulo\ N}$ | $\{j+k-L+t_1\}_{modulo\ N}$ |
| Transit delay $(t_2-t_1)$ | $\{j+k-L\}_{modulo\ N}$ | $\{j+k-L\}_{modulo\ N}$ |

FIG. 47

| Switch Configuration | 4800 FIG. 48 | 5000, 52000 FIG. 50, FIG. 52 |
|---|---|---|
| Static connection from transit-memory devices to rotator | Transposed | Ordinary |
| Static connection from rotator to transit-memory devices | Ordinary | Transposed |
| Index of rotator inlet — State(0) | $j$ | $j$ |
| Index of rotator outlet — State(0) | $j+t_1$ | $j+t_1$ |
| Index of transit-memory device | $j+t_1$ | $L-(j+t_1)$ |
| Index of rotator inlet — State(1) | $L-(j+t_1)$ | $L-(j+t_1)$ |
| Index of rotator outlet — State(1) | $k$ | $k$ |
| Transit time $t_2$ | $\{j+k-L+t_1\}_{modulo\ N}$ | $\{j+k-L+t_1\}_{modulo\ N}$ |
| Transit delay $(t_2-t_1)$ | $\{j+k-L\}_{modulo\ N}$ | $\{j+k-L\}_{modulo\ N}$ |

FIG. 55

| Switch Configuration | 4800<br>FIG. 48<br>(transposed output) | 5000, 52000<br>FIG. 50, FIG. 52<br>(transposed output) |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $j + t_1$ | $j + t_1$ |
| Index of transit-memory device | $\{j + t_1\}_{modulo\ N}$ | $L - (j + t_1)$ |
| Index of rotator inlet $\Big\}$ State(1) | $L - (j + t_1)$ | $L - (j + t_1)$ |
| Index of rotator outlet | $\boxed{L - k}$ | $\boxed{L - k}$ |
| Transit time $t_2$ | $\{j - k + t_1\}_{modulo\ N}$ | $\{j - k + t_1\}_{modulo\ N}$ |
| Transit delay ($t_2 - t_1$) | $\{j - k\}_{modulo\ N}$ | $\{j - k\}_{modulo\ N}$ |

*FIG. 56*

TIME-COHERENT GLOBAL NETWORK

CROSS-REFERENCE TO RELATED APPLICATIONS

The present application claims the benefit of provisional application 61/092,062 filed on Aug. 27, 2008, the content of which is incorporated herein by reference, and is a continuation in part of U.S. patent application Ser. No. 12/119,377, filed May 12, 2008₁ issued as U.S. Pat. No. 7,760,716 B2.

FIELD OF THE INVENTION

The present invention relates to high-capacity networks employing fast-switching bufferless core nodes.

BACKGROUND

Present wide-coverage data networks are generally multi-hop networks of large diameter where a path from one edge node to another may traverse several intermediate nodes. Such networks employ routers of moderate dimensions and have performance challenges. A multi-hop packet-switching network suffers from cumulative performance degradation as a path from source to destination traverses numerous routing nodes. It is well known that structural simplicity reduces network cost and improves its performance. In order to facilitate the introduction of high-quality broadband services, the network structure need be simplified and the network diameter need be reduced. It is desirable that a path from one edge node to another traverse a small number of intermediate nodes. It is also desirable, given the dominance of fiber-optic transport, that modulated optical carrier signals received at a core node be switched towards its destination edge node without the need for extracting the baseband signals for switching in the electronic domain.

There is a need, therefore, for a high-capacity network of small diameter that employs fast-switching optical core nodes, and it may be argued that it is more efficient to create an entirely new global broadband network of high quality and relatively low cost.

SUMMARY

In accordance with one aspect, the present invention provides a network comprising a plurality of switch units and a plurality of edge nodes. The switch units are arranged in a matrix having ν columns and ν rows, ν>1. Each switch unit has n inlet ports and n outlet ports, n>1. Each edge node has ν input ports, ν output ports, a number of ingress ports, and a number of egress ports. The ingress ports receive data from data sources, and the egress ports transmit data to data sinks. Each output port has an upstream channel to a switch unit and each input port has a downstream channel from a switch unit. The ν output ports connect to ν switch units in ν different columns and the ν input ports connect to switch units in ν different rows.

Each switch unit has a switch-unit controller and a master time indicator. Each edge node has an edge controller and ν slave time indicators each slave time indicator associated with a respective one of the ν output ports. An edge controller of an edge node exchanges timing signals with each of the ν switch units to which the edge node has an upstream channel in order to time-lock each of the ν slave time indicators to a master time indicator of a respective switch unit.

In accordance with another aspect, the present invention provides a network comprising a plurality of edge nodes, a plurality of switch units, a plurality of upstream wavelength routers, and a plurality of downstream wavelength routers.

The switch units are arranged in a matrix having ν columns and ν rows, ν>1. Each upstream wavelength router connects a respective first set of wavelength-division-multiplexed links originating from a respective subset of the edge nodes to a respective second set of wavelength-division-multiplexed links terminating in a respective subset of the switch units. Each downstream wavelength router connects a respective third set of wavelength-division-multiplexed links originating from a respective subset of the switch units to a respective fourth set of wavelength-division-multiplexed links terminating in a respective subset of the edge nodes.

The upstream wavelength routers collectively connect each edge node to a respective set of ν switch units, one in each of the ν columns. The downstream wavelength routers collectively connect each edge node to a respective group of ν switch units, one in each of the ν rows. Preferably, the group of switch units belongs to a single column in the matrix.

The upstream wavelength routers are configured so that each wavelength-division-multiplexed link in the second set of wavelength-division-multiplexed links carries a wavelength channel from each wavelength-division-multiplexed link in the first set of wavelength-division-multiplexed links. The downstream wavelength routers are configured so that each wavelength-division-multiplexed link in the fourth set of wavelength-division-multiplexed links carries a wavelength channel from each wavelength-division-multiplexed link in the third set of wavelength-division-multiplexed links.

Each edge node comprises an edge controller and each switch unit comprises a switch-unit controller. Each switch unit has n inlet ports and n outlet ports, n>1. The switch units may comprise fast optical switches or single-rotator latent space switches. Each edge node time locks to respective ν switch units to which the edge node connects in the upstream direction. The plurality of edge nodes comprises at most ν×n edge nodes. For global coverage, the value of ν is preferably of the order of 1024 and the value of n is of the order of 64, leading to a network supporting some 65000 edge nodes.

In accordance with a further aspect, the present invention provides a network comprising a plurality of edge nodes, a first plurality of switch units arranged in a first matrix, and a second plurality of switch units arranged in a second matrix. The first matrix has μ columns and μ rows, and each switch unit in the first matrix has m inlet ports and m outlet ports, μ>1, and m>1. The second matrix has ν columns and ν rows, and each switch unit in the second matrix has n inlet ports and n outlet ports, ν>1, and n>1. The dimensions μ, m, ν, and n are selected so that ν×n=μ×m. Thus, the plurality of edge nodes comprises at most ν×n edge nodes.

Each edge node has μ upstream channels to μ switch units belonging to μ different columns of the first matrix and ν upstream channels to ν switch units belonging to ν different columns of the second matrix. Each edge node has μ downstream channels from a group of μ switch units belonging to μ different rows of the first matrix and ν downstream channels from a group of ν switch units belong to ν different rows of the second matrix. Preferably, the group of μ switch units belongs to a single column in the first matrix, and the group of ν switch units belongs to a single column in the second matrix. Preferably, a switch unit in the first matrix is configured as a single-rotator latent space switch, and a switch unit in the second matrix is configured as a fast optical switch. An edge node may be configured as a single-rotator circulating switch.

The network further comprises a plurality of upstream wavelength routers and a plurality of downstream wavelength routers.

Each upstream wavelength router connects a respective first set of wavelength-division-multiplexed links originating from a subset of the edge nodes to a respective second set of wavelength-division-multiplexed links terminating in a respective subset of the switch units selected from among the first plurality of switch units and the second plurality of switch units so that each edge node has $\mu$ upstream channels to $\mu$ switch units belonging to $\mu$ different columns of the first matrix and $\mu$ upstream channels to $\mu$ switch units belonging to $\mu$ different columns of the second matrix.

Each downstream wavelength router connects a respective third set of wavelength-division-multiplexed links originating from a subset of the switch units, selected from among the first plurality of switch units and the second plurality of switch units, to a respective fourth set of wavelength-division-multiplexed links terminating in a respective subset of the edge nodes so that each edge node has $\mu$ downstream channels from a group of $\mu$ switch units belonging to $\nu$ different rows of the first matrix, and $\mu$ downstream channels from a group of $\mu$ switch units belong to $\mu$ different rows of the second matrix.

An edge node has $\mu$ outbound ports connecting to switch units of the first matrix and $\nu$ outbound ports connecting to switch units of the second matrix. The edge node time locks each outbound port to a switch unit to which the outbound port connects through an upstream channel.

Preferably, the value of $\nu$ is of the order of 1024, the value of $\mu$ is of the order of 64, the value of n is of the order of 64, and the value of m is of the order of 1024, leading to a network supporting a number of edge nodes of the order of 65000, which is sufficient for global coverage.

In accordance with a further aspect, the present invention provides a uniphase single-rotator circulating switch. The switch comprises N switch elements and a single rotator having N inlets and N outlets, N>2. Inlet j of the rotator connects to outlet $\{j+t\}_{modulo\ N}$ during a time slot t of a time frame organized into N time slots, $0 \leq j < N$.

The N switch elements are indexed as switch elements 0 to (N−1), the N inlets are indexed as inlets 0 to (N−1), and the N outlets are indexed as outlets 0 to (N−1). Each inlet connects to a 2:1 receiving selector and each outlet connects to a 1:2 sending selector.

A switch element comprises two internal output ports, two internal input ports, an external input port for receiving data from external data sources, and an external output port for transmitting data to external data sinks. The two internal output ports of a switch element of index k, $0 \leq k < N$, alternately connect to inlet k of the single rotator through a respective 2:1 receiving selector during each time slot of the time frame, and the two internal input ports alternately connect to outlet $\{L-k\}_{modulo\ N}$, $0 \leq L < N$, of the single rotator through a respective 1:2 sending selector during each time slot of the time frame.

The single-rotator circulating switch further comprises an edge controller and N element controllers each element controller coupled to a respective one of the N switch elements. A temporal multiplexer time-multiplexes control signals sent from the N element controllers to the edge controller and a temporal demultiplexer distributes control signals sent from the edge controller to the N element controllers.

In accordance with a further aspect, the present invention provides a two-phase single-rotator circulating switch. The switch comprises N switch elements and a single rotator having N rotator inlets and N rotator outlets, N>2. Rotator inlet p of the rotator connects to rotator outlet $\{p+t\}_{modulo\ N}$ during a time slot t of a time frame organized into N time slots, $0 \leq p < N$. Each rotator outlet alternately switches between two respective outlet ports during each time slot of the time frame and each rotator inlet alternately switches between two respective inlet ports during each time slot of a time frame organized into N time slots.

The N switch elements are indexed as switch elements 0 to (N−1), the N inlets are indexed as inlets 0 to (N−1), and the N outlets are indexed as outlets 0 to (N−1).

A switch element comprises two internal input ports, two internal output ports, an external input port for receiving data from external data sources, and an external output port for transmitting data to external data sinks. The two internal output ports alternately connect to an inlet port of rotator inlet j and an inlet port of rotator inlet $\{L-j\}_{modulo\ N}$, $0 \leq L < N$. The two internal input ports of a switch element of index j alternately connect to an outlet port of rotator outlet $\{L-j\}_{modulo\ N}$, $0 \leq j < N$, and an outlet port of rotator outlet j.

The two-phase single-rotator circulating switch further comprises an edge controller, for scheduling data transfer among the N switch elements, and N element controllers each element controller coupled to a respective one of the N switch elements. A temporal multiplexer time-multiplexes control signals sent from the N element controllers to the edge controller and a temporal demultiplexer distributes control signals sent from the edge controller to the N element controllers.

The two-phase single-rotator circulating switch provides two paths of different delays from a switch element j to a switch element k, $0 \leq j < N$, $0 \leq k < N$, $k \neq j$. Upon receiving a request to establish a connection from switch element j to switch element k, the edge controller determines a value of $\{j-k\}_{modulo\ N}$ and if the value is less than the integer part of (N+1)/2, the edge controller allocates paths for the connection through the internal port connecting to rotator inlet j. Otherwise, the edge controller allocates paths for the connection through the internal port connecting to rotator inlet $\{L-j\}_{modulo\ N}$.

The two-phase single-rotator circulating switch further comprises an edge time indicator coupled to the edge controller and N slave time indicators each coupled to an element controller of a switch element among the N switch elements.

The edge controller sends a first reading of the edge time indicator to an external controller of an external node communicatively coupled to a specific switch element and receives a corresponding second reading of a time indicator coupled to the external controller. The edge controller resets a slave time indicator of the specific switch element according to the first reading and the second reading.

In accordance with a further aspect, the present invention provides a two-phase single-rotator circulating switch. The switch comprises a single rotator having N rotator inlets and N rotator outlets, and (N−1) switch elements, N>2. Rotator inlet p of the rotator connects to rotator outlet $\{p+t\}_{modulo\ N}$ during a time slot t of a time frame organized into N time slots, $0 \leq p < N$. Each rotator outlet alternately switches between two respective outlet ports during each time slot of the time frame and each rotator inlet alternately switches between two respective inlet ports during each time slot of a time frame organized into N time slots.

The N inlets are indexed as inlets 0 to (N−1), the N outlets are indexed as outlets 0 to (N−1), and the (N−1) switch elements are indexed as switch elements 0 to (N−2).

A switch element comprises two internal input ports, two internal output ports, an external input port for receiving data from external data sources, and an external output port for transmitting data to external data sinks. The two internal output ports alternately connect to an inlet port of rotator inlet j and an inlet port of rotator inlet $\{L-j\}_{modulo\ N}$, $0 \leq L < N$. The two internal input ports of a switch element of index j alternately connect to an outlet port of rotator outlet $\{L-j\}_{modulo\ N}$, $0 \leq j < N$, and an outlet port of rotator outlet j.

An edge controller connects to an outlet port of rotator outlet 0, an outlet port of rotator outlet L, $0 \leq L < N$, an inlet port of rotator inlet L, and an inlet port of rotator inlet 0. Each of the (N-1) switch elements has an element controller.

BRIEF DESCRIPTION OF THE DRAWINGS

Embodiments of the present invention will be further described with reference to the accompanying exemplary drawings, in which:

FIG. 37 tabulates data-transfer timing of the two-phase single-rotator circulating switch of FIG. 33;

FIG. 47 tabulates data-transfer timing of a latent space switch of the type illustrated in FIG. 41 to FIG. 46, with an arbitrary number of switch elements and an arbitrary value of the order of transposed connections, in accordance with an embodiment of the present invention;

FIG. 55 tabulates data-transfer timing of a single-rotator latent space switch of the type illustrated in FIG. 48, FIG. 50, and FIG. 52, with an arbitrary number of switch elements and an arbitrary value of the order of transposed connections, in accordance with an embodiment of the present invention;

FIG. 56 tabulates data-transfer timing of a single-rotator latent space switch of the type illustrated in FIG. 48, FIG. 50, and FIG. 52, with an arbitrary number of switch elements and an arbitrary value of the order of transposed connections, with transposed connections from the outlets of the single rotator to the output ports of the single-rotator latent space switch, in accordance with an embodiment of the present invention;

DETAILED DESCRIPTION

Terminology

Figure 1:
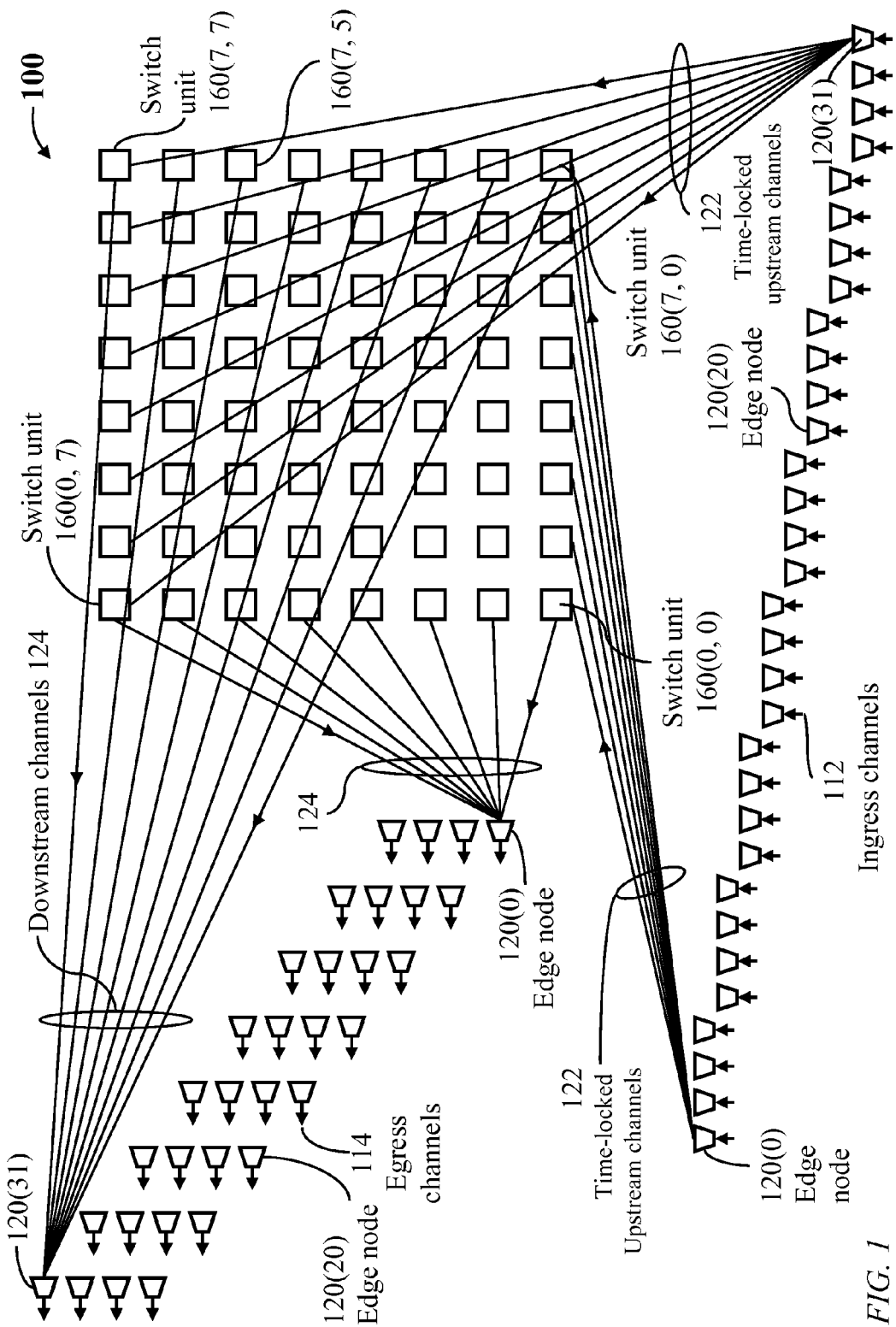
FIG. 1 illustrates a time-coherent network comprising edge nodes interconnected through independent switch units arranged in a matrix where each edge node has upstream communication channels to switch units of a row and downstream communication channels from switch units of a column, in accordance with an embodiment of the present invention.

Time-Coherent switching: A process of switching signals from any bufferless input port of a switch unit having bufferless input ports to any of output ports of the switch unit is a time-coherent switching process. The signals may originate from geographically distributed sources and each source controls the timing of signal transmission so that a transmitted signal arrives at the switch unit at an instant of time dictated by a controller of the switch unit. A source need not be aware of the magnitude of the propagation delay along the path to the switch unit. The control of the switch unit dictates the time at which signals are transmitted from respective distributed sources.

Time-coherent network: A network having a set of switch units, each switch unit in the set having bufferless input ports and enforcing time-coherent switching is herein referenced as a time-coherent network.

Edge node: A switching node connecting data sources and data sinks to external switching nodes is referenced as an edge node. An edge node may also switch data directly from a data source to a data sink.

Switch unit: A switching node having bufferless input ports receiving signals from a first group of edge nodes and output ports transmitting signals to a second group of edge nodes is hereinafter referenced as a switch unit. A switch unit may be implemented as a fast optical switch or an electronic space switch. The electronic space switch may have internal memory devices.

Upstream direction: The direction of signal flow from an edge node towards a switch unit is referenced as the upstream direction.

Downstream direction: The direction of signal flow from a switch unit towards an edge node is referenced as the downstream direction.

Master controller: A controller coupled to a switch unit is herein called a master controller. A master controller of a switch unit dictates the timing of transmission of signals from subtending edge nodes, hence the classification as a master controller.

Edge controller: A controller coupled to an edge node is herein referenced as an edge controller. An edge controller communicates with master controllers of switch units to which the edge node connects. The edge controller also communicates with element controllers associated with switch elements of the edge node.

Master time indicator: A time indicator coupled to a master controller of a switch unit is herein referenced as a master time indicator. The master time indicator may be implemented as a cyclic c-bit-wide clock-driven time counter which resets to zero every $2^c$ clock intervals. The duration of a cycle of the time counter exceeds the propagation delay between any edge node and a switch unit to which the edge node connects. The master time indicators of all switch units in a time-coherent network are functionally identical.

Edge time indicator: A time indicator coupled to an edge controller is herein referenced as an edge time indicator. An edge time indicator is functionally identical to a master time indicator.

Time locking: A process of adjusting sending times of signals from each outbound port of an edge node to a switch unit to which the each outbound port connects is a time-locking process.

Time-locked channel: A channel from an edge node to a switch unit, where the edge node is time-locked to the switch unit, is herein called a time-locked channel.

Network Structure

FIG. 1 illustrates a time-coherent network 100 comprising edge nodes, collectively referenced as 120 and individually identified as 120(0), 120(1), . . . , 120(Q−1) and switch units, collectively referenced as 160, logically arranged in a matrix having ν rows and ν columns. The rows of the matrix are indexed as row 0 to row (ν−1), where row 0 is the bottom row and row (ν−1) is the top row. The columns are indexed as column 0 to column (ν−1), where column 0 is the leftmost column and column (ν−1) is the rightmost column; ν=8 in the exemplary network of FIG. 1. The switch units 160 are individually identified as 160(j, k), j being a column identifier and k a row identifier in the matrix. An edge node 120 has a number of ingress channels 112 for receiving data from data sources, a number of egress channels 114 for transmitting data to data sinks. An edge node 120 has a number κ≧ν of upstream channels 122 connecting the edge node to ν switch units 160, and a number κ of downstream channels 124 connecting ν switch units 160 to the edge node. The κ upstream channels 122 connect the edge node to a switch unit 160 in each of the ν columns. The downstream channels 124 connect ν switch units, one from each of the ν rows, to the edge node. Preferably κ=ν so that an edge node has one upstream channel 122 to each of ν switch units 160 of different columns and one downstream channels from ν switch units 160 of different rows. To simplify addressing and routing, the κ downstream channels leading to the edge node originate from switch units belonging to one column.

An edge node 120 comprises a source node integrated with a sink node. For clarity, each edge node 120 is indicated in FIG. 1 as a source-node side having upstream channels 122 and a sink-node side connecting to downstream channels 124. It is understood, however, that a source-node side and a corresponding sink-node side, though illustrated as separate entities, together constitute one of the edge nodes 120. Each edge node 120 comprises an integrated switch fabric to switch data from any ingress channel 112 or any downstream channel 124 to any egress channel 114 or any upstream channel 122. An edge node 120 has ingress ports for receiving data from data sources, egress ports for transmitting data to data sinks, inbound ports for receiving signals from respective switch units 160 through downstream channels 124, and outbound ports for transmitting signals to respective switch units 160 through upstream channels 122.

In the network configuration of FIG. 1, edge node 120(0) has eight upstream channels 122 to eight switch units 160(0, 0) to 160(7,0) of row 0. Edge node 120(31) has eight upstream channels 122 to eight switch units 160(0, 7) to 160(7,7) of row 7. Edge node 120(0) has downstream channels 124 from eight switch units 160(0,0) to 160(0,7) of column 0. Edge node 120(31) has downstream channels 124 from eight switch units 160(7,0) to 160(7,7) of column 7.

Figure 2:
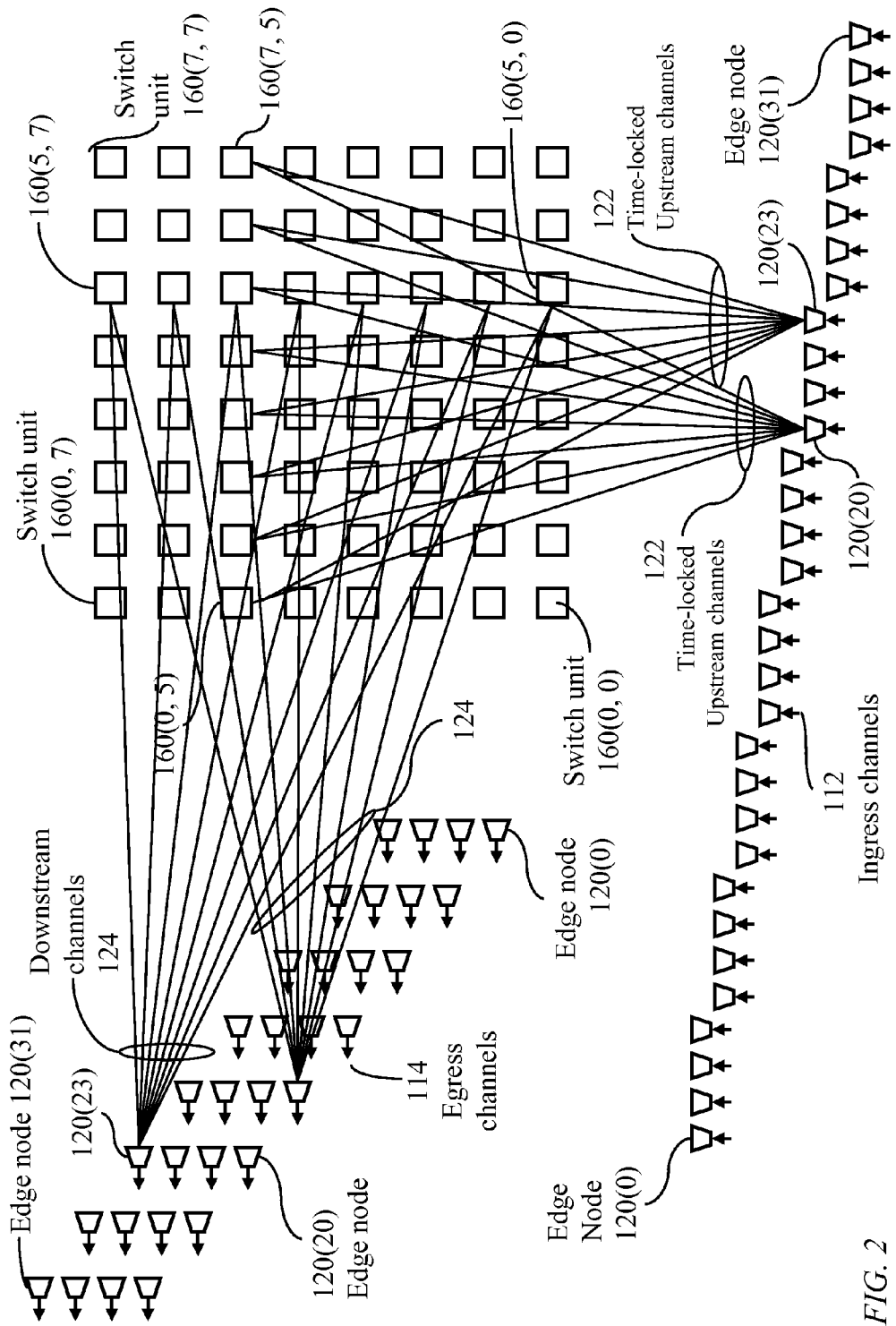
FIG. 2 further illustrates edge-node connections to switch units in the time-coherent network of FIG. 1.

FIG. 2 illustrates the connectivity of a set of edge nodes {120(20), . . . , 120(23)} where each edge node in the set has eight upstream channels 122, one to each of eight switch units 160(0,5) to 160(7,5) and eight downstream channels 124, one from each of eight switch units 160(5,0) to 160(5,7).

Figure 3:
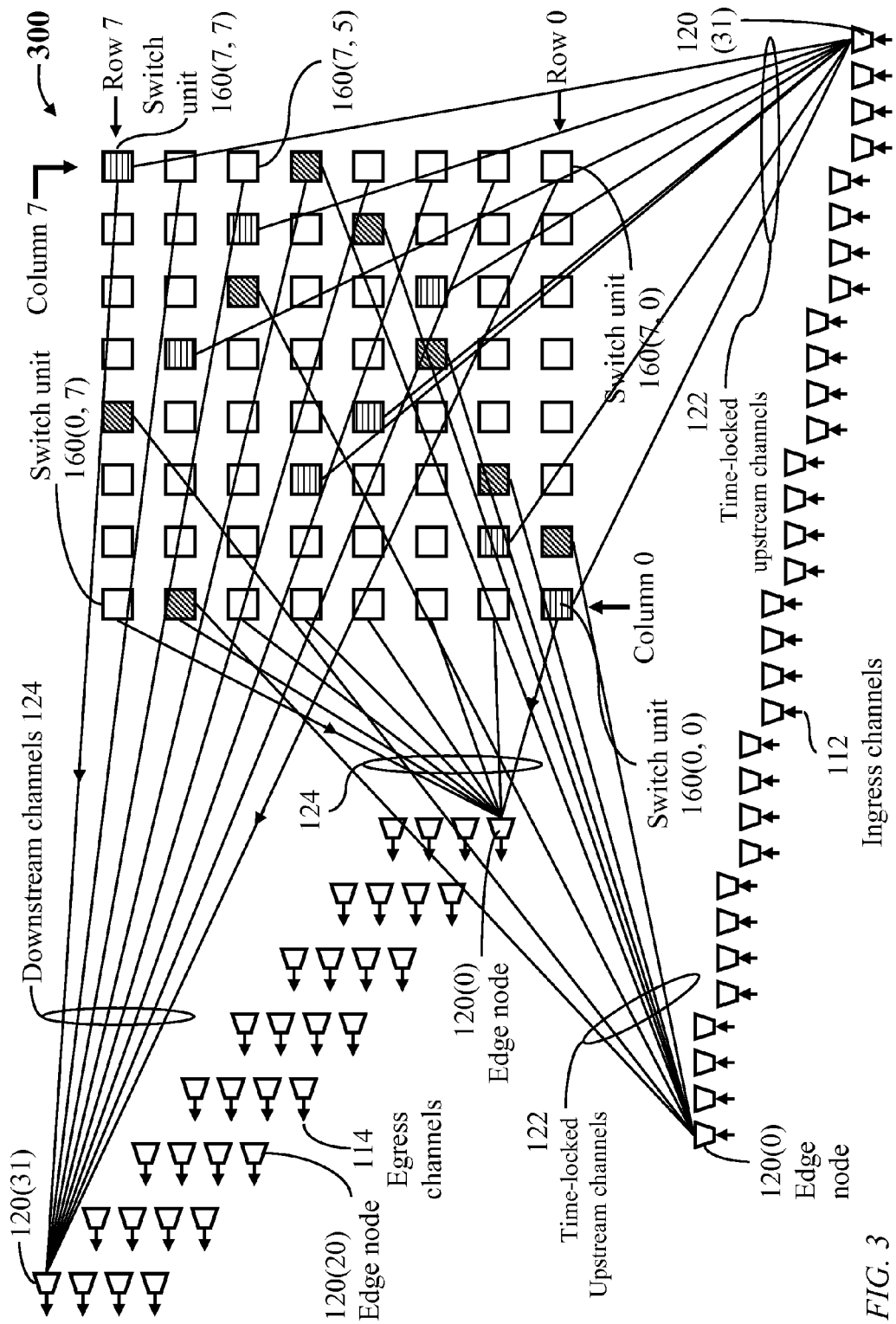
FIG. 3 illustrates a time-coherent network comprising edge nodes interconnected through independent switch units arranged in a matrix where each edge node has upstream communication channels to switch units in different columns and downstream communication channels from switch units of a column, in accordance with an embodiment of the present invention.

FIG. 3 illustrates a time-coherent network 300 having a configuration similar to that of the time-coherent network 100 of FIG. 1 except that each of edge nodes 120 has time-locked upstream channels 122 to switch units 160 of different rows and different columns of the matrix of switch units instead of time-locked upstream channels 122 to switch units 160 of a single row. The downstream connectivity from switch units 160 to the edge nodes 120 is the same as that of network 100 of FIG. 1. In the exemplary configuration of FIG. 3, edge node 120(0) has eight upstream channels 122 to eight switch units 160(0,6), 160(1,0), 160(2,1), 160(3,7), 160(4,2), 160(5,5), 160(6,3) and 160(7,4). Edge node 120(31) has eight upstream channels 122 to eight switch units 160(0,0), 160(1,1), 160(2, 4), 160(3,3), 160(4,6), 160(5,2), 160(6,5), and 160(7,7). The downstream connectivity of edge nodes 120(0) and 120(31) is identical to that of FIG. 1.

A major advantage of the network configuration of FIG. 1 or FIG. 3 is that each edge node 120 has a simple path to each other edge node 120 traversing a single switch unit 160. This greatly simplifies signaling, connection setup, and connection tracking. Several compound paths may be established between a source edge node and a destination edge node. A compound path comprises two simple paths joined at an intermediate edge node 120. There are (2ν−2) compound paths from any edge node 120(j) to any other edge node 120(k), j≠k. However, the (2ν−2) compound paths include partly overlapping paths. Each edge node has ν upstream channels and ν downstream channels. Therefore, a maximum of (ν−1) non-overlapping compound paths may be established from any edge-node to any other edge node.

Figure 4:
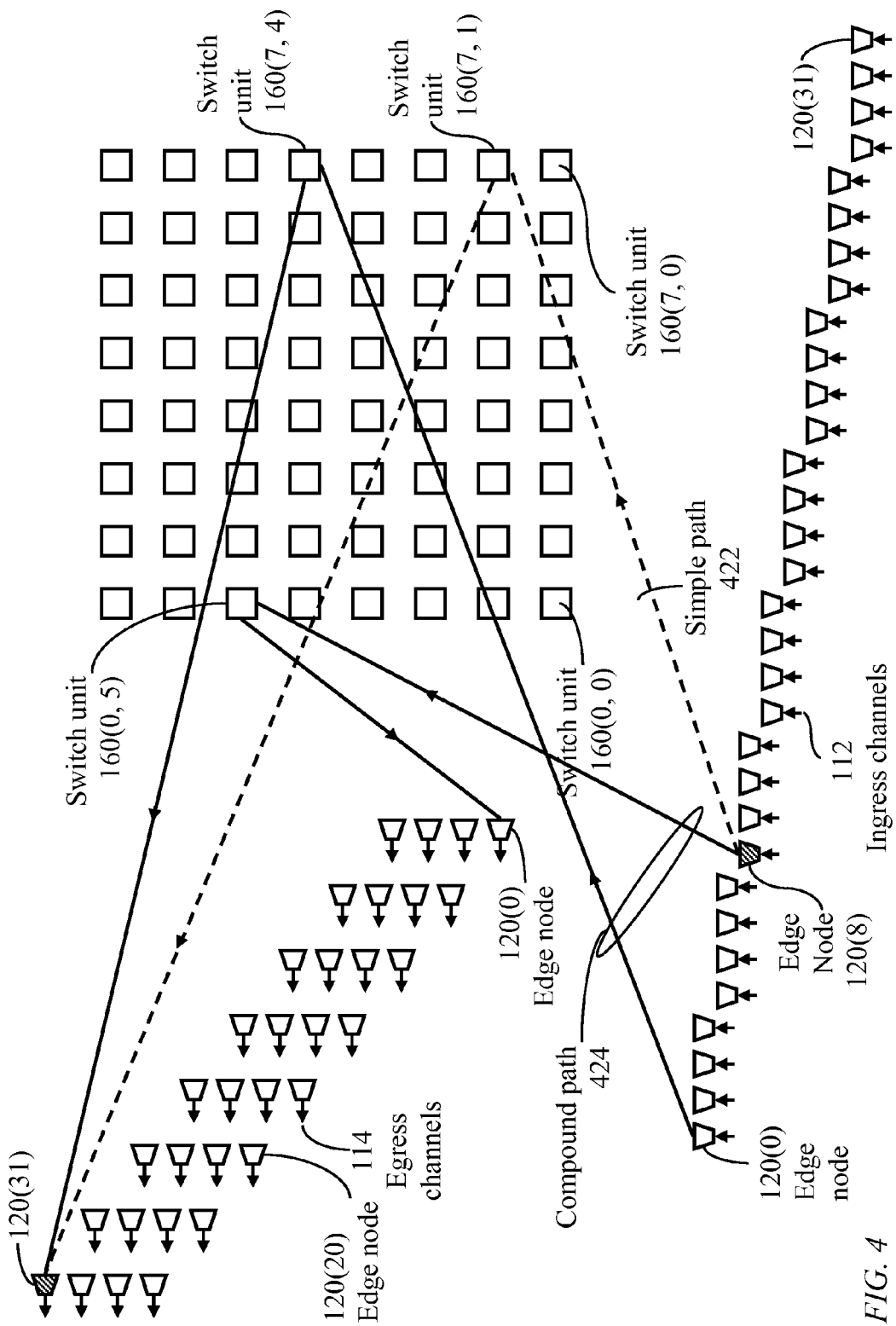
FIG. 4 illustrates a simple connection and a compound connection in the network of FIG. 3 in accordance with an embodiment of the present invention.

FIG. 4 illustrates a simple path 422 from an originating edge node 120(8) to a destination edge node 120(31) traversing switch unit 160(7,1). An exemplary compound path 424 from originating edge node 120(8) to destination edge node 120(31) is illustrated. Compound path 424 traverses switch unit 160(0,5), intermediate edge node 120(0), and switch unit 160(7,4).

The network of FIG. 1 or FIG. 3 comprises a single matrix of switch units 160 forming a single core plane. Preferably, the switch units 160 are fast optical switches. A fast optical switch may be limited to medium dimensions, 64×64 for example. It may be desirable, however, to provide a parallel core plane using electronic switch units. A single-rotator latent space switch, to be described below with reference to FIG. 48 to FIG. 54, has a simple structure and scales to relatively large dimensions; 1024×1024 for example.

Figure 5:
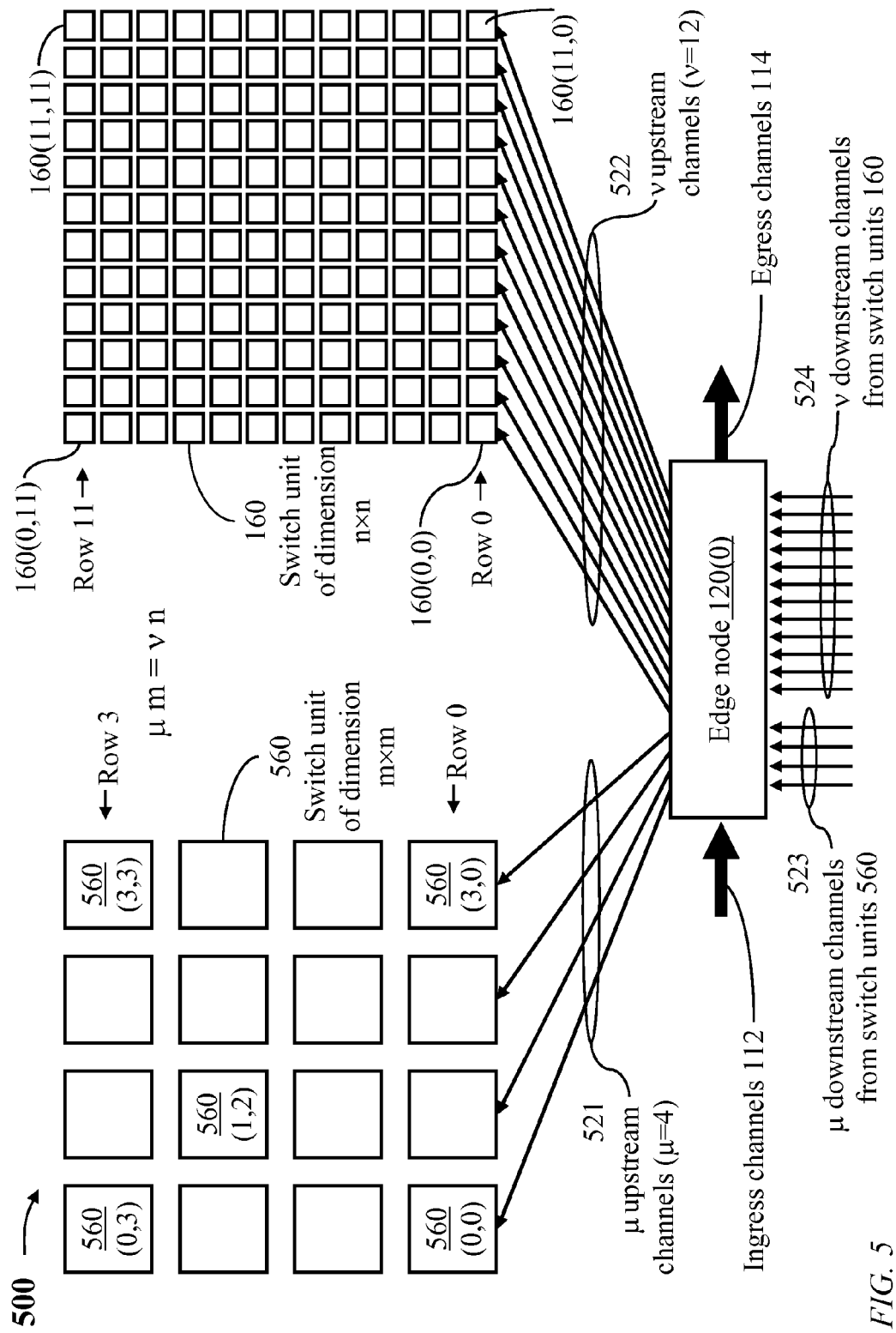
FIG. 5 illustrates a time-coherent network comprising edge nodes interconnected through a network core comprising a first matrix of electronic switch units, each switch unit having a first number of dual inlet-outlet ports, and a second matrix of photonic switch units, each switch unit having a second number of dual inlet-outlet ports, each edge node having time-locked upstream channels to switch units of a row of the first matrix and time-locked upstream channels to a row of the second matrix where the first number is an integer multiple of the second number, in accordance with an embodiment of the present invention.

FIG. 5 illustrates an edge node 120 having μ upstream channels 521 to μ switch units 560 each of dimension m×m (m=12) arranged in a first matrix of μ columns and μ rows (for the case of μ=4). The edge node also has ν upstream channels 522 to ν switch units 160 each of dimension n×n (n=4) arranged in a second matrix of ν columns and ν rows (for the case of ν=12). The edge node has μ downstream channels 523 from switch units 560 and ν downstream channels 424 from switch units 160. The edge node receives data from data sources through ingress channels 112 and transmits data to data sinks through egress channels 114. The total number of edge nodes is ν×n=μ×m=48.

Figure 6:
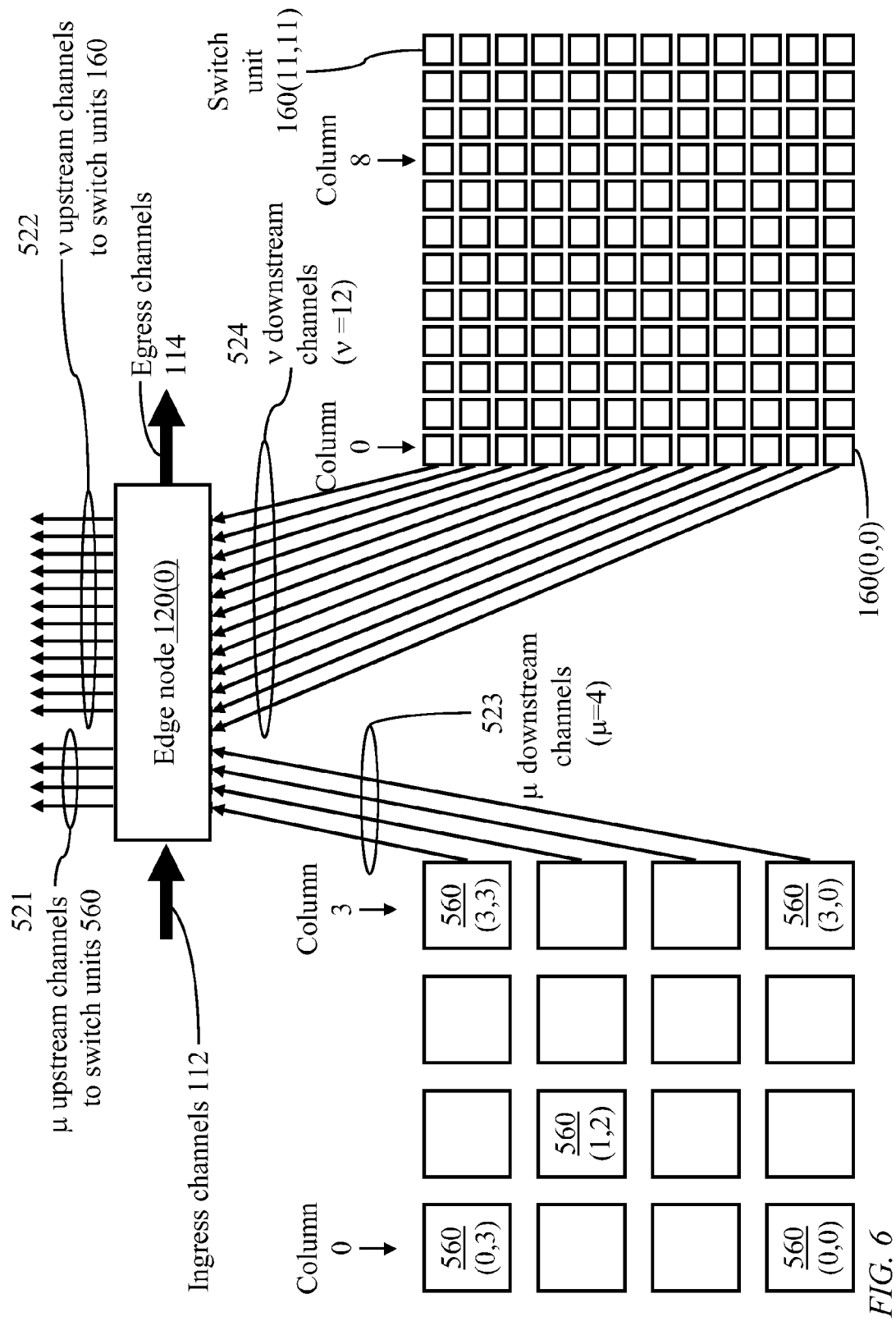
FIG. 6 illustrates downstream channels, in the network of FIG. 5, from switch units of a column of the first matrix to an edge node and downstream channels from a column of the second matrix to the edge node, in accordance with an embodiment of the present invention.

FIG. 6 illustrates downstream connectivity of the edge node 120 of FIG. 5 where the edge node connects to μ downstream channels 523 from μ switch units 560 of column 3 of the first matrix and ν downstream channels 524 to ν switch units 160 in column 0 of the second matrix.

Figure 7:
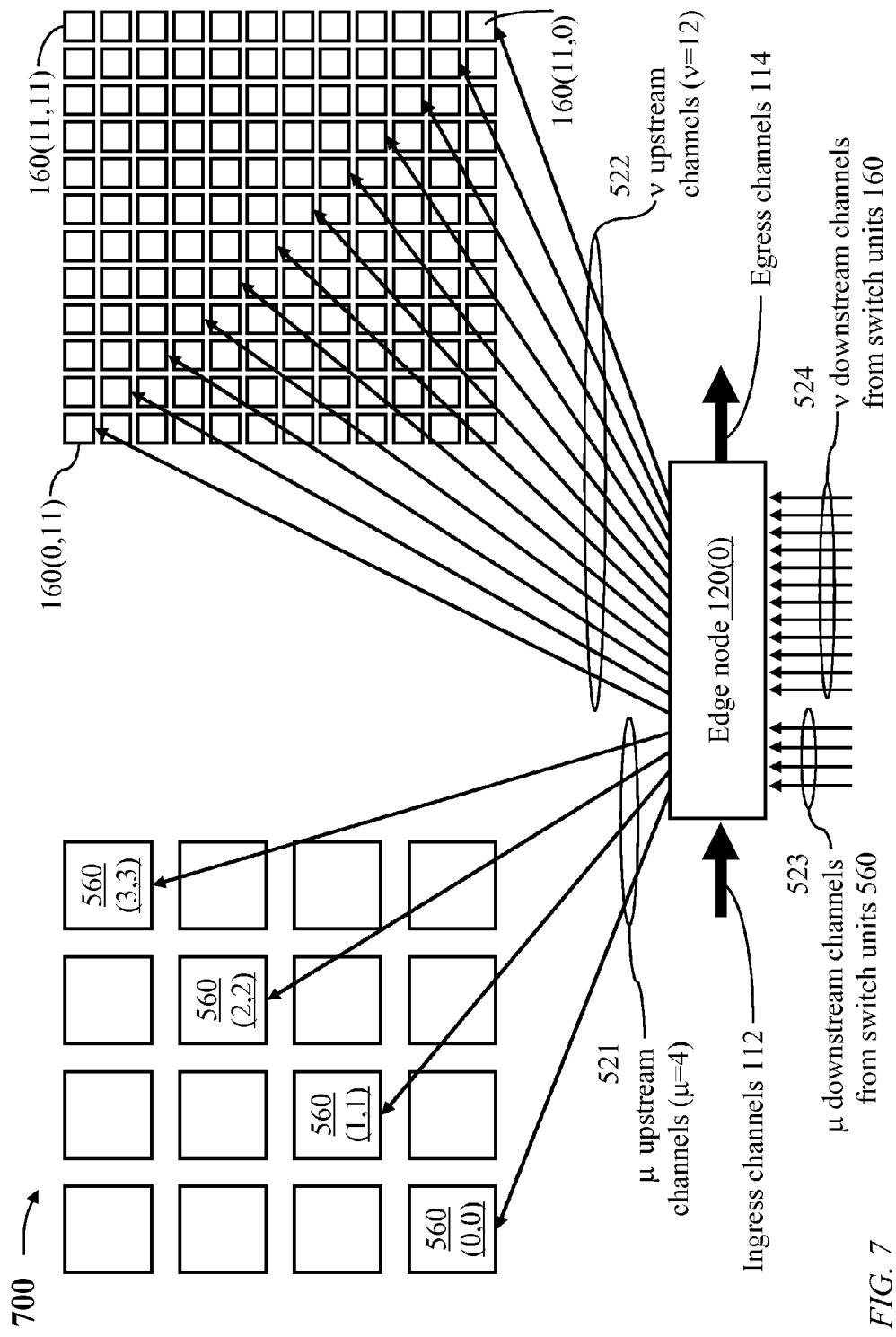
FIG. 7 illustrates upstream channels from an edge node to switch units in different rows and different columns of the two matrices of switch units of the network of FIG. 5, in accordance with an embodiment of the present invention.

FIG. 7 illustrates an alternative upstream connectivity of the edge node 120 of FIG. 5 where the upstream channels 521 connect to switch units 560 in different rows and different columns in the first matrix and the upstream channels 522 connect to switch units 160 in different rows and different columns in the second matrix.

Figure 8:
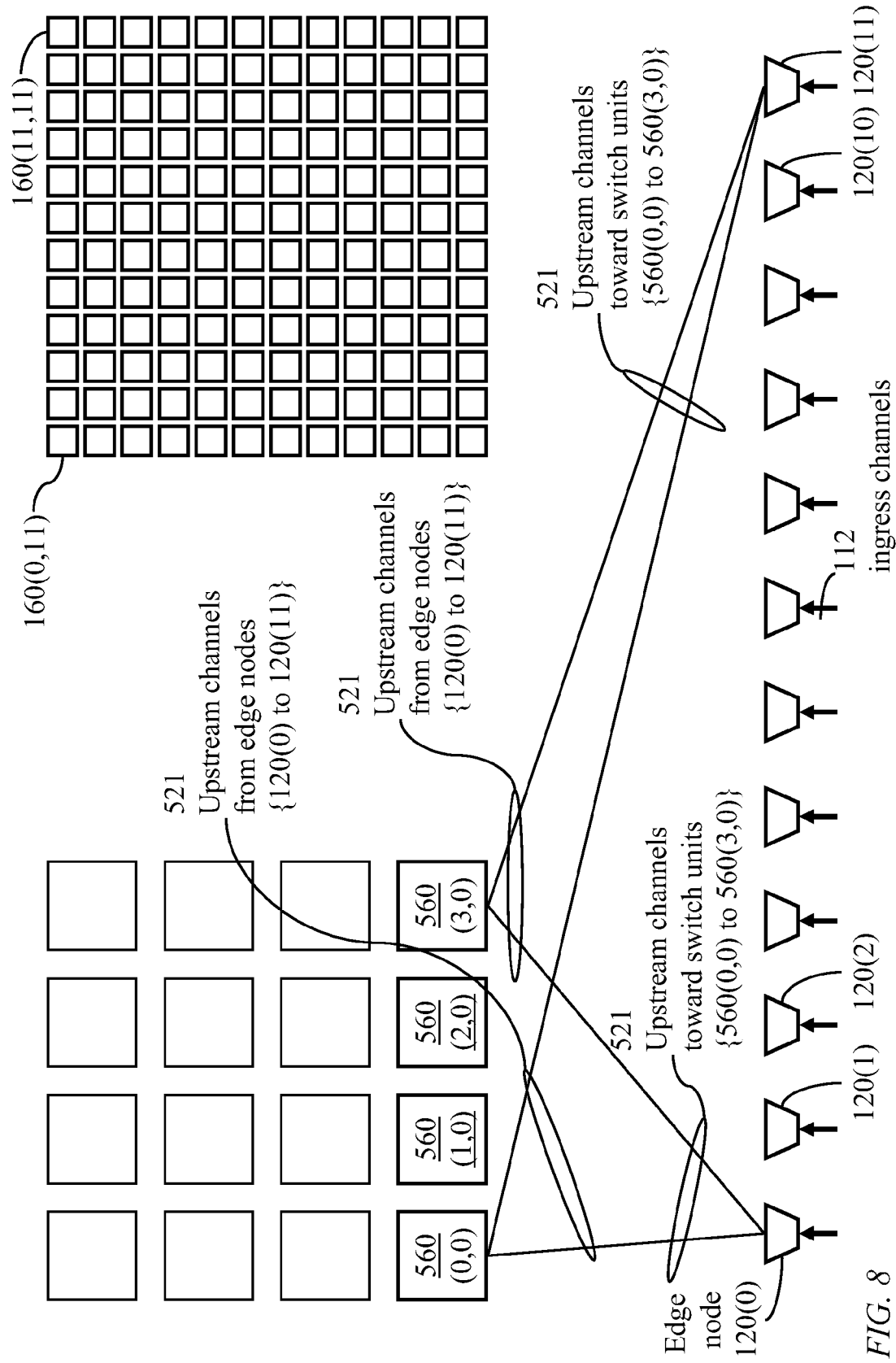
FIG. 8 illustrates time-locked upstream channels from a set of edge nodes to the first matrix of switch units of the network of FIG. 5, in accordance with an embodiment of the present invention.

FIG. 8 illustrates upstream connectivity of 12 edge nodes 120(0) to 120(11) to the first matrix of FIG. 5. Each edge node has 4 upstream channels 521 to switch units 560 in a row of the first matrix and 12 upstream channels 522 to switch units 160 in a row of the second matrix. The total number of upstream channels from the 12 edge nodes to the first matrix is 48 and the total number of upstream channels from the 12 edge nodes to the second matrix is 192.

Figure 9:
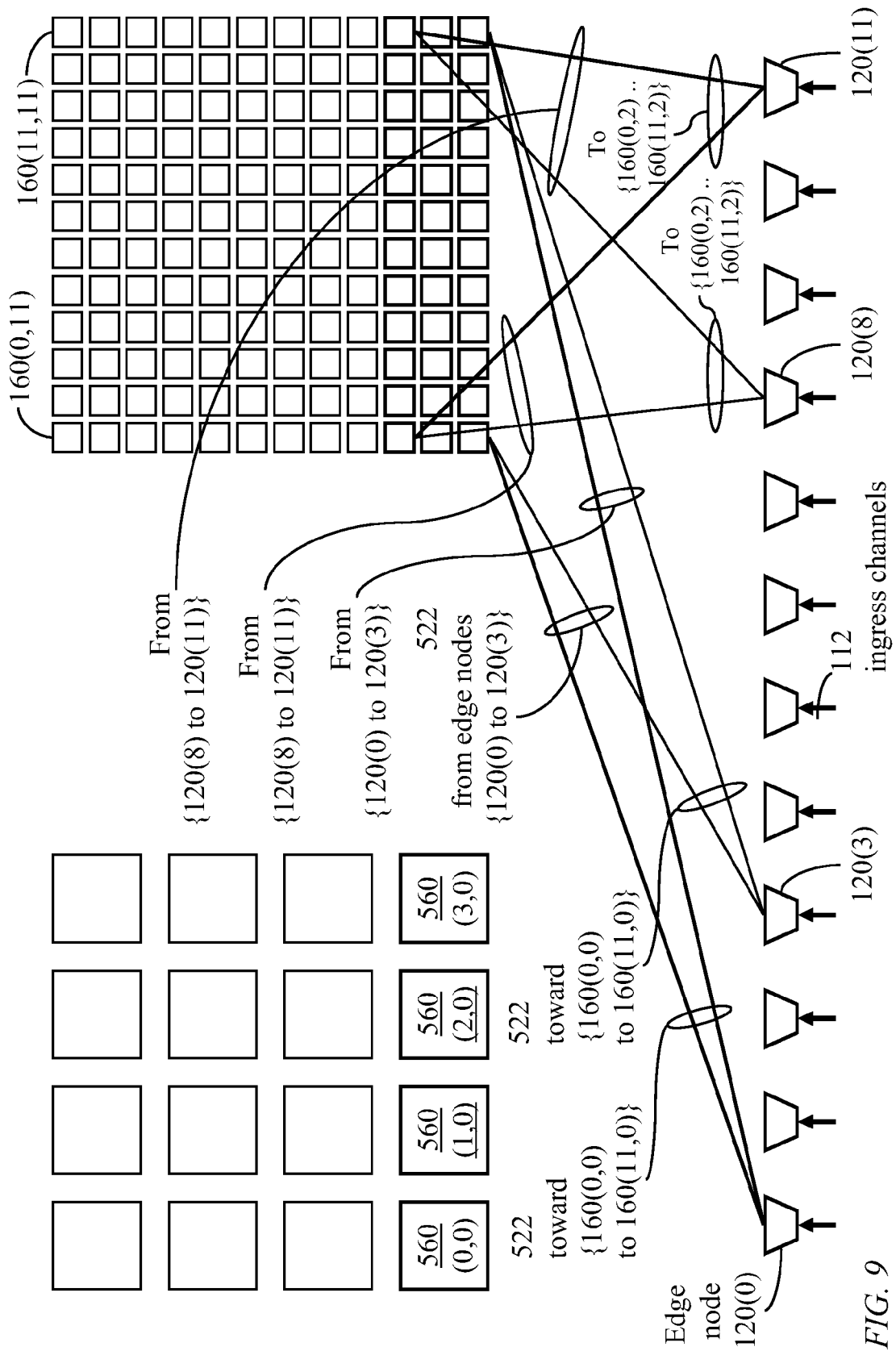
FIG. 9 illustrates time-locked upstream channels from a set of edge nodes to the second matrix of switch units of the network of FIG. 5, in accordance with an embodiment of the present invention.

FIG. 9 illustrates upstream channels from the 12 edge nodes {120(0) to 120(11)} to the second matrix of FIG. 5. The upstream channels 522 connect to switch units 160 of three rows The switch units 560 in a row of the first matrix collectively connect to 48 upstream channels and, similarly, the switch units 160 in a row of the second matrix collectively connect to 48 upstream channels.

Figure 10:
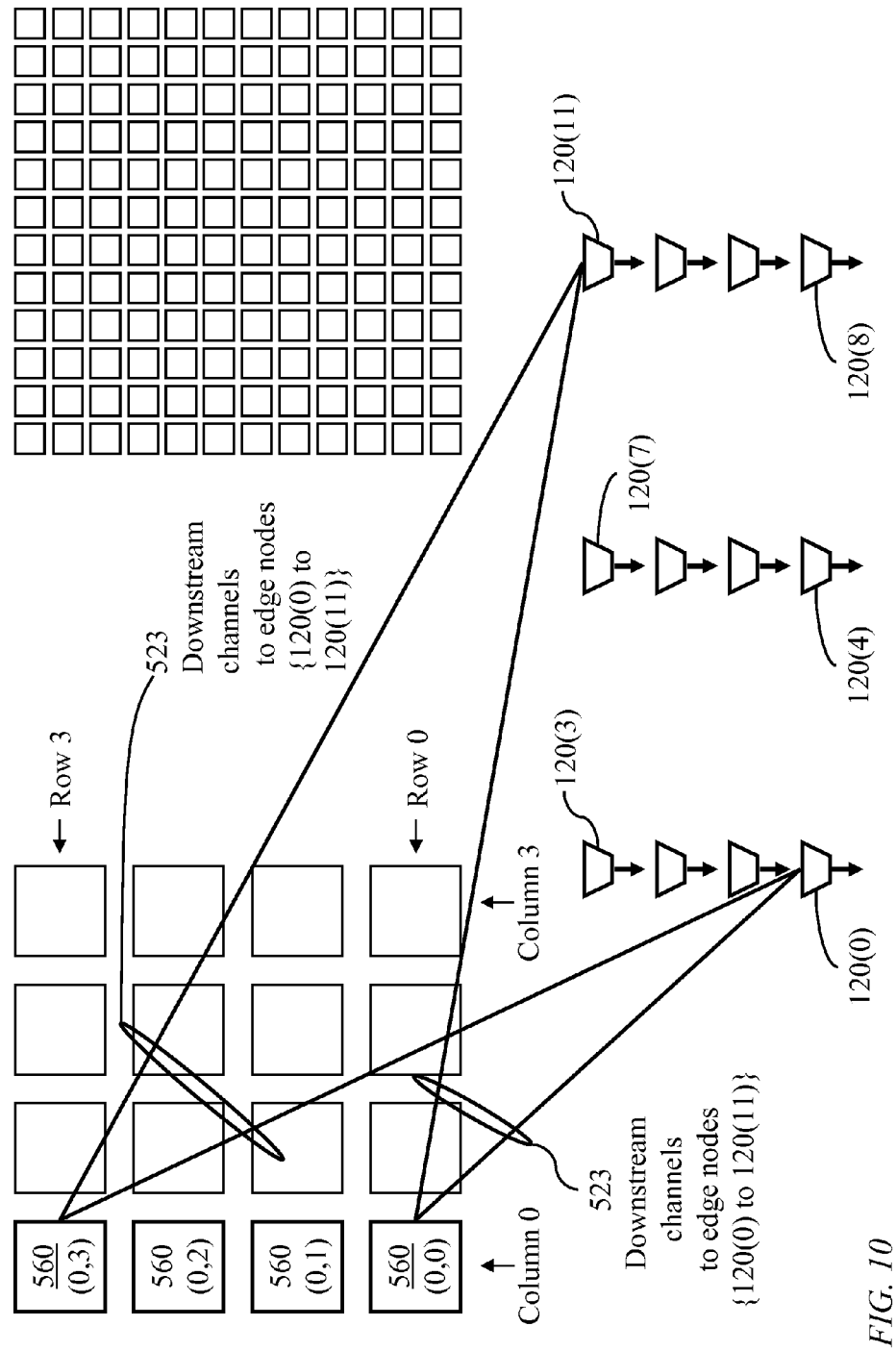
FIG. 10 illustrates downstream channels from the first matrix of switch units of the network of FIG. 5 to a set of edge nodes, in accordance with an embodiment of the present invention.

FIG. 10 illustrates downstream channels from the first matrix of switch units of the network of FIG. 5 to each of the 12 edge nodes 120(0) to 120(11). The 12 edge nodes have downstream channels from switch units 560 of one column (column 0).

Figure 11:
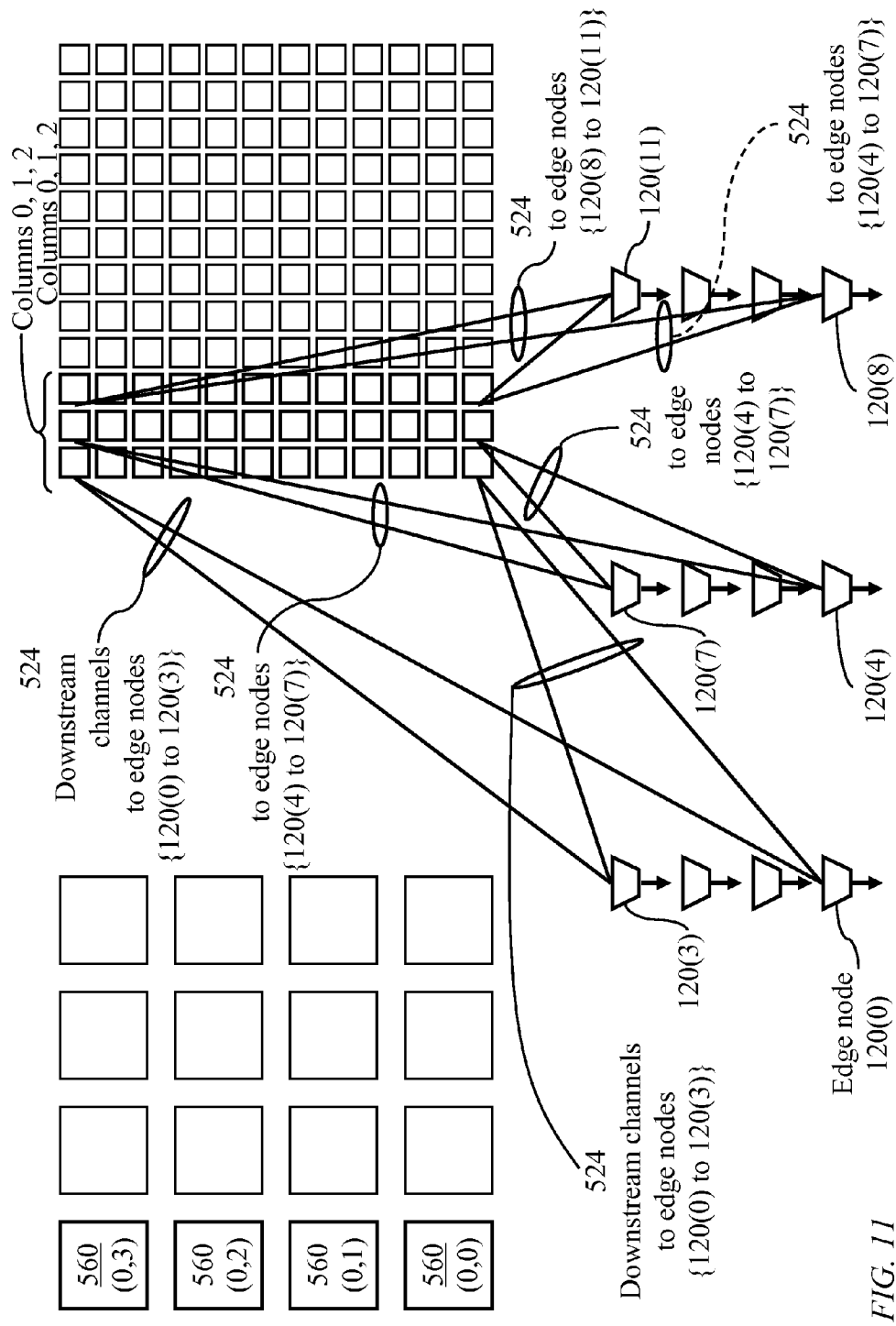
FIG. 11 illustrates downstream channels from the second matrix of switch units of the network of FIG. 5 to a set of edge nodes, in accordance with an embodiment of the present invention.

FIG. 11 illustrates downstream channels from the second matrix of switch units of the network of FIG. 5 to each of the 12 edge nodes 120(0) to 120(11). The 12 edge nodes have downstream channels from switch units 160 of three columns (column 0, column 1, and column 2).

Global Coverage

One may envisage a global network initially serving one billion users each equipped to transmit and receive data at a rate of 100 megabits per second in any format; which is likely to be the network-user's expectation in the near future. The access capacity of such a network would be 100 petabits per second. With a user utilization factor of 0.1 for example, and with traffic efficiency of the order of 0.8, the network should have a core capacity (throughput) of at least 12.5 petabits per second.

An edge node providing traffic-switching capacity of 10 terabits per second, for example, would support one million users, and only 1000 edge nodes of such capacity would be needed to serve a user population of one billion. However, with Earth's land area of 150 million km², the use of only 1000 edge nodes may necessitate long access lines from the users' premises to the edge nodes, taking into account the uneven population distribution and the uninhabited areas. A more realistic number of edge nodes would be of the order of 50,000. Within the United States, 10000 edge nodes would be quite adequate to cover the land area of 9 million km², and the required capacity of an edge node would vary from a hundred gigabits per second to tens of terabits per second.

Thus, in a network of global coverage, the number ν of upstream channels 122 connecting an edge node 120 to ν switch units 160 or downstream channels 124 connecting ν switch units 160 to an edge node 120 may be significantly large; 1024 for example. Each upstream channel 122 or downstream channel 124 is a wavelength channel within a respective fiber-optic link. A group of upstream channels 122 occupying separate spectral bands may share a wavelength-division-multiplexed (WDM) fiber link. Likewise, a group of downstream channels 124 occupying separate spectral bands may share a wavelength-division-multiplexed (WDM) fiber link. Wavelength routers may be used to connect the edge nodes 120 to the switch units 160 or 560 (FIG. 5) using a relatively small number of WDM links as will be illustrated in FIG. 12 and FIG. 13.

Figure 12:
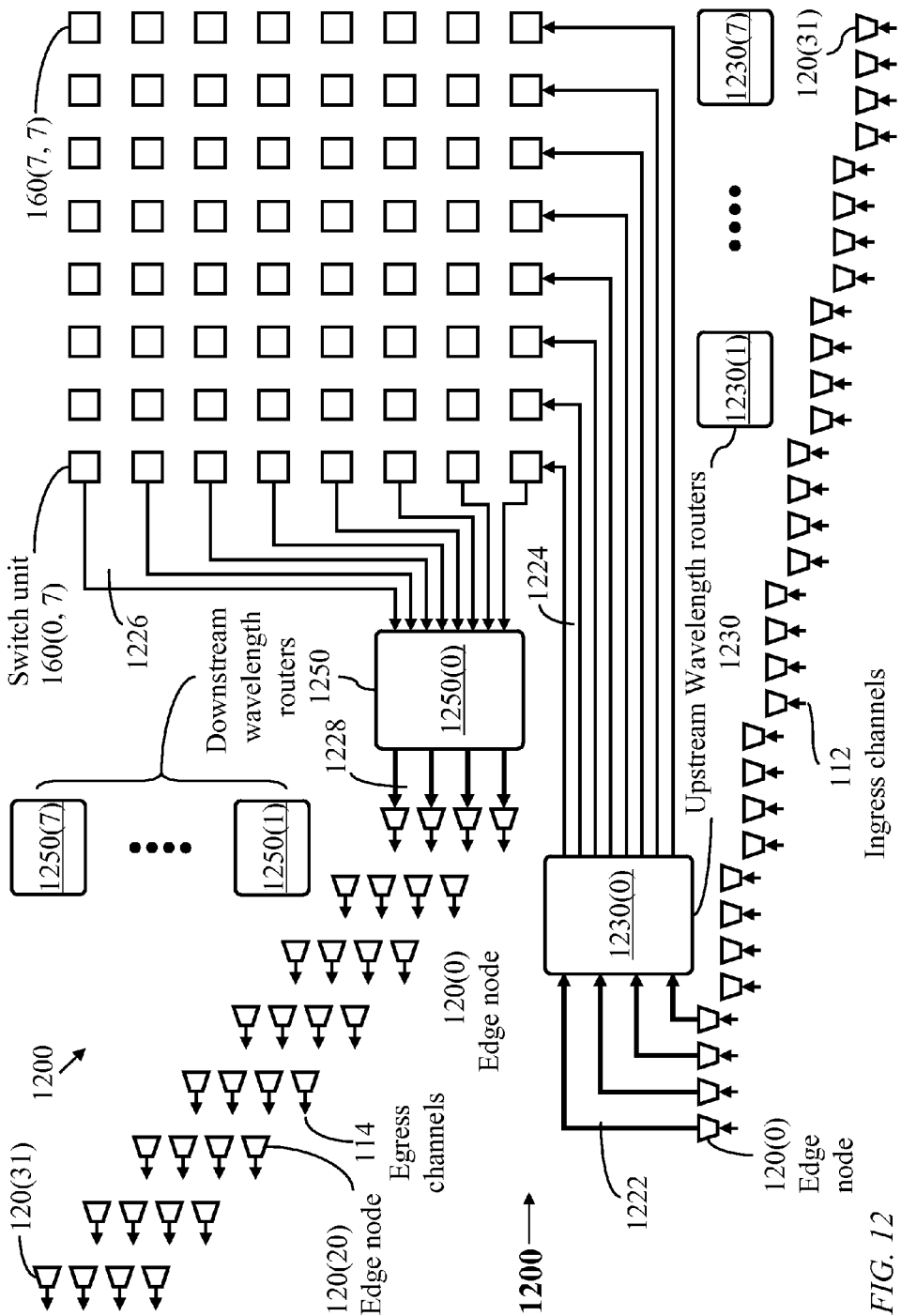
FIG. 12 illustrates a network comprising edge nodes and switch units arranged in a matrix, each edge node having upstream wavelength-division-multiplexed (WDM) links to upstream wavelength routers and downstream WDM links from downstream routers, each upstream wavelength router having WDM links to switch units of one row and each downstream wavelength router having WDM links from switch units of one column, in accordance with an embodiment of the present invention.

FIG. 12 illustrates a network 1200 comprising edge nodes and switch units arranged in one matrix, each edge node having upstream wavelength-division-multiplexed (WDM) links to upstream wavelength routers and downstream WDM links from downstream routers, each upstream wavelength router having WDM links to switch units of one row and each downstream wavelength router having WDM links from switch units of one column. The edge nodes 120 are individually identified as 120(0) to 120(Q−1), Q being the total number of edge nodes. The switch units 160 are arranged in a single matrix having ν columns and ν rows, each switch unit having n input ports and n output ports. Each edge node 120 comprises an edge controller as will be described with reference to FIG. 20 and each switch unit 160 comprises a switch-unit controller as will be described with reference to FIG. 22. In the exemplary network of FIG. 12, ν=8 and n=4, hence Q=ν×n=32.

Upstream wavelength routers 1230 may be used to connect the edge nodes 120 to the switch units 160 and downstream wavelength routers 1250 may be used to connect the switch units 160 to the edge nodes 120. For example, in a wide-coverage network, an upstream wavelength router 1230 may connect 32 upstream WDM links 1222 from a set of 32 edge nodes 120 to 32 WDM links 1224 leading to 32 switch units 160. Each WDM link 1222 carries 32 wavelength channels from a single edge node 120 and each WDM link 1224 carries a wavelength channel from each edge node in the set of 32 edge nodes. Likewise, a downstream wavelength router 1250 may connect 32 WDM links 1226 from 32 switch units 160 to 32 WDM links 1228 leading to 32 edge nodes 120. Each WDM link 1228 carries channels directed to a single edge node 120. Thus, with ν=1024, an edge node 120 would have 32 upstream links 1222 leading to 32 upstream wavelength routers 1230 and 32 downstream links 1228 from 32 downstream wavelength routes 1250.

Figure 13:
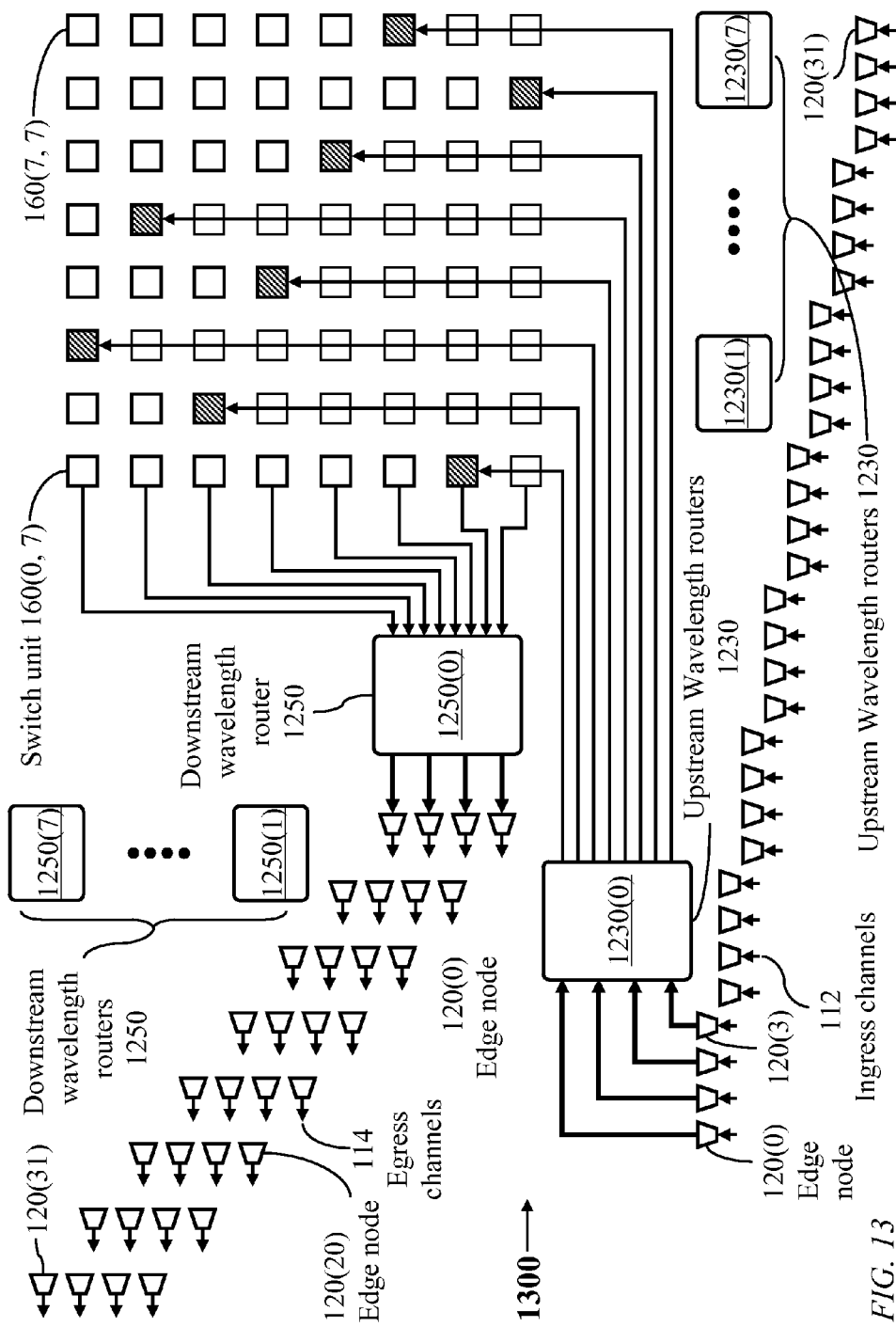
FIG. 13 illustrates a network comprising edge nodes and switch units arranged in a matrix, each edge node having upstream wavelength-division-multiplexed (WDM) links to upstream wavelength routers and downstream WDM links from downstream routers, each upstream wavelength router having WDM links to switch units in different rows and different columns and each downstream wavelength router having WDM links from switch units of one column, in accordance with an embodiment of the present invention.

FIG. 13 illustrates a network similar to the network of FIG. 12 but with a different upstream connectivity. Each upstream wavelength router 1230 has WDM links to switch units in different rows and different columns. Each downstream wavelength router 1250 has WDM links from switch units of one column as in the network of FIG. 12.

As will be described below, with reference to FIG. 20, an edge node 120 has ingress ports, connecting to ingress channels 112, for receiving data from data sources, egress ports, connecting to egress channels 114, for transmitting data to data sinks, inbound ports, connecting to downstream channels 124, for receiving signals from respective switch units 160 through downstream wavelength routers 1250, and outbound ports, connecting to upstream channels 122, for transmitting signals to respective switch units 160 though upstream wavelength routers 1230.

The connections of the upstream wavelength routers 1230 to the edge nodes 120 are configured so that each edge node 120 connects to a respective set of ν switch units, one in each of the ν columns. The connections of the downstream wavelength routers 1250 to the edge nodes 120 are configured so that each edge node 120 connects to a respective group of ν switch units, one in each of the ν rows. Preferably, each group of ν switch units connecting to an edge node in the downstream direction belongs to a single column in the matrix of switch units.

With identical switch units 160, the number Q of edge nodes 120 is determined by the dimension of a switch unit 160 and the number ν of rows or columns in the matrix of switch units. With each switch unit having n inlet ports and n outlet ports, the number Q of edge nodes is determined as Q=ν×n, and the number of switch units 160 is ν².

A switch unit 160 may be: (1) a bufferless electronic space switch; (2) a single-rotator latent space switch (to be described below with reference to FIG. 48 to FIG. 54) or (3) a fast switching optical space switch. Preferably, the switch units 160 of network 1200 are fast optical switches.

In the network of FIG. 12, an upstream wavelength router 1230 connects a subset of edge nodes 120 to switch units 160 of one row. It may be desirable to connect the subset of edge nodes 120 to switch units in different rows and different columns. In the network of FIG. 13, upstream wavelength router 1230(0) connects the subset of edge nodes {120(0), 120(1), 120(2), 120(3)} to eight switch units {160(0,1), 160(1,5), 160(2,7), 160(3,4), 160(4,6), 160(5,3), 160(6,0), 160(7,2)} so that each edge node in the subset has one upstream channel to each of the eight switch units.

Figure 14:
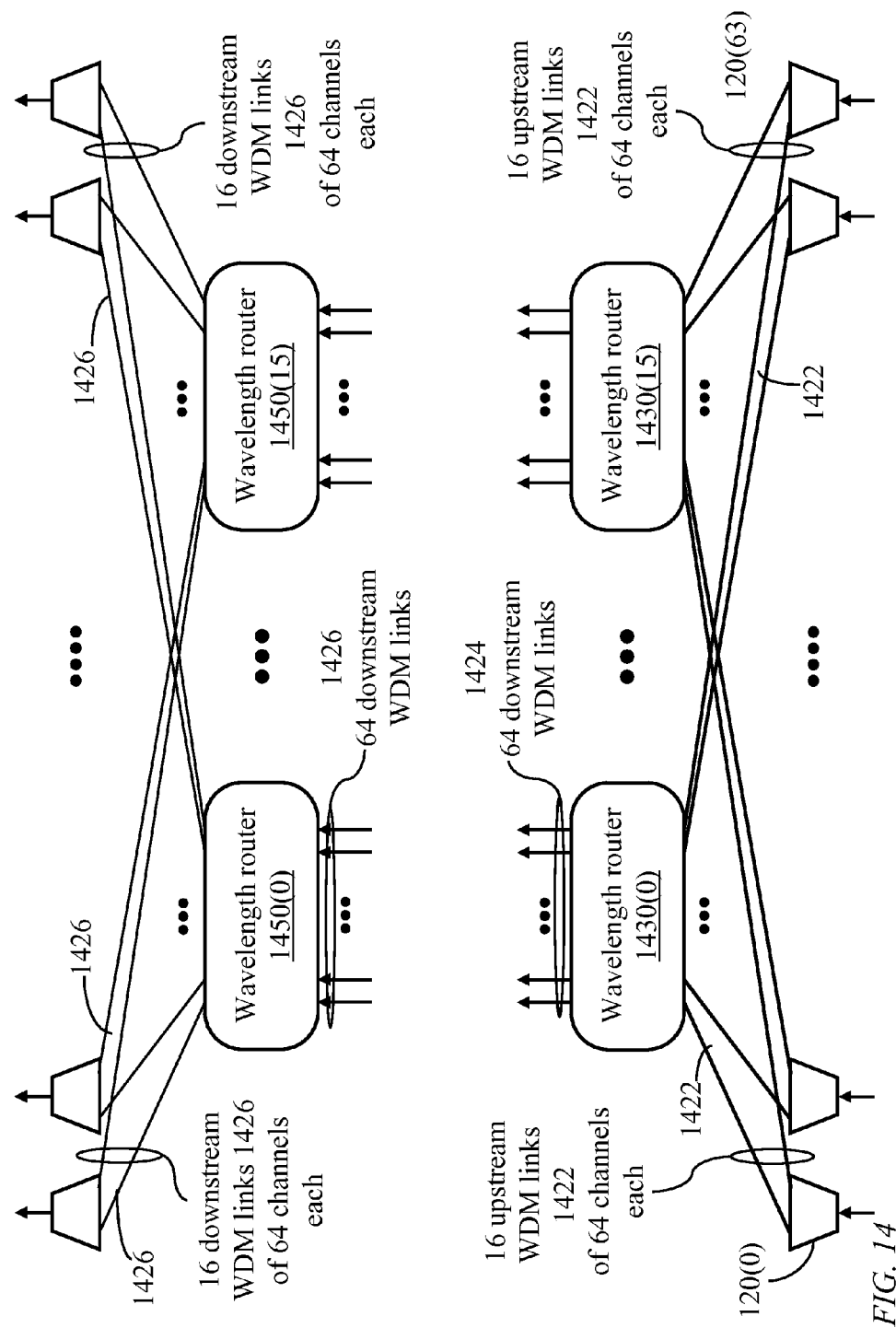
FIG. 14 illustrates edge-node connectivity to switch units in the network of FIG. 12, in accordance with an embodiment of the present invention.

FIG. 14 illustrates exemplary connections of a group of 64 edge nodes 120 arbitrarily indexed as 120(0) to 120(63) each having 1024 upstream wavelength channels to switch units 160 and 1024 downstream wavelength channels from switch units 160. The 1024 upstream wavelength channels emanating from an edge node are grouped into 16 upstream WDM links 1422 each WDM link multiplexing 64 wavelength channels and terminating onto one switch unit 160. Likewise, the 1024 downstream wavelength channels terminating on an edge node are grouped into 16 downstream WDM links 1426 each WDM link multiplexing 64 wavelength channels, each downstream WDM link emanating from one switch unit 160. Each switch unit 160 is of dimension 64×64, having 64 input ports and 64 output ports, each input port supporting one upstream wavelength channel and each output port supporting one downstream wavelength channel. Each switch unit 160 has a spectral demultiplexer at input for demultiplexing wavelength channels of an input WDM link and directing each wavelength channel to a respective input port of the switch unit. Each switch unit 160 has a spectral multiplexer at output for multiplexing output wavelength channels onto an output WDM link.

Sixteen upstream wavelength routers 1430, individually identified as 1430(0) to 1430(15) are used to direct the 1024 upstream wavelength channels emanating from each of edge nodes 120(0) to 120(63) to 1024 different switch units 160, subject to the connectivity conditions described with reference to FIG. 1 and FIG. 3. A wavelength router 1430 has 64 upstream WDM links 1422 each carrying 64 wavelength channels and 64 output WDM links 1424 each carrying one wavelength channel from each of the upstream WDM links.

Likewise, sixteen downstream wavelength routers 1450, individually identified as 1450(0) to 1450(15) are used to direct downstream wavelength channels of 1024 downstream WDM links emanating from 1024 different switch units 160 to edge nodes 120(0) to 120(63), so that each edge node 120 receives wavelength channels from switch units 160 belonging to one column of the switch-unit matrix as described with reference to FIG. 1 and FIG. 3. A wavelength router 1450 has 64 downstream WDM links 1426 each carrying 64 wavelength channels and 64 output WDM links 1428 each carrying one downstream wavelength channel from each of the 64 downstream WDM links 1426.

Figure 15:
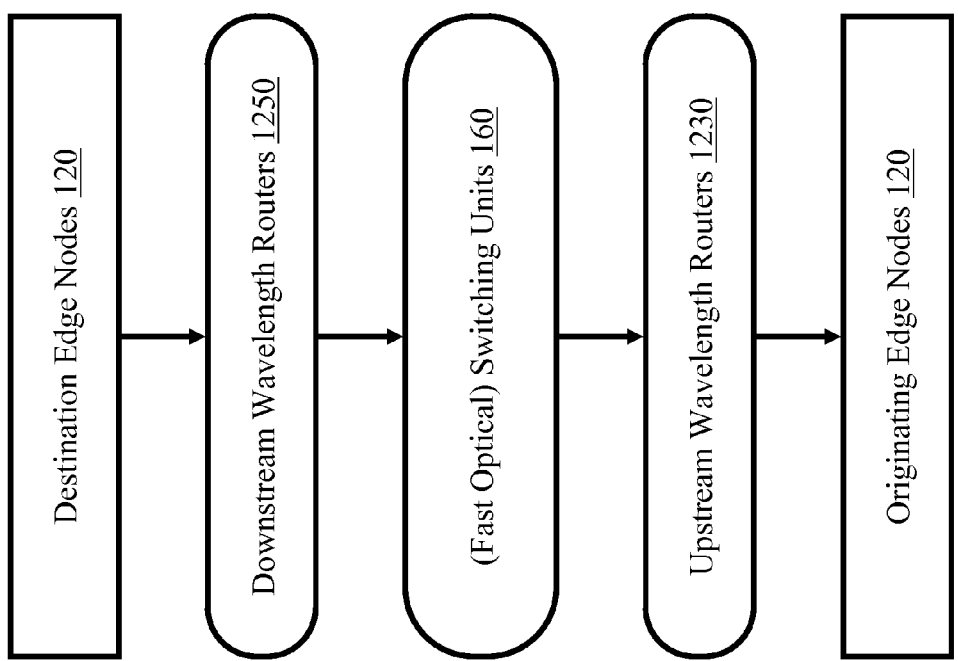
FIG. 15 illustrates signals flow from originating edge nodes to destination edge nodes in the network of FIG. 12 or FIG. 13, where a signal traverses an upstream wavelength router, a switch unit, and a downstream wavelength router.

FIG. 15 provides an overview of simple paths in the network of FIG. 12 or the network of FIG. 13. Each simple path originates from a source edge node 120 and terminates in a destination edge node 120. A simple path traverses an upstream wavelength router 1230, a switch unit 160, and a downstream wavelength router 1250.

Time-Coordination

A switch unit 160 has a master time indicator which provides a time reference to be observed by each edge node 120 having an upstream channel to the switch unit 160. The master time indicators of the $\nu^2$ switch units are independent of each other.

Each edge node 120 has ν output ports connecting to ν switch units in ν different columns through upstream channels. An output port of an edge node 120 has a slave time indicator which time locks to a master time indicator of a switch unit 160 to which the output port connects.

Figure 22:
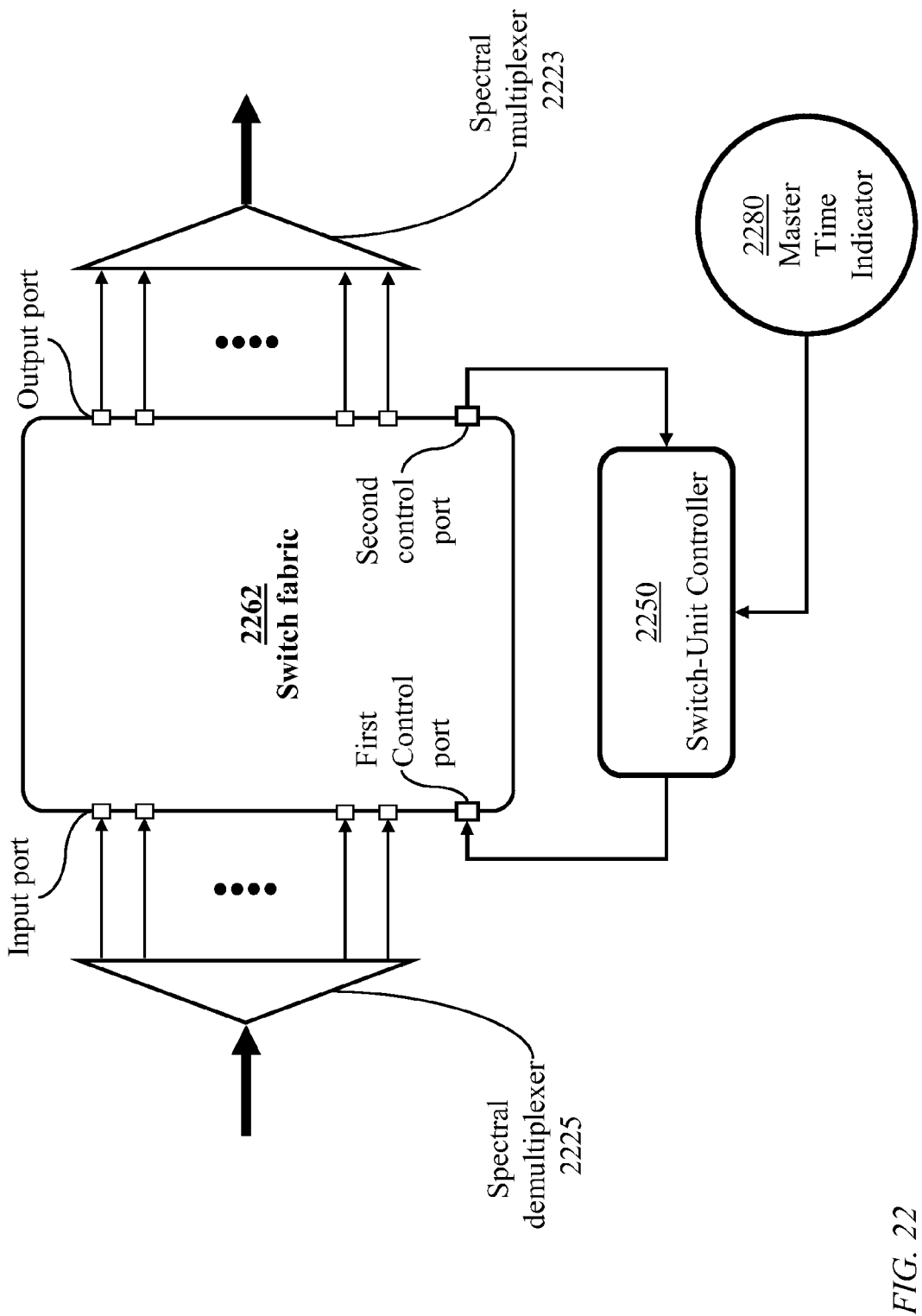
FIG. 22 illustrates a switch unit in any of the networks of FIG. 1, FIG. 3, FIG. 5, FIG. 7, FIG. 12, and FIG. 13, in accordance with an embodiment of the present invention.

Data units arrive at the n inlet ports of a switch unit 160 at time instants dictated by a controller of the switch unit 160. The time instants are specified according to a time reference of the master time indicator of the switch unit (FIG. 22). Thus, no signal buffering is needed at the switch unit and the switching function at the switch unit is time coherent. A latent space switch has a constant transit delay specific to each input-output connection. However, an arriving data unit is not buffered at input and the switching function at the latent space switch is also time coherent.

Wavelength-Routers Configuration

Figure 16:
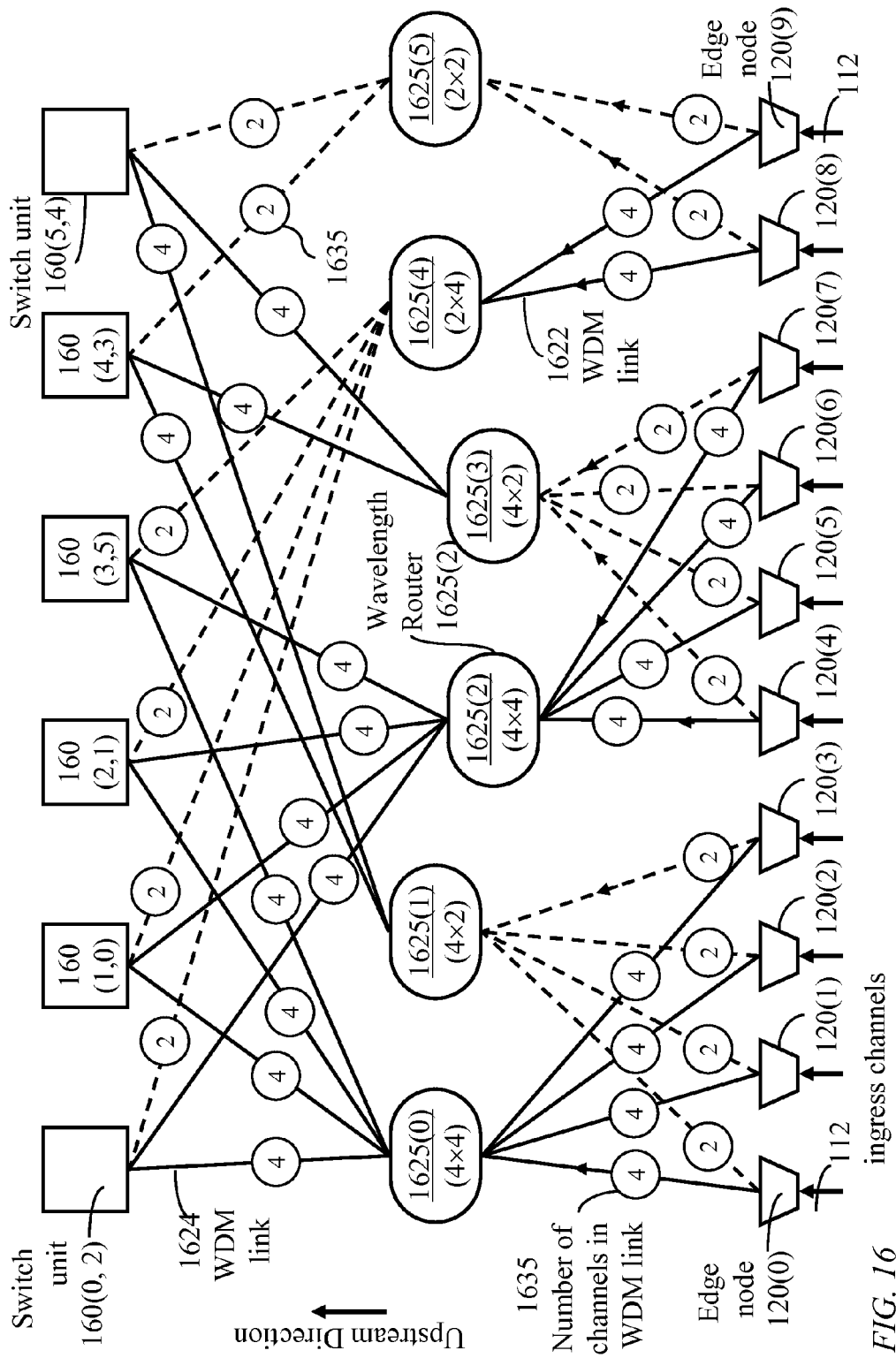
FIG. 16 illustrates an exemplary arrangement of upstream wavelength routers connecting a set of edge nodes to a set of switch units, in accordance with an embodiment of the present invention.

FIG. 16 illustrates a configuration of upstream wavelength routers connecting ten edge nodes 120(0) to 120(9) to six switch units 160(0,2), 160(1,0), 160(2,1), 160(3,5), 160(4,3), and 160(5,4), belonging to different columns in a matrix of switch units 160, using wavelength routers 1625 each having at most four input WDM links 1622 and at most four output WDM links 1624, where each output WDM link 1624 carries a wavelength channel from each input WDM link 1622. Each switch unit 160 is of dimension 10×10 (having 10 inlet ports and 10 outlet ports). The wavelength routers 1625 are configured so that each edge node 120 has an upstream channel to each of the six switch units 160. As illustrated, six wavelength routers 1625(0) to 1625(5) of dimensions (4×4), (4×2), (4×4), (4×2), (2×4), and (2×2) are used, where the dimension of a wavelength router is defined by the number of input WDM links and the number of output WDM links.

Figure 17:
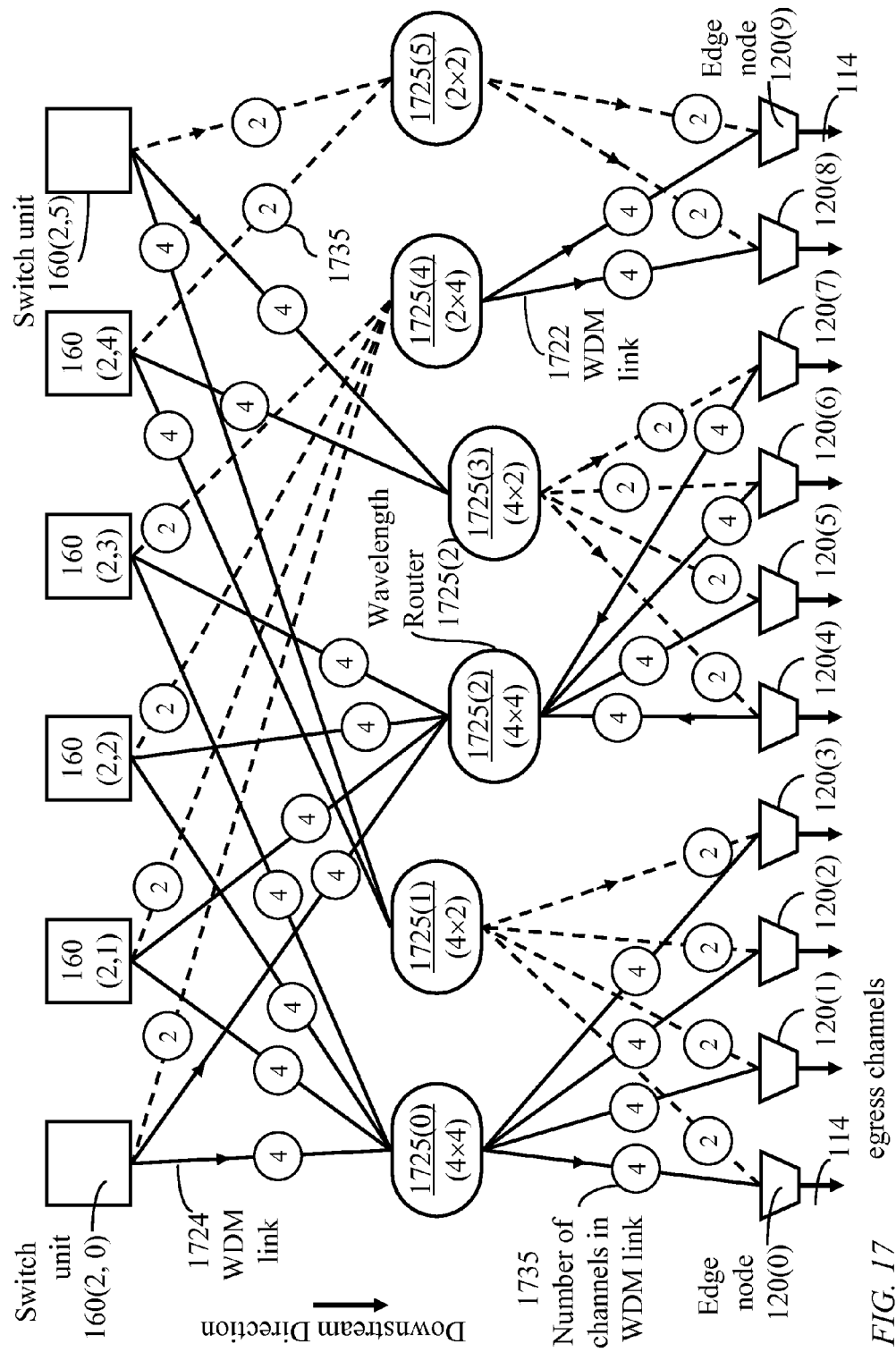
FIG. 17 illustrates an exemplary arrangement of downstream wavelength routers connecting a set of switch units to a set of edge nodes, in accordance with an embodiment of the present invention.

FIG. 17 illustrates a configuration of downstream wavelength routers 1725 connecting six switch units 160(2,0), 160(2,1), 160(2,2), 160(2,3), 160(2,4), and 160(2,5), all belonging to column 2, to the ten edge nodes 120(0) to 120(9) using wavelength routers 1725 each having at most four input WDM links 1724 and at most four output WDM links 1722, where each output WDM link 1722 carries a wavelength channel from each input WDM link 1724. Each switch unit 160 is of dimension 10×10 (n=10). The wavelength routers 1725 are configured so that each edge node 120 has a downstream channel from each of the six switch units 160. As illustrated, six wavelength routers 1725(0) to 1725(5) of dimensions (4×4), (4×2), (4×4), (4×2), (2×4), and (2×2) are used.

The maximum dimension of a wavelength router 1625 or 1725 in the exemplary configurations of FIG. 16 and FIG. 17 is selected to be only 4×4 for clarity. In a wide-coverage network, wavelength routers each of a dimension of 32×32, for example, may be used.

Figure 18:
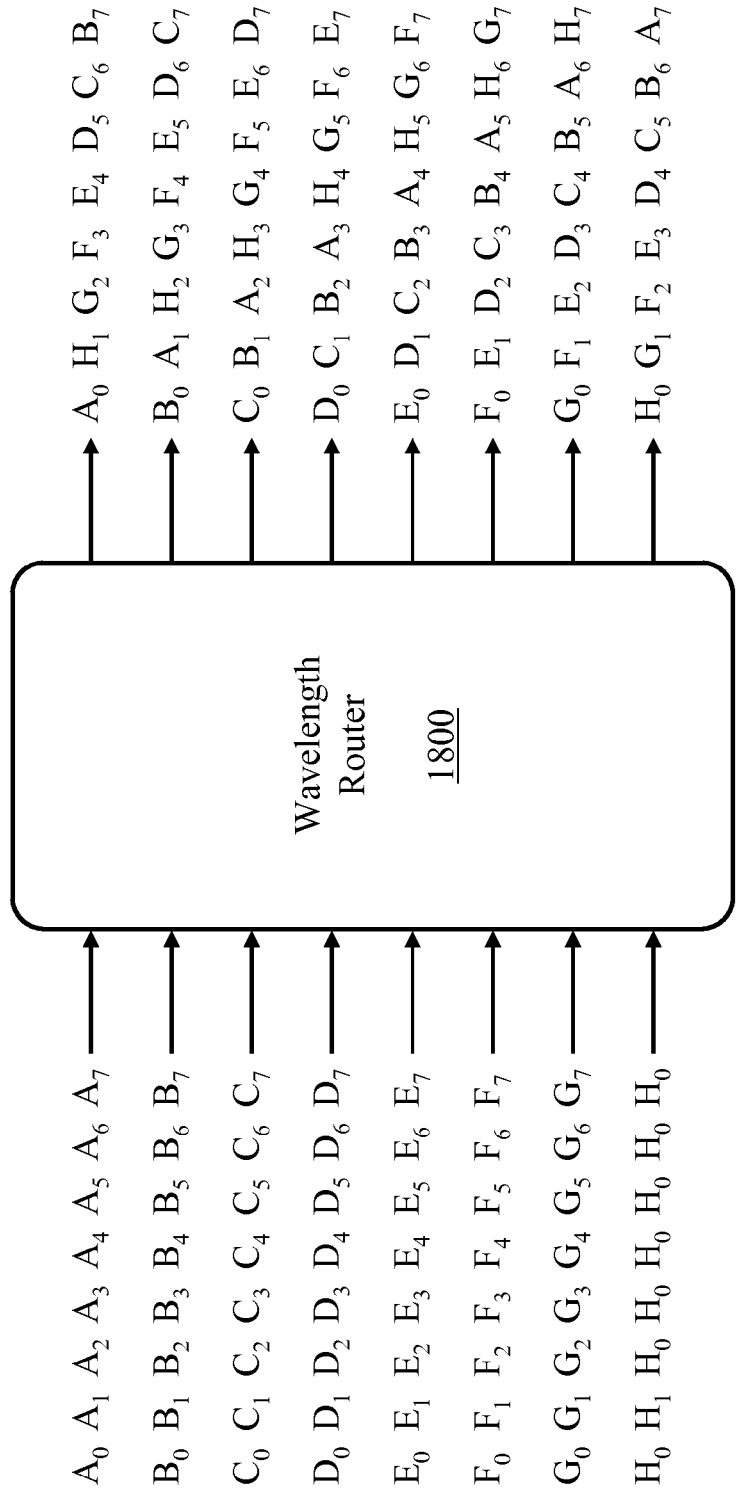
FIG. 18 illustrates wavelength-channel assignments in a conventional wavelength router having a number of input wavelength-division-multiplexed links equal to a number of output wavelength-division-multiplexed links.

FIG. 18 illustrates wavelength-channel assignments in a conventional wavelength router. The figure illustrates an exemplary wavelength router 1800 of a small dimension. Network 1200 (FIG. 12) would employ wavelength routers of significantly larger dimensions. Exemplary wavelength router 1800 may be employed as an upstream wavelength router or a downstream wavelength router. Wavelength router 1800 has eight input wavelength-division-multiplexed (WDM) links each carrying a multiplex of eight wavelength channels and eight output WDM links each carrying a wavelength channel from each input WDM link. The wavelength channels of a first input WDM links are denoted $\{A_0, A_1, \ldots, A_7\}$, the wavelength channels of a second input WDM link are denoted $\{B_0, B_1, \ldots, B_7\}$, and so on, where a character A, B, . . . , identifies an input WDM link and a subscript $\{0, 1, \ldots, 7\}$ identifies a spectral band allocated to a respective wavelength channel. As illustrated, each output WDM link carries channels from different input WDM links and of different spectral bands.

Figure 19:
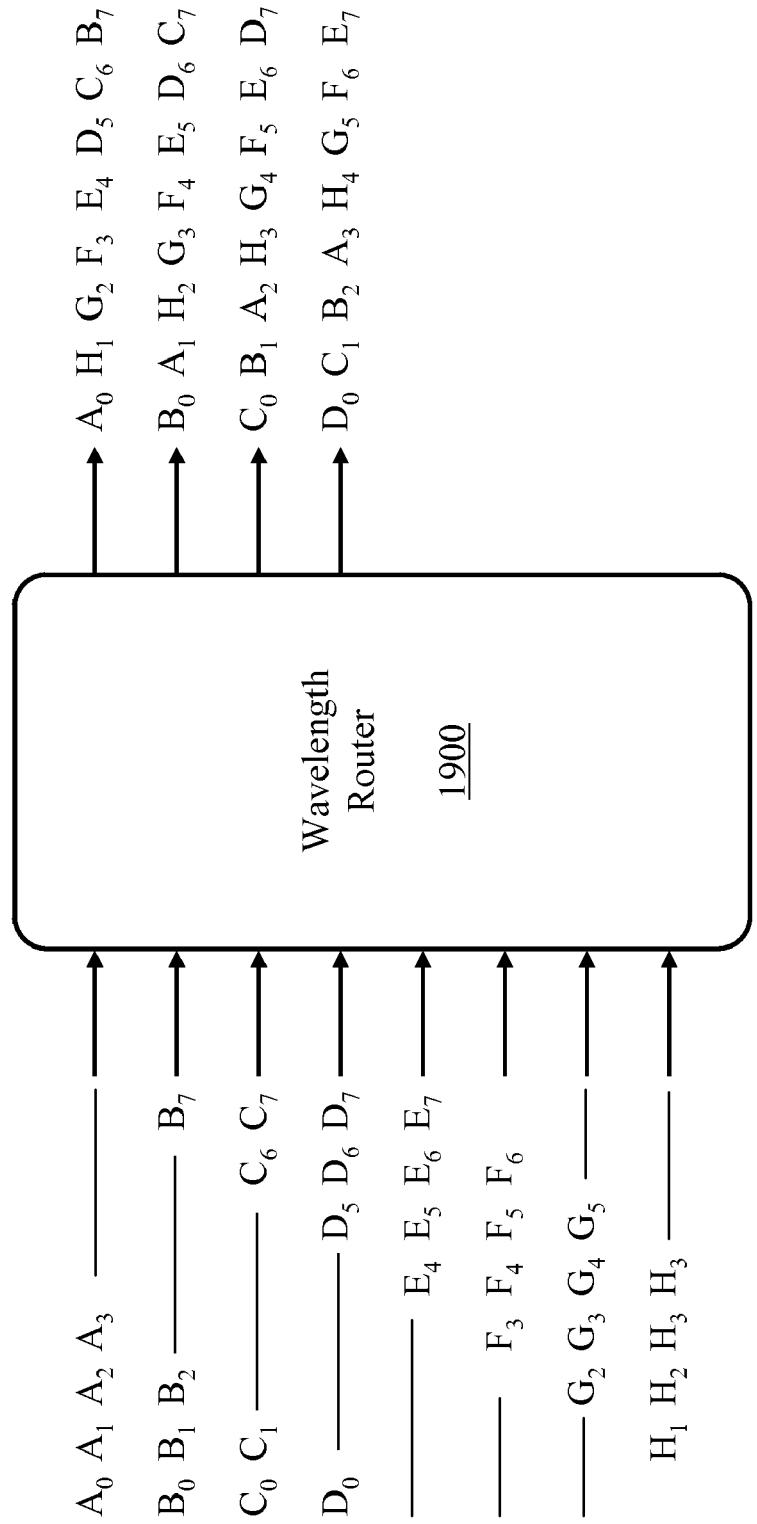
FIG. 19 illustrates wavelength-channel assignments in a wavelength router having a number of input wavelength-multiplexed links exceeding a number of output wavelength-division-multiplexed links.

FIG. 19 illustrates wavelength-channel assignments in a wavelength router 1900, structurally identical to wavelength router 1800 except that only four output WDM links are used. Each input WDM channel carries four wavelength channels selected so that each of the four output WDM links carries eight wavelength channels of different spectral bands, one wavelength channel from each input WDM channel. As illustrated in FIG. 16 and FIG. 17, some wavelength routers may be partially provisioned depending on the network configuration.

Figure 20:
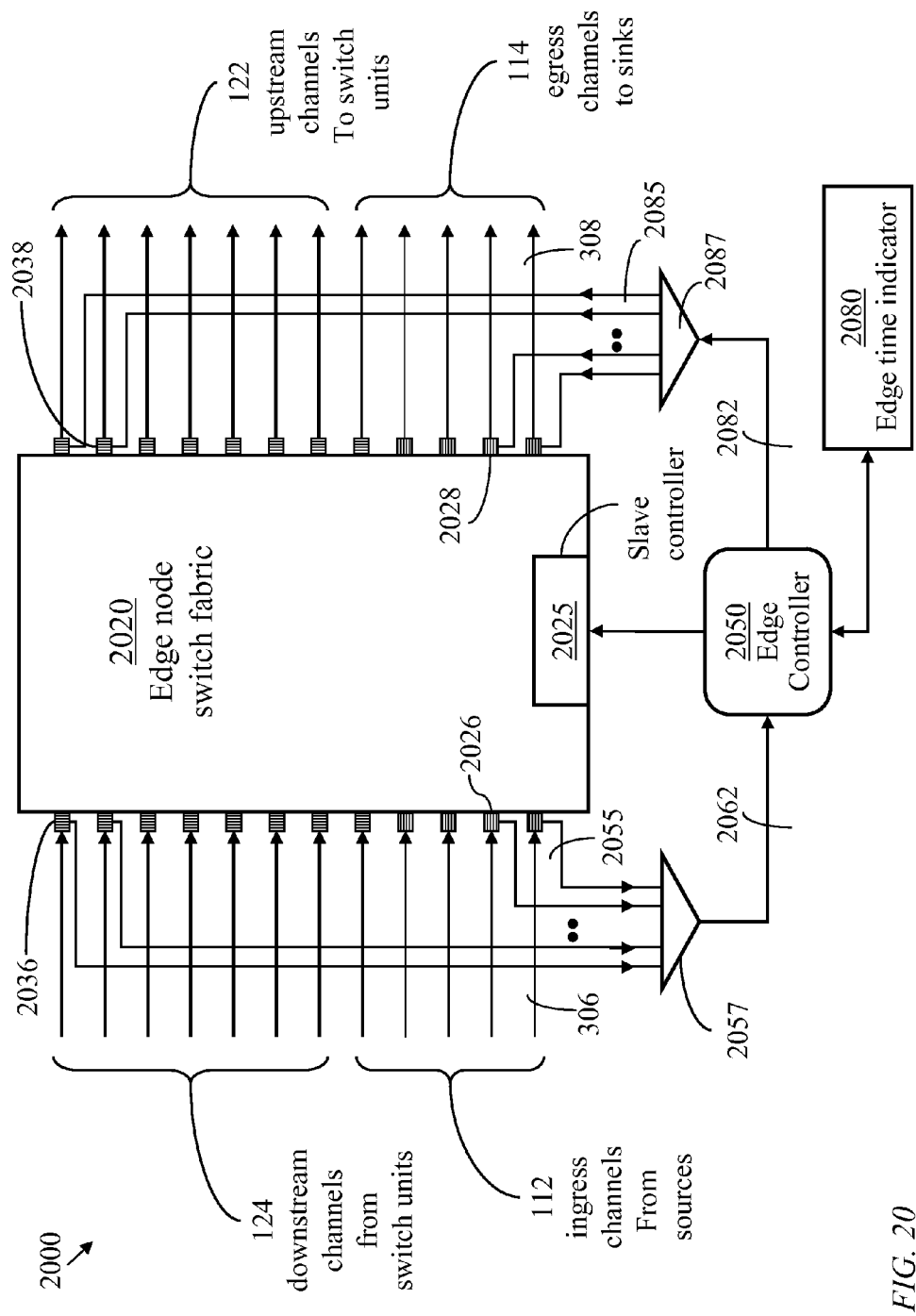
FIG. 20 illustrates an edge node in any of the networks of FIG. 1, FIG. 3, FIG. 5, FIG. 7, FIG. 12, and FIG. 13, in accordance with an embodiment of the present invention.

FIG. 20 illustrates an edge node 2000 for use in any of the networks of FIG. 1, FIG. 3, FIG. 5, FIG. 7, FIG. 12, and FIG. 13. Edge node 2000 has a switch fabric 2020, an edge controller 2050, input ports, and output ports. The input ports include ingress ports 2026 for receiving data from data sources through ingress channels 112 and inbound ports 2036 for receiving data from switch units through downstream channels 124. The output ports include egress ports 2028 for transmitting data to data sinks through egress channels 114 and outbound ports 2038 for transmitting data to switch units through upstream channels 122.

Control signals from input ports 2026 and 2036 sent on control channels 2055 are time multiplexed in temporal multiplexer 2057 onto a channel 2062 connecting to edge controller 2050. Control signals from edge controller 2050 to egress ports 2028 and outbound ports 2038 are transferred through a channel 2082, a temporal demultiplexer 2087 and channels 2085.

Each egress port 2028 is preferably paired with an ingress port 2026, and each outbound port 2038 is preferably paired with an inbound port 2036. Control signals from the edge controller 2050 to the ingress ports 2026 and inbound ports 2036 may be transferred through corresponding paired output ports (egress ports and outbound ports).

Other arrangements for exchanging control signals between the edge controller 2050 and the input or output ports may be devised; for example the control signals may be transferred through the switch fabric instead of channels 2055 and 2085.

Edge controller 2050 schedules connections from input ports (ingress and inbound ports) to output ports (egress and outbound ports) and instructs a configuration controller (slave controller) 2025 associated with the switch fabric 2020 to establish scheduled connections. Configuration controllers associated with switch fabrics are well known in the art. The edge controller 2050 is coupled to an edge time indicator 2080 which distributes timing data to the outbound ports 2038. Each outbound port adjusts transmission time of data sent to a specific switch unit 160 according to the time data and time indications received from a master time indicator of the specific switch unit. The edge time indicator has the same periodicity and granularity of the master time indicator.

Control Time Slots

The time domain is organized into time frames each divided into a number T of time slots of equal duration. Each connection (data stream) is allocated a respective number σ of time slots per time frame, 0<σ<T. A connection is preferably confined to a single upstream channel 122 from a source edge node 120 to a switch unit 160. Control time slots from edge controller 2050 to a switch-unit controller and vice versa may be transferred through dedicated control channels. A number $\Lambda_1$ of upstream control time slots per time frame may be reserved in each upstream channel 122 from a source node 120 and a number $\Lambda_2$ of downstream control time slots per time frame may be reserved in each downstream channel 124 from a switch unit 160. Although the flow rate of control signals generated by edge controller 2050 may differ from the flow rate of control signals generated by a switch-unit controller, it is preferable that $\Lambda_1=\Lambda_2$.

Figure 21:
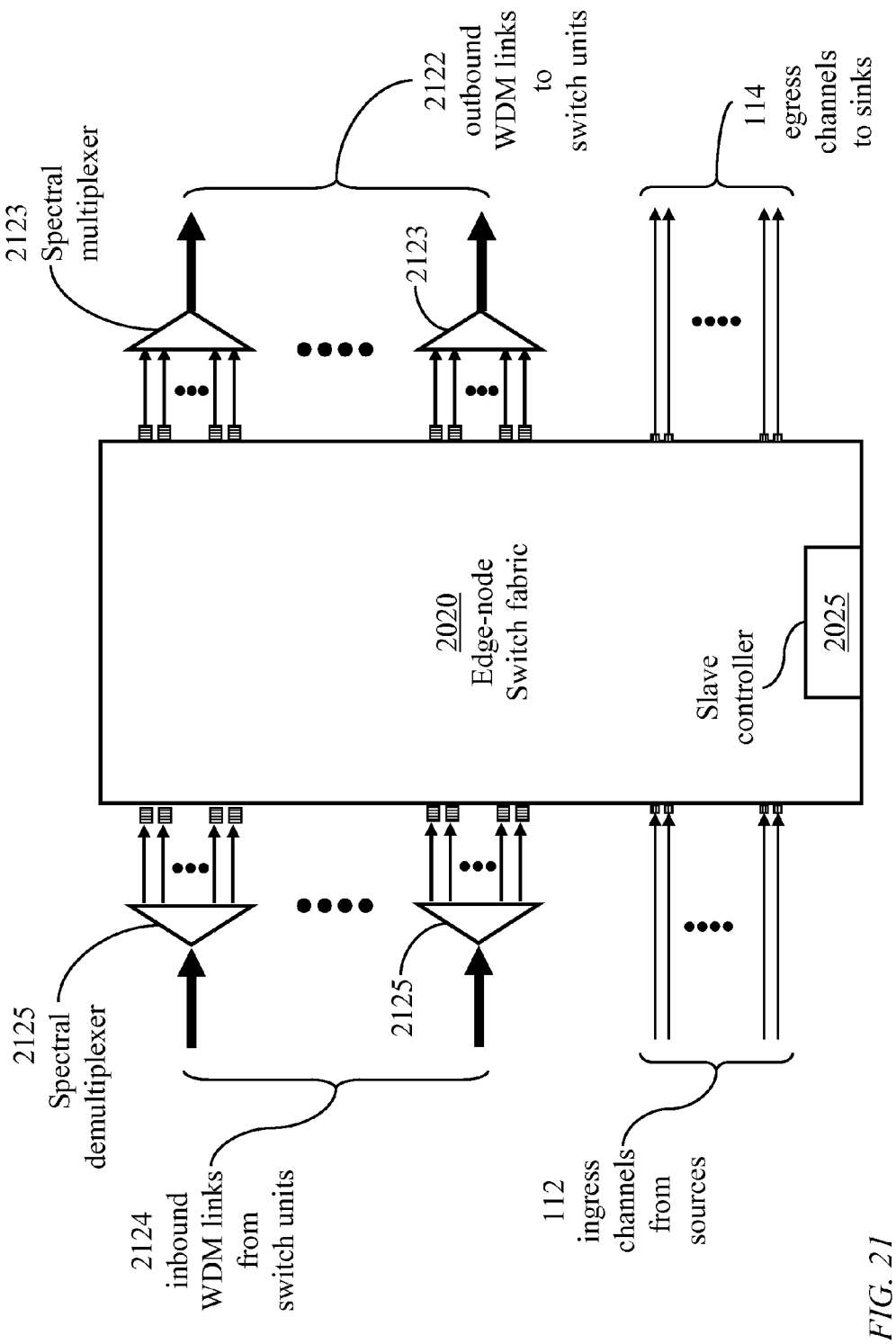
FIG. 21 illustrates an edge node connecting to WDM links, in accordance with an embodiment of the present invention.

As illustrated in FIG. 12, upstream channels 122 from an edge node 120 are multiplexed onto an upstream WDM link 1222 connecting to a wavelength router 1230 and a downstream WDM link 1228 carries downstream channels 124 directed to an edge node 120. Each inbound port 2036 of edge node 2000 has an optical-to-electrical converter and each outbound port 2038 has an electrical-to-optical converter (not illustrated). An edge node 120 may have a large number of upstream channels 122 and downstream channels 124. Thus, upstream WDM link 1222 may actually comprise a number of WDM links each carrying a smaller number of upstream channels 122. For example, with 1024 upstream channels 122 emanating from a single edge node 120 and 1024 downstream channels 124 terminating on the edge node, WDM link 1222 may be implemented as 16 WDM links each multiplexing 64 upstream channels 122 and WDM link 1228 may be implemented as 16 WDM links each multiplexing 64 downstream channels 124. Thus, an edge node 120 may have a number of spectral multiplexers each for multiplexing outputs of a number of electrical-to-optical convertors onto an upstream WDM link and a number of spectral demultiplexers for demultiplexing optical signals received through a downstream WDM link. FIG. 21 illustrates an edge node 120 equipped with a number of spectral multiplexers 2123 and a number of spectral demultiplexers 2125.

FIG. 22 illustrates a switch unit 160 for use in any of the networks of FIG. 1, FIG. 3, FIG. 5, FIG. 7, FIG. 12, and FIG. 13. The switch unit may have a photonic or electronic switching fabric 2262. Spectral demultiplexers 2225 (only one is illustrated) are employed at input and spectral multiplexers 2223 (only one is illustrated) may be employed at output. With an electronic fabric, optical-to-electrical converters are employed at input and electrical-to-optical converters are employed at output. A fast-switching optical switch fabric may be limited to a relatively small dimension; 64×64, for example.

Figure 23:
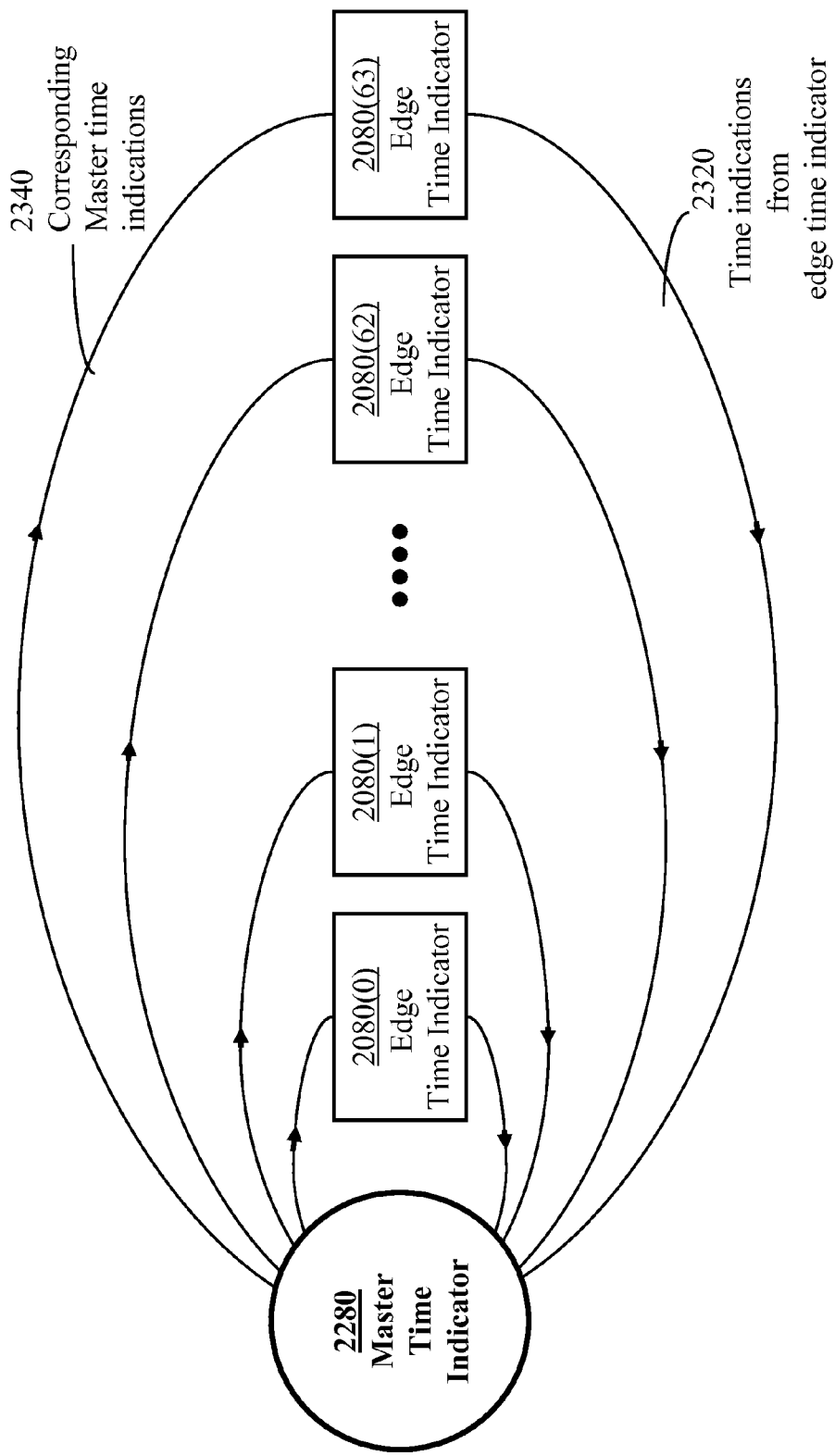
FIG. 23 illustrates exchange of time indications between a master controller of a switch unit and edge controllers to enable coherent switching at the switch units in any of the networks of FIG. 1, FIG. 3, FIG. 5, FIG. 7, FIG. 12, and FIG. 13, in accordance with an embodiment of the present invention.

A switch unit controller 2250 may be accessed through the switch fabric 2262 or through other arrangements known in the art. The switch controller 2250 receives connection requests from edge nodes 120, allocates time slots for each connection, and communicates relevant information to the edge nodes 120. A switch unit 160 does not buffer payload signals received from the edge nodes 120. Thus, to enable time-coherent switching, at a switch unit 160, of signals received from multiple edge nodes 120, outbound ports 2038 of the edge nodes are time-locked to the switch unit 160. The switch unit controller 2250 is coupled to a master time indicator 2280 and exchanges time indications with edge time indicators 2080 to time-lock outbound ports 2038 of each subtending edge node to the switch unit 160. FIG. 23 illustrates exchange of time indications between a master time indicator 2280 of a switch unit 160 and edge time indicators $\{2080(0), 2080(1), \ldots, 2080(63)\}$ to enable coherent switching at a switch unit in any of the networks of FIG. 1, FIG. 3, FIG. 5, FIG. 7, FIG. 12, and FIG. 13.

The edge controller 2050 has an edge processor and an edge scheduling module which includes a memory device storing processor executable instructions which cause the edge processor to implement time-locking and scheduling functions of an edge node. The switch unit controller 2250 has a switch-unit processor and a switch-unit scheduling module which includes a memory device storing processor executable instructions which cause the processor to implement time-locking and scheduling functions of a switch unit.

Exemplary Edge-Node Structure

Figure 24:
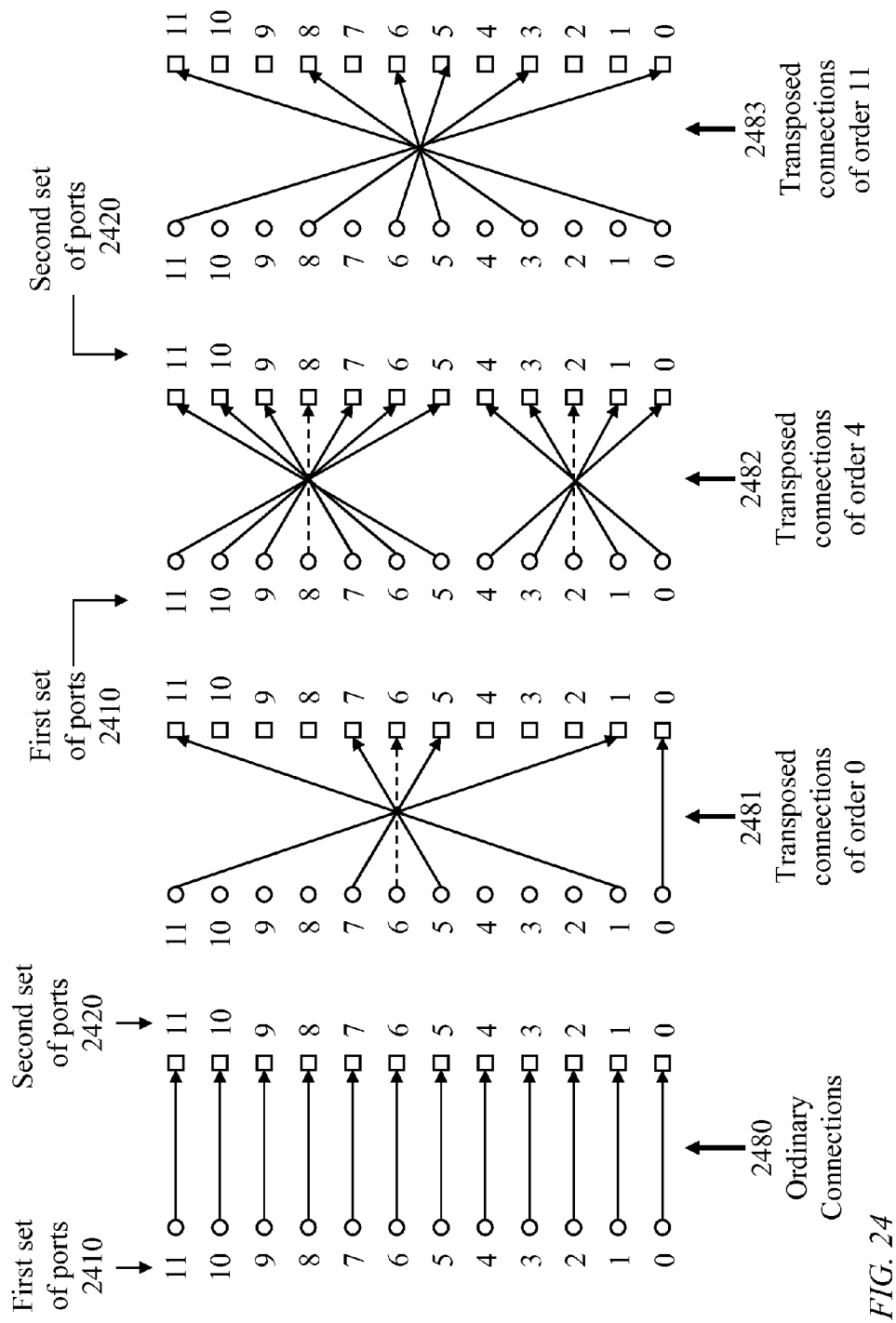
FIG. 24 illustrates ordinary and transposed connections used in switch configurations in accordance with an embodiment of the present invention.

FIG. 24 illustrates ordinary and transposed connections of a first set of ports 2410 having a number N>2 of ports and a second set of ports 2420 having N ports; N equals 12 in the exemplary case of FIG. 24. The N ports of the first set are indexed as $0, 1, \ldots, (N-1)$, and the N ports of the second set are likewise indexed as $0, 1, \ldots, (N-1)$. Thus, the ports of the first set are individually identified as $\{2410(0), 2410(1), \ldots, (2410(N-1)\}$ and the ports of the second set are individually identified as $\{2410(0), 2410(1), \ldots, (2410(N-1)\}$. The ports of the first set have one-to-one static connections to the ports of the second set. The first set of ports is said to have ordinary connections to the second set of ports if each port $2410(j)$ is connected to a likewise indexed port $2420(j)$, $0 \leq j < N$. The first set of ports is said to have transposed connections of order L to the second set of ports if each port $2410(j)$ is connected to a port $2420|L-j|$, $0 \leq j < N$, $0 \leq L < N$, where $|X|$ denotes $X_{modulo\ N}$, i.e., $|X|=X$, if $X \geq 0$, and $X=(N-X)$, if $X<0$. Thus, $|L-j|=L-j$, if $L \leq j$, and $|L-j|=(N-L+j)$, if $L<j$.

Four connection patterns are illustrated in FIG. 24. In a first pattern, the first set of ports 2410 has ordinary connections 2480 to the second set of ports 2420. In a second pattern, the first set of ports 2410 has transposed connections of order 0 to the second set of ports 2420. In a third pattern, the first set of ports 2410 has transposed connections of order 4 to the second set of ports 2420. In a fourth pattern, the first set of ports 2410 has transposed connections of order (N−1) to the second set of ports 2420.

Single-Rotator Circulating Switch

Figure 25:
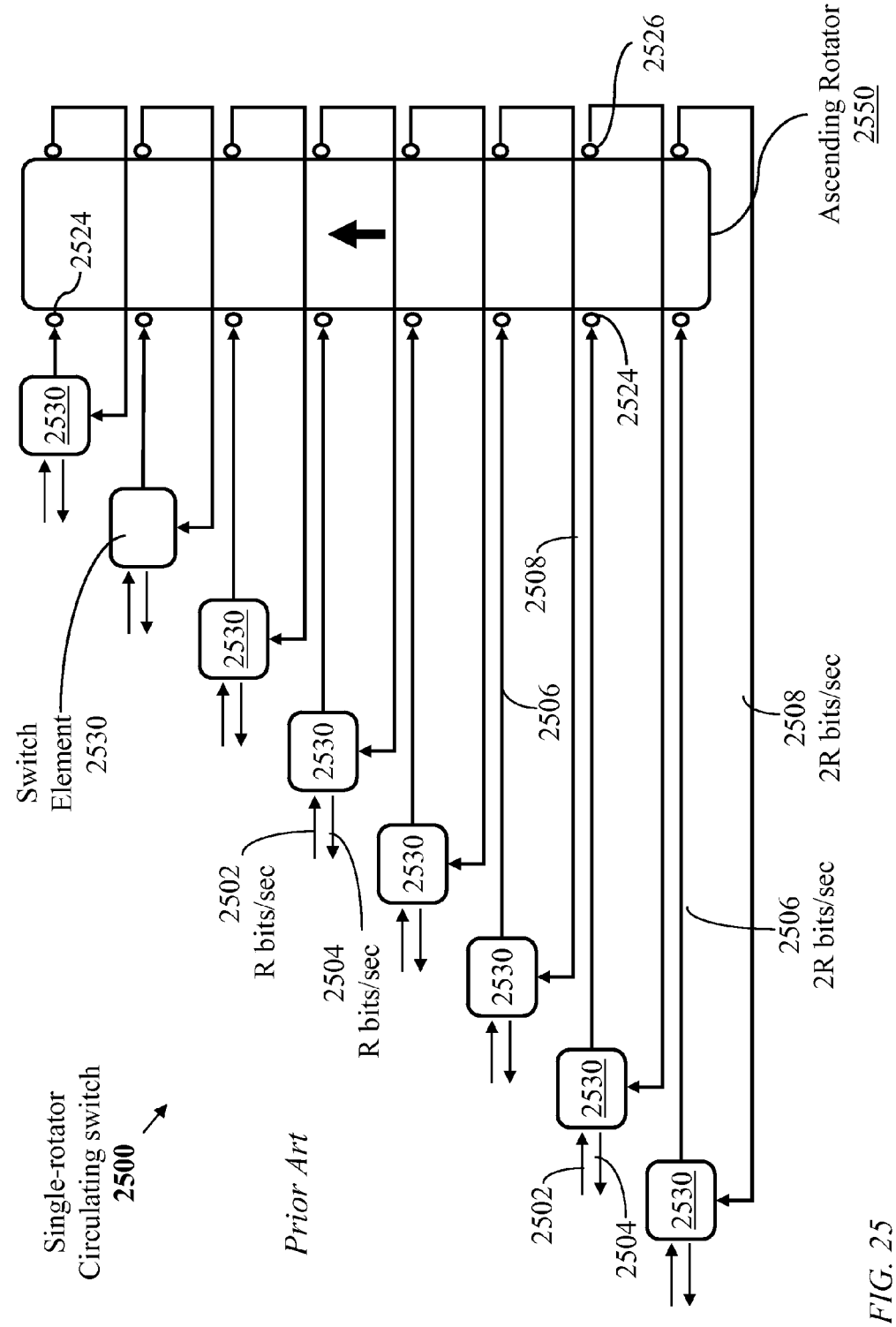
FIG. 25 illustrates a prior art single-rotator circulating switch which requires reordering of switched data segments of a data stream.

FIG. 25 illustrates an exemplary single-rotator circulating switch 2500 disclosed in U.S. Pat. No. 7,567,556. Circulating switch 2500 comprises eight switch elements 2530 and a single rotator 2550 having eight inlets 2524 and eight outlets 2526. Each switch element 2530 receives data from data sources (not illustrated) through an ingress channel 2502 and transmits data to data sinks (not illustrated) through an egress channel 2504. Each switch element connects to a respective inlet 2524 of rotator 2550 through an output channel 2506 and connects to a respective outlet 2526 of rotator 2550 through an input channel 2508. Each ingress channel 2502 has a capacity R bits per second, each egress channel 2504 has a capacity R, each output channel 2506 has a capacity of 2R and each input channel 2508 has a capacity of 2R. A typical value of R is 10 gigabits per second (Gb/s).

Switch elements 2530 are individually identified by indices $0, 1, \ldots, (N-1)$, where N=8 in the exemplary circulating switch 2500. An inlet 2524 connecting to a switch element of index j, $0 \leq j < N$ is further identified by the index j as 2524(j) and an outlet 2526 connecting to a switch element of index j is further identified by the index j as 2526(j). Thus the inlets 2524 are referenced as 2524(0) to 2524(N−1) and the outlets 2526 are referenced as 2526(0) to 2526(N−1). For brevity, a switch element 2530 of index j may be referenced as switch element j, an inlet 2524 of index j may be referenced as inlet j, and an outlet 2526 of index j may be referenced as outlet j.

Rotator 2550 may be an ascending rotator or a descending rotator. An ascending rotator 2550 connects an inlet j to an outlet $\{j+t\}_{modulo\ N}$ during time slot t of a repetitive time frame organized into N time slots. A descending rotator 2550 connects an inlet j to an outlet $\{j-t\}_{modulo\ N}$ during time slot t.

During time slot t, a switch element of index j may transfer data to a switch element $\chi = \{j+t\}_{modulo\ N}$ through an ascending rotator 2550. Thus, $t = \{\chi-j\}_{modulo\ N}$. If the transferred data is destined to a switch element k, $k \neq \chi$, the data is held in switch element $\chi$ until inlet $\chi$ connects to outlet k. Thus, a data unit written in switch element $\chi$ during time slot t is transferred to switch element k during a time slot $\tau$ where $\tau = \{k-\chi\}_{modulo\ N}$, and the delay D in transit switch element $\chi$ is determined as $D = \tau - t = (k+j-2\chi)_{modulo\ N}$. Thus, data transferred from switch element j to switch element k may be held in a transit switch element $\chi$ for a period of time determined by j, k, and $\chi$. A transit switch element 2530($\chi$) may be any switch element 2530 other than the originating switch element 2530(j) and the destination switch element 2530(k). Data units of a data stream from switch element j to switch element k may use more than one transit switch element $\chi$ and because of the dependency of the delay D on the transit switch elements, the data units may not be received at switch element k in the order in which the data units were sent from switch element j. Thus, data reordering at a receiving switch element 2530 is needed as described in the aforementioned U.S. Pat. No. 7,567,556.

Figure 26:
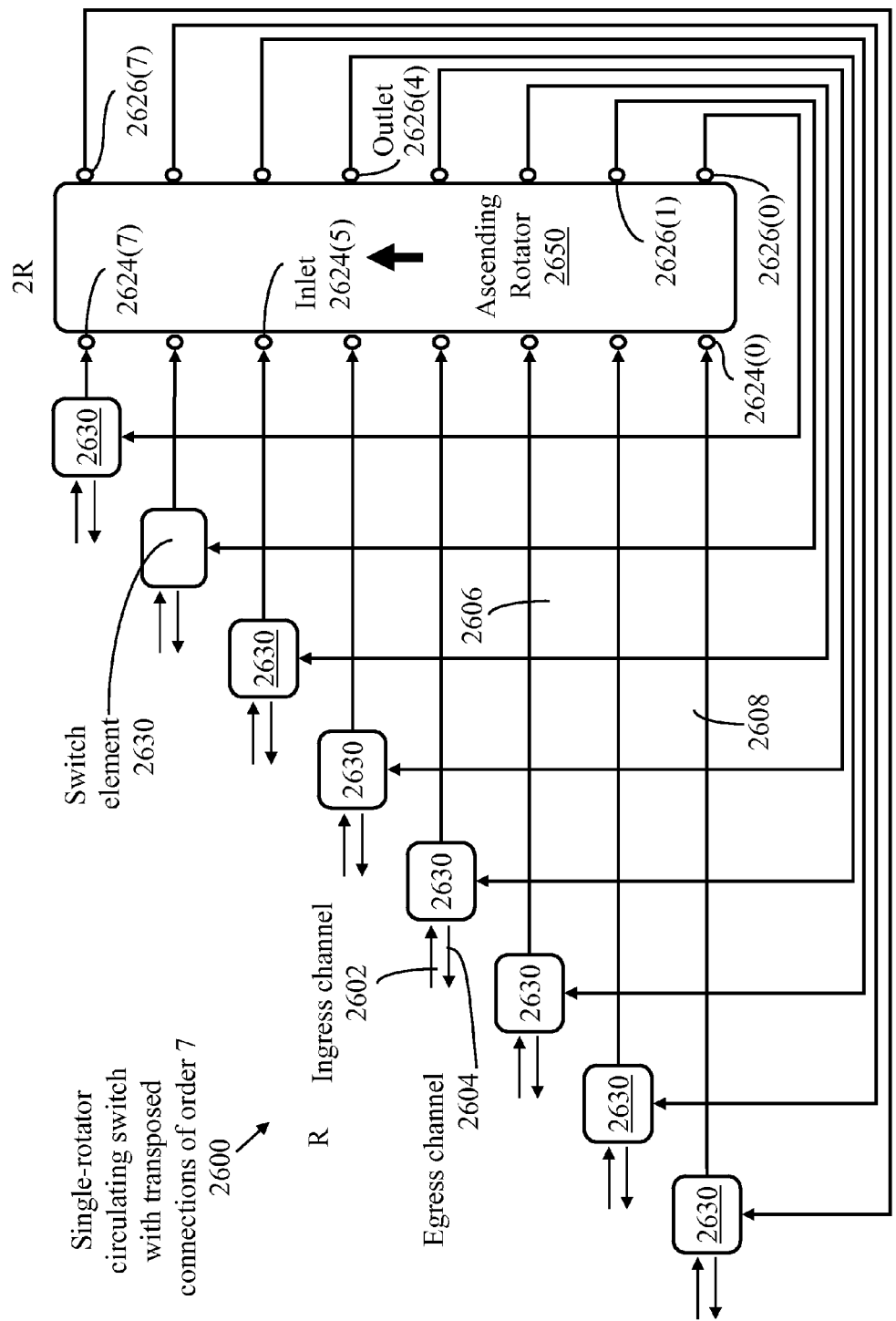
FIG. 26 illustrates a first configuration of a single-rotator circulating switch employing transposed connections for preserving sequential order of data segments of each data stream in accordance with an embodiment of the present invention.

FIG. 26 illustrates a first configuration of a single-rotator circulating switch 2600 employing transposed connections in order to preserve sequential order of data segments of each data stream. Circulating switch 2600 comprises eight switch elements 2630 and a single rotator 2650 having eight inlets 2624 and eight outlets 2626. Each switch element 2630 receives data from data sources (not illustrated) through an ingress channel 2602 and transmits data to data sinks (not illustrated) through an egress channel 2604. Each switch element 2630 connects to a respective inlet 2624 of rotator 2550 through an output channel 2606 and connects to a respective outlet 2626 of rotator 2650 through an input channel 2608. Each ingress channel 2602 has a capacity R, each egress channel 2604 has a capacity R, each output channel 2606 has a capacity of 2R and each input channel 2608 has a capacity of 2R.

Switch elements 2630 are individually identified by indices $0, 1, \ldots, (N-1)$, where N=8 in the exemplary circulating switch 2600. An inlet 2624 connecting to a switch element of index j, $0 \leq j < N$ is further identified by the index j as 2624(j) and an outlet 2626 connecting to a switch element of index j is further identified by the index j as 2626(j). Thus the inlets 2624 are referenced as 2624(0) to 2624(N−1) and the outlets 2626 are referenced as 2626(0) to 2626(N−1).

Switch elements 2630 have ordinary connections to inlets 2624 where a switch element 2630(j) connects to inlet 2624(j), $0 \leq j < N$. However, outlets 2626 have transposed connections to switch elements 2630 where an outlet 2626(j) connects to switch element 2630 of index $(L-j)_{modulo\ N}$, $0 \leq j < N$, where L=7 in the exemplary network 2600. The use of the transposed connections ensures proper sequential order of data segments of each data stream, where a data stream is defined according to an originating switch element 2630 and a terminating switch element 2630.

Figure 27:
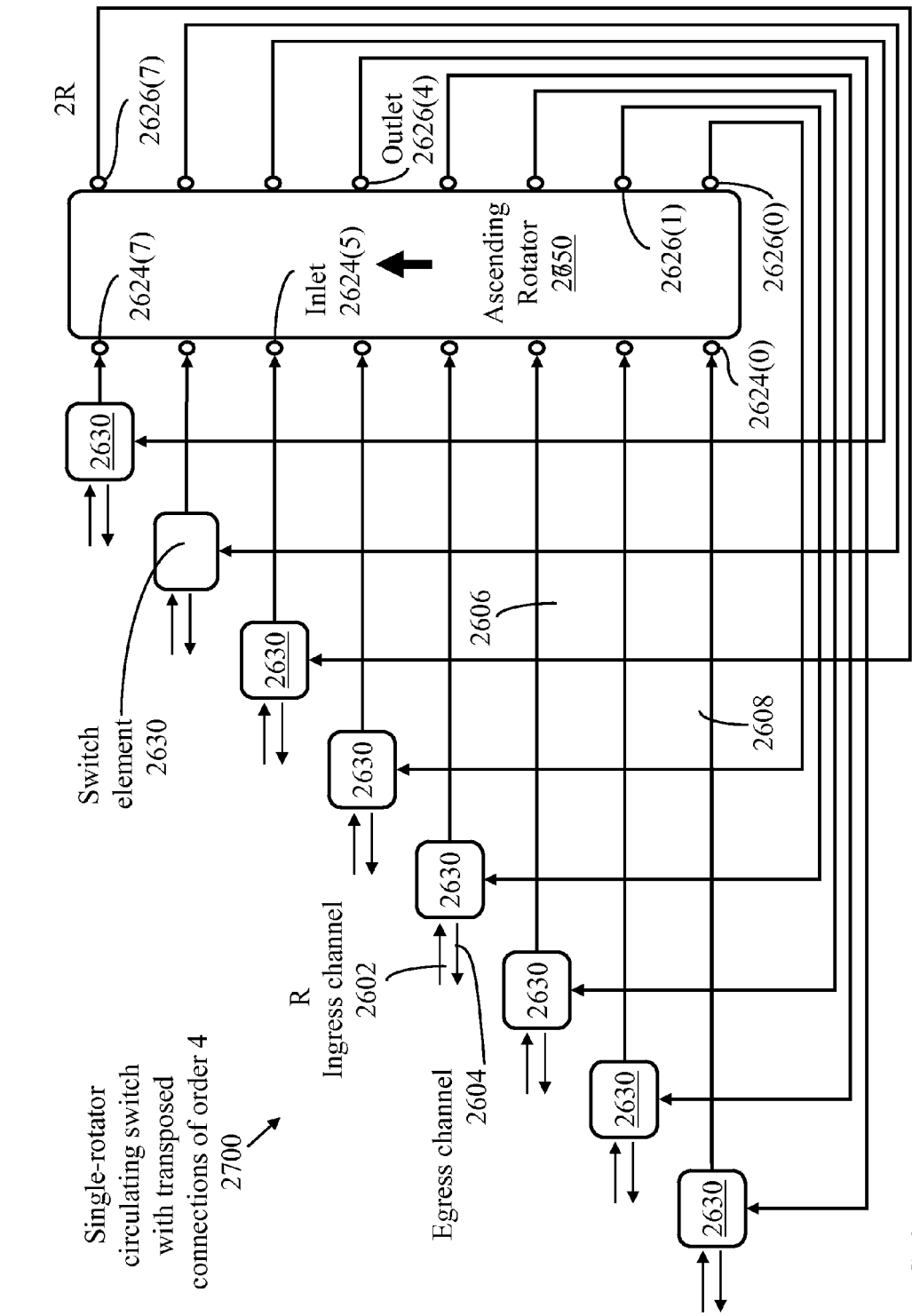
FIG. 27 illustrates a second configuration of a single-rotator circulating switch employing transposed connections for preserving sequential order of data segments of each data stream in accordance with an embodiment of the present invention.

FIG. 27 illustrates a configuration of a single-rotator circulating switch 2700 in which switch elements 2630 have transposed connections to inlets 2624 where a switch element 2630(j) connects to inlet 2624 of index $(L-j)_{modulo\ N}$, $0 \leq j < N$, L=7. However, outlets 2626 have ordinary connections to switch elements 2630 where an outlet 2626(j) connects to switch element 2630(j), $0 \leq j < N$. The use of the transposed connections ensures proper sequential order of data segments of each data stream.

Figure 28:
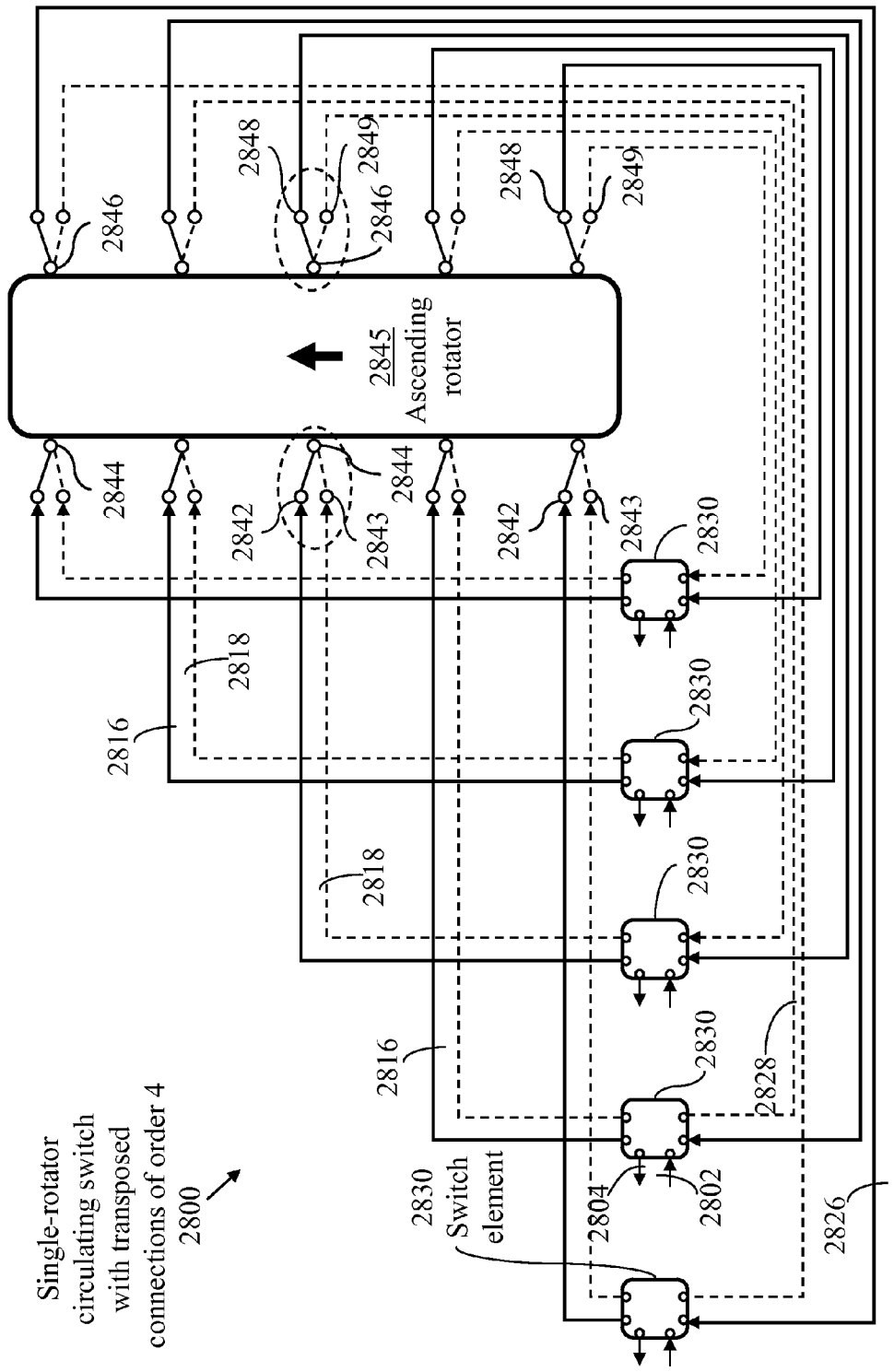
FIG. 28 illustrates a configuration of a uniphase single-rotator circulating switch employing transposed connections for preserving sequential order of data segments of each data stream, where switch elements connect to a single rotator through inlet selectors and outlet selectors, for use as an edge node in any of the networks of FIG. 1, FIG. 3, FIG. 5, FIG. 7, FIG. 12 and FIG. 13, in accordance with an embodiment of the present invention.

FIG. 28 illustrates an exemplary single-rotator circulating switch 2800 which comprises five switch elements 2830 and a single rotator 2845 having five inlets 2844 and five outlets 2846. Each switch element 2830 receives data from data sources (not illustrated) through an external input channel 2802 and transmits data to data sinks (not illustrated) through an external output channel 2804. Each switch element connects to a respective inlet 2844 of rotator 2845 through two internal output channels 2816 and 2818, and connects to a respective outlet 2846 through two internal input channels 2826 and 2828. Each of external input channels 2802, external output channels 2804, internal output channels 2816, 2818, and internal input channels 2826, 2828 has the same capacity of R bits/second (for example R=10 Gb/s). Each switch unit 2830 has an external input port for receiving data through external channel 2802, an external output port for transmitting data through external channel 2804, two internal output ports for transmitting data through internal output channels 2816 and 2818, and two internal input ports for receiving data through internal input channels 2826 and 2828. Each port of a switch unit may include a short buffer sufficient to hold one data unit (data segment).

An inlet selector 2835 is provided at each inlet 2844 and an output selector 2855 is provided at each outlet 2846. An inlet selector 2835 has two inlet ports 2842 and 2843 alternately connecting one of two channels 2816 and 2818 originating from a respective switch element 2830 to an inlet 2844. An outlet selector 2855 has two outlet ports 2848 and 2849 alternately connecting an outlet 2846 to one of two channels 2826 and 2828 terminating on a respective switch element 2830.

Switch elements 2830 are individually identified by indices $0, 1, \ldots, (N-1)$, where $N=8$ in the exemplary circulating switch 2800. In general, the number N of switch elements exceeds 2 and may have an upper bound dictated by transit delay. A practical upper bound of N would be of the order of 2000. An inlet 2844 connecting to a switch element of index j, $0 \leq j < N$ is identified by the index j as 2844(j) and an outlet 2846 connecting to a switch element of index j is identified by the index j as 2846(j).

The switch elements 2830 have ordinary connections to the inlets 2844 so that a switch element 2830(j) connects to a selector 2835 of inlet 2844(j). The outlets 2846 have transposed connections to the switch elements 2830 so that a selector 2855 of outlet $(L-j)_{modulo\ N}$ connects to switch element 2830(j). In the exemplary configuration of FIG. 28, $0 \leq j < N$, $0 \leq L < N$, and $L=7$. For brevity, hereinafter, a switch element 2830 of index j may be referenced as switch element j, an inlet 2844 of index j may be referenced as inlet j, and an outlet 2846 of index j may be referenced as outlet j.

Using an ascending rotator 2845, inlet j connects to outlet $\chi$, where $\chi = \{j+t\}_{modulo\ N}$ during time slot t. Thus, $t = \{\chi - j\}_{modulo\ N}$. Outlet $\chi$ connects to switch element $(L-\chi)$. During time slot t, switch element j may transfer data to a switch element $(L-\chi)$. If the transferred data is destined to a switch element k, $k \neq \chi$, the data is held in switch element $(L-\chi)$ until inlet $(L-\chi)$ connects to outlet $(L-k)$, noting that outlet $(L-k)$ connects to switch element k. Thus, a data unit written in switch element $(L-\chi)$ during time slot t is transferred to outlet $(L-k)$ during a time slot $\tau$ where $\tau = \{\chi - k\}_{modulo\ N}$. The delay D in transit switch element $\chi$ is determined as $D = \tau - t = (j-k)_{modulo\ N}$. Thus, data transferred from switch element j to outlet k may be held in a transit switch element $(N-\chi)$ for a period of time D which is independent of $\chi$ and determined only by j and k.

Data units of a data stream from switch element j to switch element k may use more than one transit switch element $\chi$ and because of the independence of the transit delay D of the transit switch element $\chi$ used, data units from switch element j are received at switch element k in the order in which the data units were sent from switch element j.

Notably, in the configuration of FIG. 28, switch element j connects to both inlet ports 2842 and 2843 of an inlet selector 2835 of inlet j and switch element j connects to both outlet ports 2848 and 2849 of an outlet selector 2855 of outlet $(N-j)$. A data stream from switch element j to switch element k, $0 \leq j < N$, $0 \leq k < N$, $k \neq j$, may be routed through either of two simple paths. A first simple path traverses a channel 2816 to inlet j and a channel 2826 from outlet $(L-k)$ to switch element k. A second simple path traverses a channel 2818 to inlet j and a channel 2828 from outlet $(L-k)$ to switch element k. The two simple connections take place during time slot $t = \{L-j-k\}_{modulo\ N}$. The data stream from switch element j to a switch element k may also be routed through either of two sets of compound paths. A path in the first set traverses a channel 2816 from switch element j to inlet j, a channel 2826 from an outlet $\chi$, $0 \leq \chi < N$, $\chi \neq j$, to switch element $(L-\chi)$, a channel 2816 from switch element $(L-\chi)$ to inlet $(L-\chi)$, and a channel 2826 from outlet $(L-k)$ to switch element k. A path in the second set traverses a channel 2818 from switch element j to inlet j, a channel 2828 from outlet $\chi$ to switch element $(L-\chi)$, a channel 2818 from switch element $(L-\chi)$ to inlet $\chi$, and a channel 2828 from outlet $(L-k)$ to switch element k. The transit delay D is determined as $D = \{j-k\}_{modulo\ N}$ for either of the two paths and the configuration 2800 provides uniphase paths for a pair of originating and destination switch units 2830.

Figure 29:
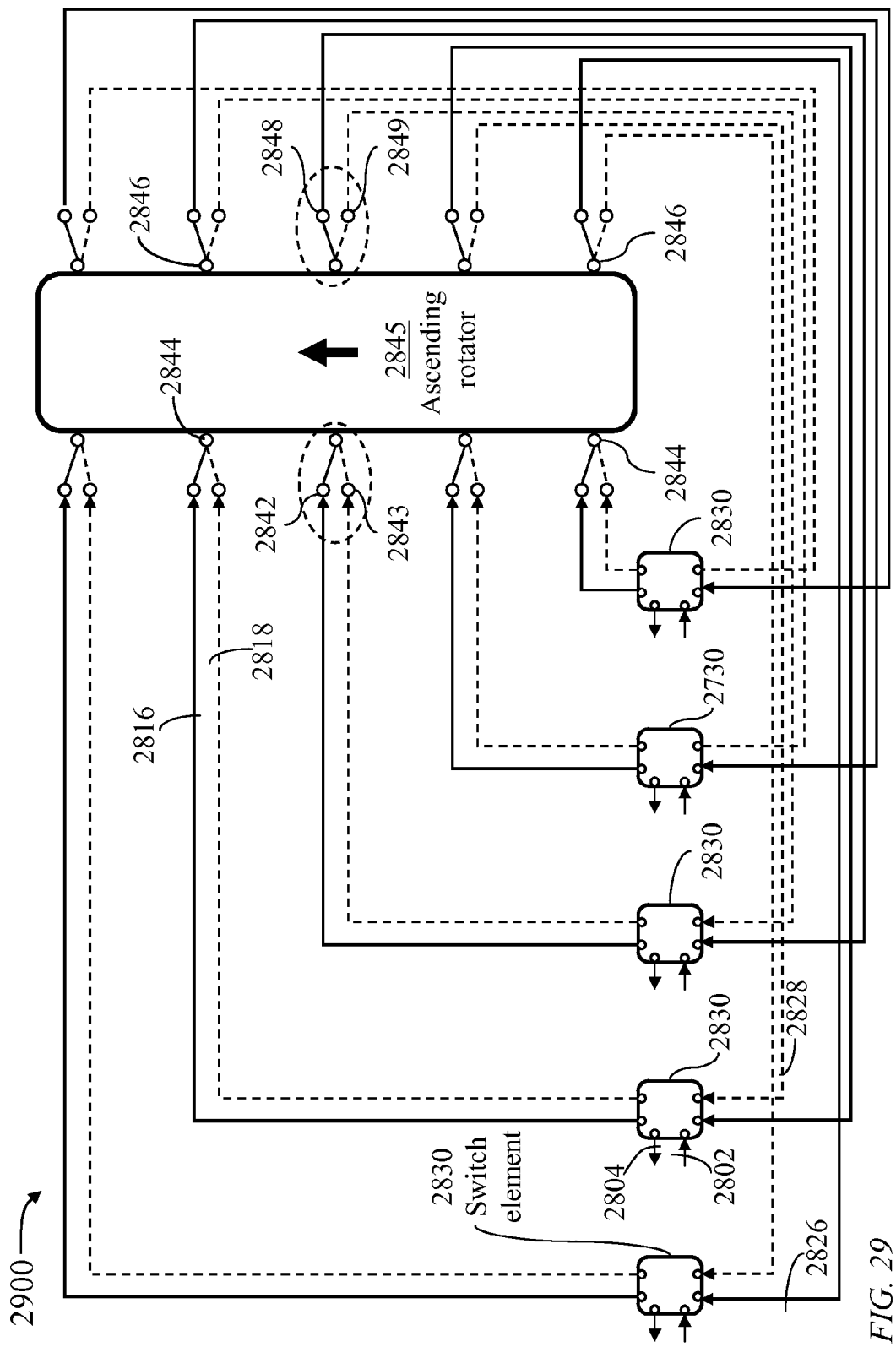
FIG. 29 illustrates an alternate configuration of the uniphase single-rotator circulating switch of FIG. 28, in accordance with an embodiment of the present invention.

FIG. 29 illustrates an alternate configuration of the uniphase single-rotator circulating switch of FIG. 28 where the switch elements 2830 have transposed connections to the inlets 2844 so that a switch element 2830(j) connects to a selector 2835 of inlet 2844 of index $(L-j)_{modulo\ N}$. In the exemplary configuration of FIG. 29, $0 \leq j < N$, $0 \leq L < N$, and $L=7$. The outlets 2846 have ordinary connections to the switch elements 2830 so that a selector 2855 of outlet (j) connects to switch element 2830(j).

Figure 30:
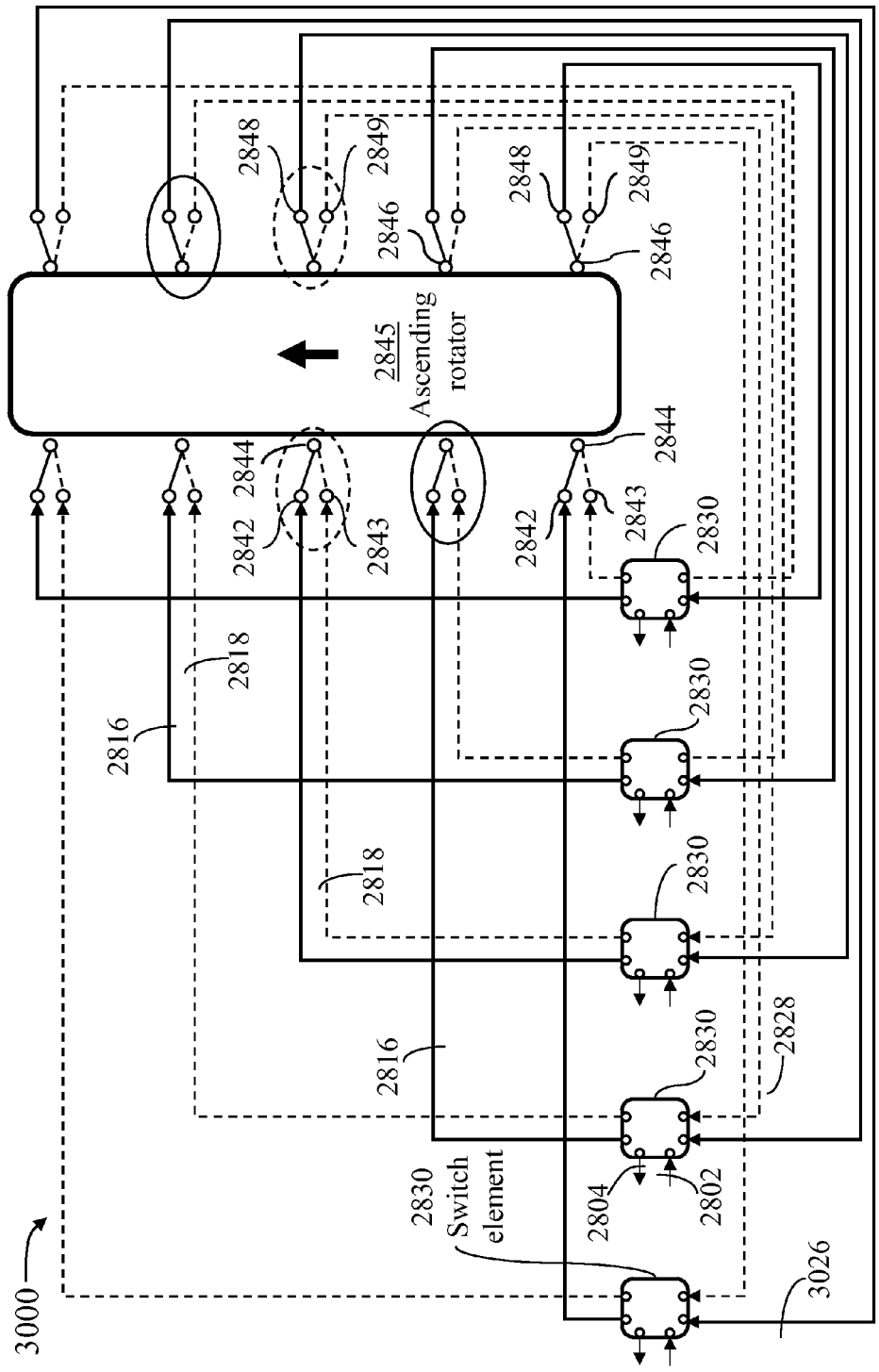
FIG. 30 illustrates a two-phase single-rotator circulating switch derived from the uniphase single-rotator circulating switch of FIG. 28 by rearranging switch-element connectivity to the inlet selectors and outlet selectors, in accordance with an embodiment of the present invention.

FIG. 30 illustrates a configuration 3000 in which the switch elements 2830 have ordinary connections to inlet ports 2842 of inlet selectors 2835 and transposed connections to inlet ports 2843 of inlet selectors 2835. Outlet ports 2848 of outlet selectors 2855 have transposed connections to the switch units 2830 and outlet ports 2849 of outlet selectors 2855 have ordinary connections to the switch units 2830. Thus, a switch element 2830(j) connects to inlet port 2842 of an inlet selector 2835 of inlet 2844(j) through a channel 2816 and inlet port 2823 of inlet selector 2835 of inlet 2844|L-j|, where |L-j| denotes $(L-j)_{modulo\ N}$, through a channel 2818, $0 \leq j < N$, $L=7$. Outlet port 2848 of an outlet selector 2855 of outlet 2846(j) connects to switch element 2830|L-j| through a channel 2826 and outlet port 2849 of an outlet selector of outlet 2846(j) connects to switch element 1830(j) through a channel 2828.

A data stream from switch element j to switch element k, $0 \leq j < N$, $0 \leq k < N$, $k \neq j$, may be routed through either of two simple paths. A first simple path traverses a channel 2816 to inlet j and a channel 2826 from outlet $(L-k)$ to switch element k. A second simple path traverses a channel 2818 to inlet $(L-j)$ and a channel 2828 from outlet k to switch element k. The first simple connection takes place during time slot $t = \{L-j-k\}_{modulo\ N}$ and the second simple connections takes place during time slot $t = \{j+k-L\}_{modulo\ N}$. The data stream from switch element j to a switch element k may also be routed through either of two sets of compound paths. A path in the first set traverses a channel 2816 from switch element j to inlet j, a channel 2826 from an outlet $\chi$, $0 \leq \chi < N$, $\chi \neq j$, to switch element $(L-\chi)$, a channel 2816 from switch element $(L-\chi)$ to inlet $(L-\chi)$, and a channel 2826 from outlet $(L-k)$ to switch element k. A path in the second set traverses a channel 2818 from switch element j to inlet $(L-j)$, a channel from an outlet $\chi$ to switch element $(L-\chi)$, a channel 2818 from switch element $(L-\chi)$ to inlet $\chi$, and a channel 2828 from outlet $(L-k)$ to switch element k. The transit delay is $D = \{j-k\}_{modulo\ N}$ for the first path and $D = \{k-j\}_{modulo\ N}$ for the second phase. Thus configuration 3000 provides two-phase paths for each pair of originating and destination switch units 2830 and a controller of the originating switch element 2830 may select a path of lower transit delay. The first set of path is preferred if $\{j-k\}_{modulo\ N}$ is less than $\lfloor (N+1)/2 \rfloor$, where $\lfloor y \rfloor$ denotes the integer part of any real number y; otherwise the second set of paths is preferred. For example, with $j=6$ and $k=0$, any compound path in the first set of paths has a transit delay $D_1 = \{6-0\}_{modulo\ 8} = 6$ time slots and any compound path in the second set of paths has a transit delay $D_1 = \{0-6\}_{modulo\ 8} = 2$ time slots; the second path may be selected.

Figure 31:
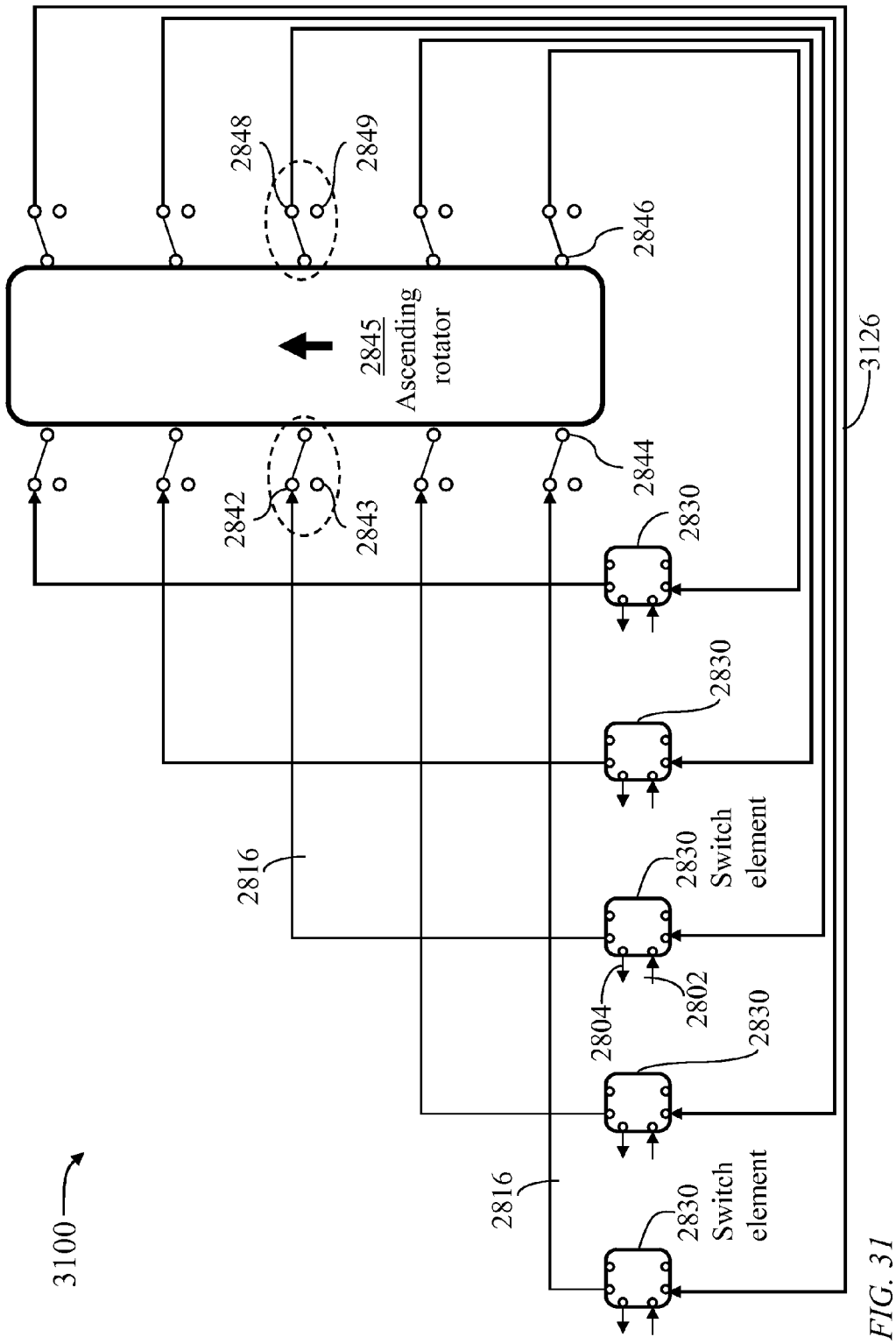
FIG. 31 illustrates connectivity of the two-phase single-rotator circulating switch of FIG. 30 during a first part of a time slot.

FIG. 31 illustrates a first connectivity of the two-phase single-rotator circulating switch of FIG. 30 sustaining the first set of compound paths described above. The first connectivity is effective during a first part of a time slot.

Figure 32:
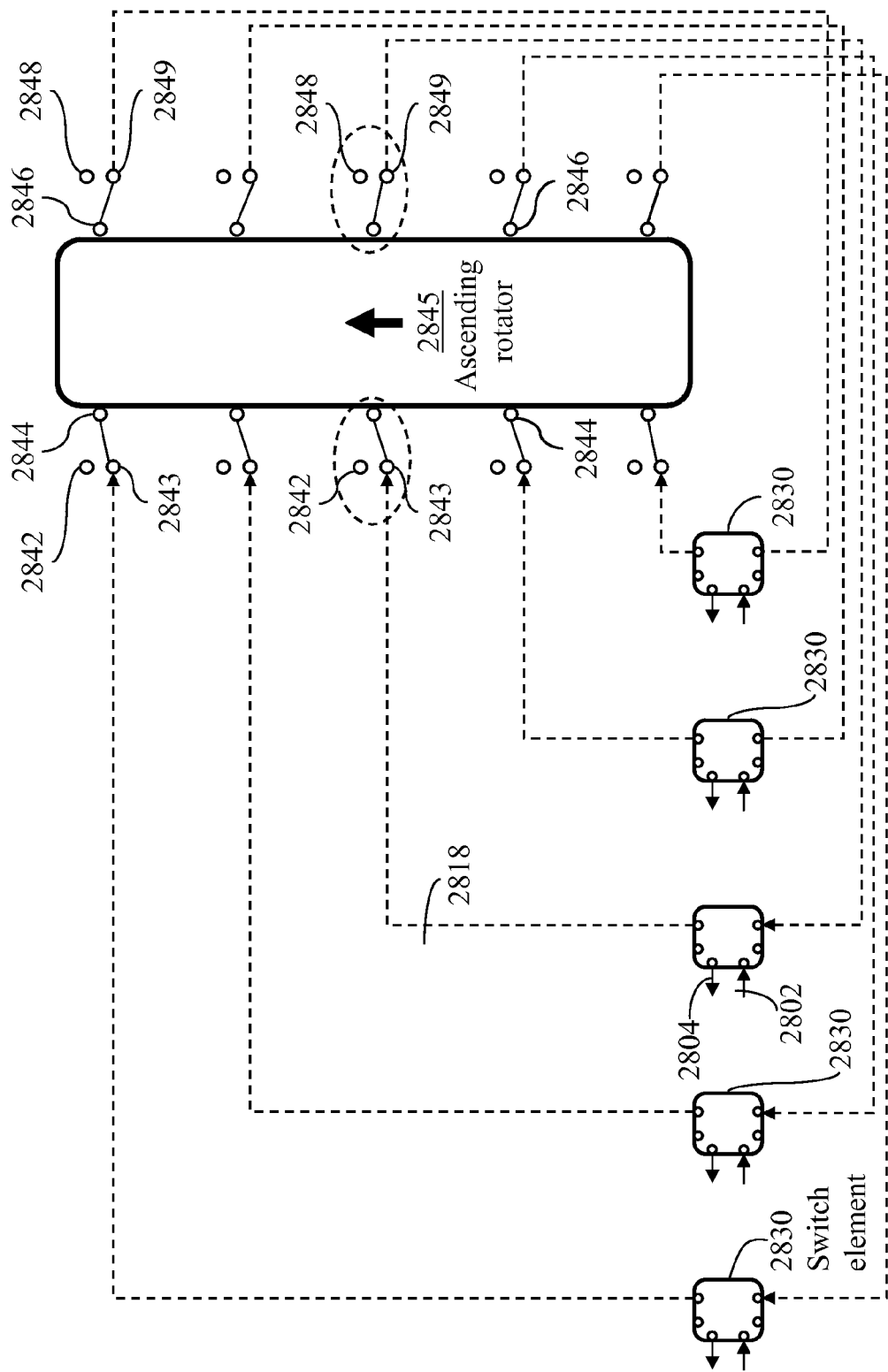
FIG. 32 illustrates connectivity of the two-phase single-rotator circulating switch of FIG. 30 during a second part of a time slot.

FIG. 32 illustrates a second connectivity of the two-phase single-rotator circulating switch of FIG. 30 sustaining the second set of compound paths described above. The second connectivity is effective during a second part of a time slot.

Figure 33:
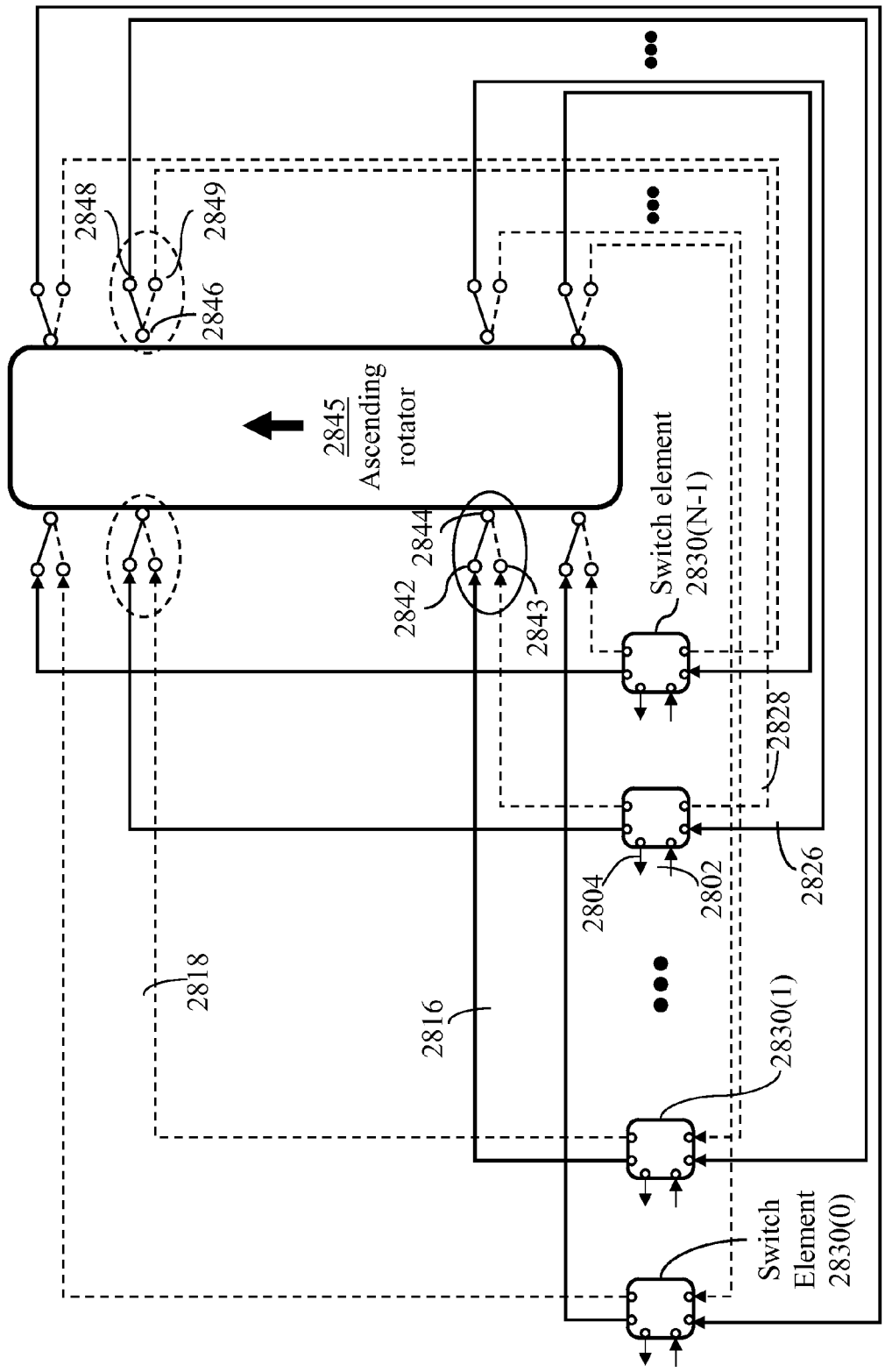
FIG. 33 illustrates a two-phase single-rotator circulating switch having an arbitrary number of switch elements and preserving sequential order of data segments of each data stream, in accordance with an embodiment of the present invention.

FIG. 33 illustrates a two-phase single-rotator circulating switch 3300 having an arbitrary number N>2 of switch elements and preserving sequential order of data segments of each data stream. The N switch elements has ordinary connections to N inlet ports 2842, transposed connections to N inlet ports 2843, transposed connections from N outlet ports 2848, and ordinary connections from outlet ports 2849.

Figure 34:
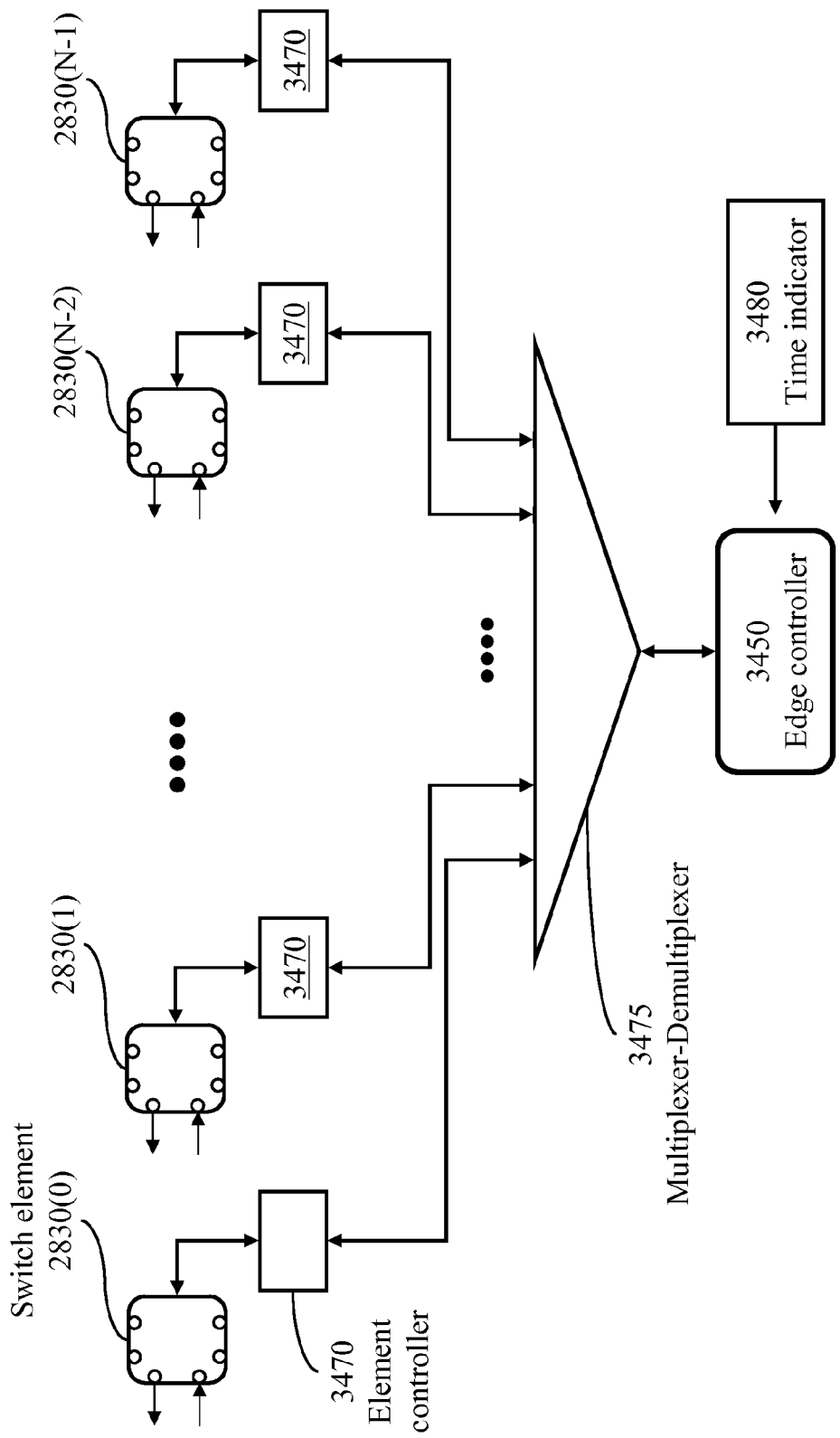
FIG. 34 illustrates a control system of the single-rotator circulating switch of FIG. 33.

FIG. 34 illustrates a control system of the single-rotator circulating switch of FIG. 33. Each switch element 2830 has an element controller 3470 which communicates with an edge controller 3450. A control time frame is organized into N equal control time slots with each control time slot allocated to a respective switch-element controller 3470 for two-way communications with the edge controller 3480. A switch element controller 3470 may be allocated a specific control time slot for transmitting control signals to the edge controller 3480 and a different control time slot for receiving control signals from the edge controller.

Figure 35:
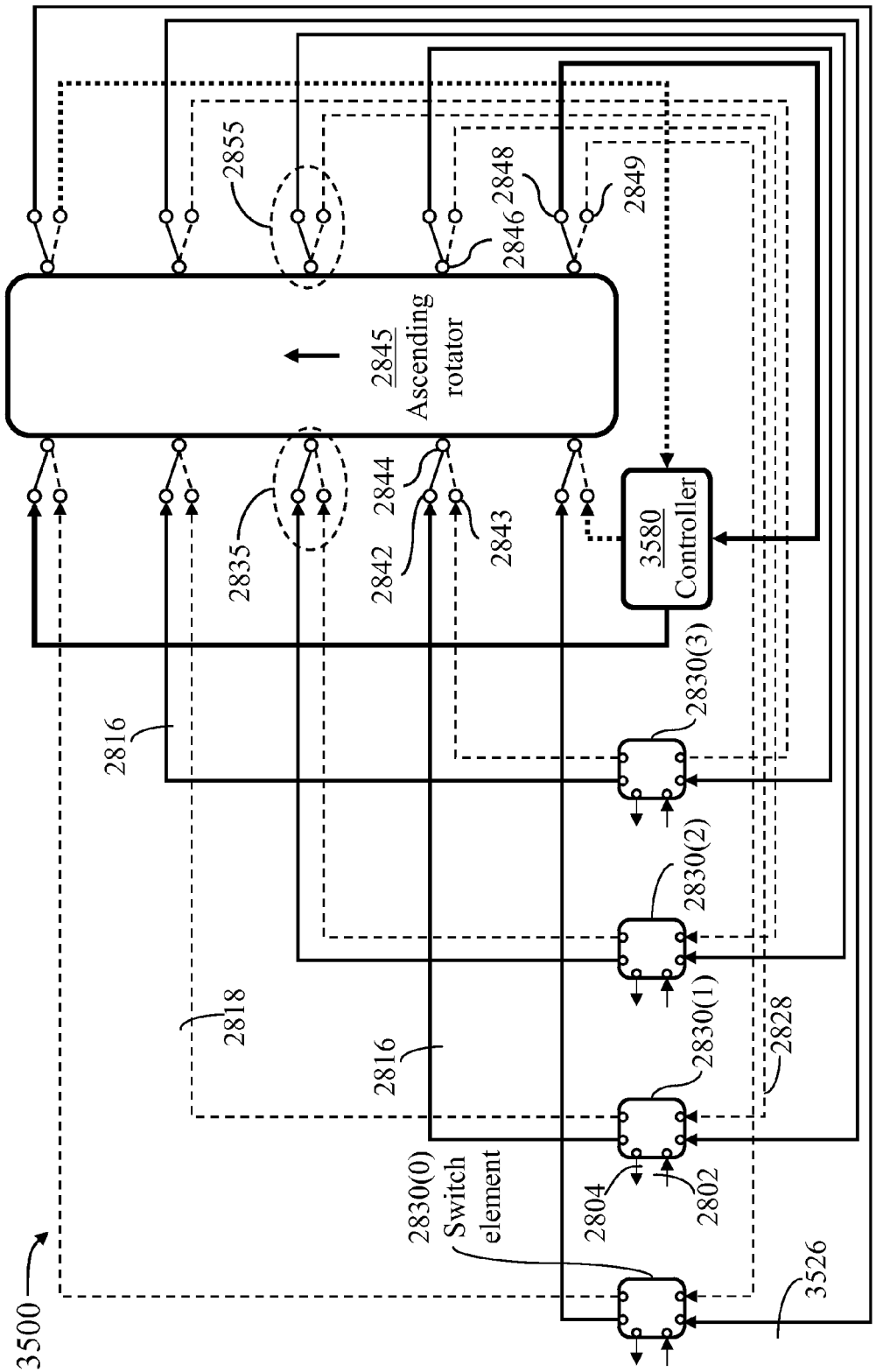
FIG. 35 illustrates a two-phase single-rotator circulating switch having transposed connections to a single rotator and employing a controller accessible through the single rotator, in accordance with an embodiment of the present invention.

FIG. 35 illustrates a two-phase single-rotator circulating switch having five switch elements 2830 with transposed connections of order 4, and employing a controller 3580 accessible through the single rotator. Each switch element is allocated a time slot for communicating with the controller 3580.

Figure 36:
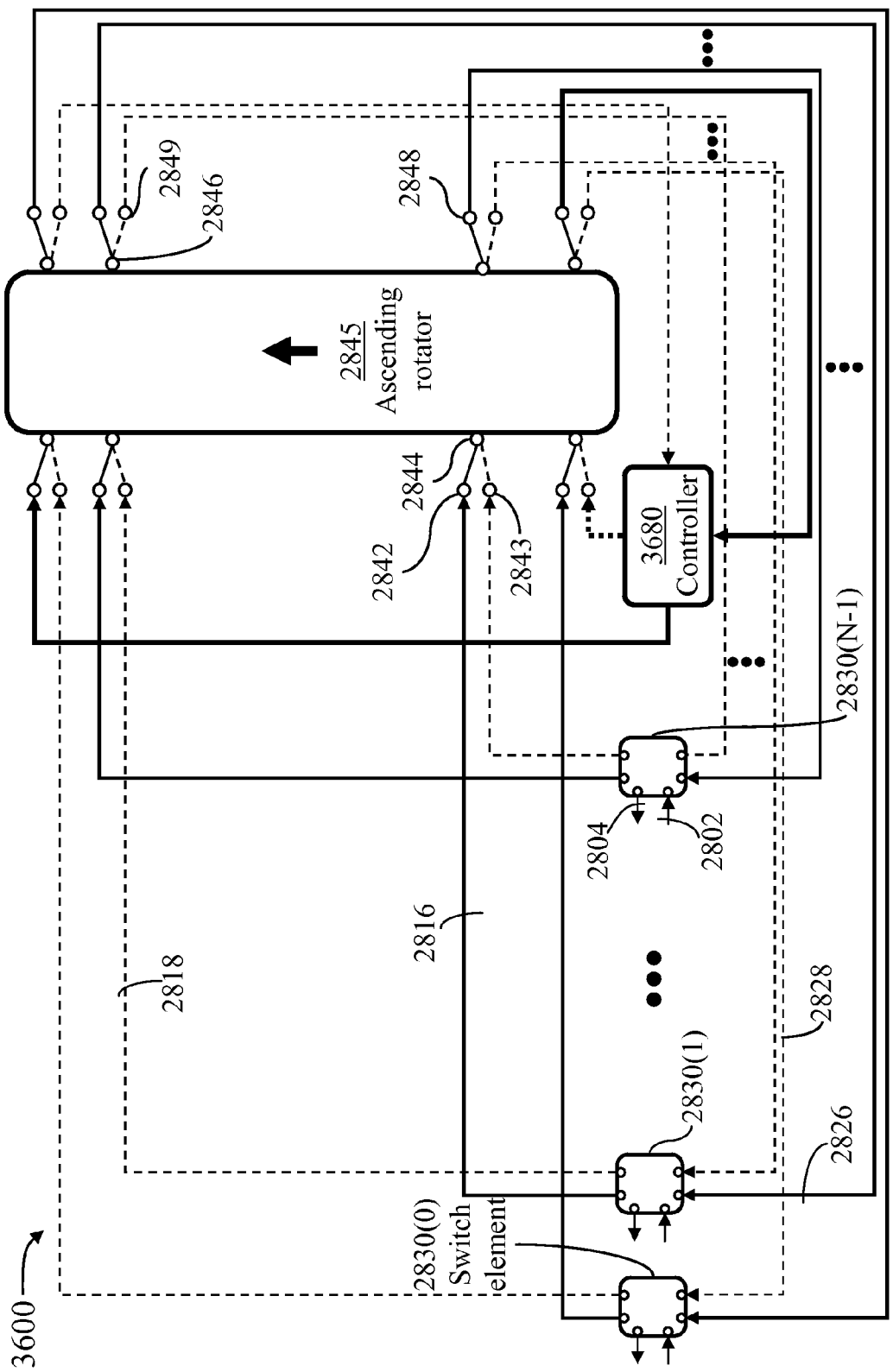
FIG. 36 illustrates a two-phase single-rotator circulating switch, with an arbitrary number of switch elements, having transposed connections to a single rotator and employing a controller accessible through the single rotator, in accordance with an embodiment of the present invention.

FIG. 36 illustrates a two-phase single-rotator circulating switch with an arbitrary number N>2 of switch elements having transposed connections of order L=(N−1) and employing a controller accessible through the single rotator. Each switch element is allocated a time slot for communicating with the controller 3680.

FIG. 37 tabulates data-transfer timing of the two-phase single-rotator circulating switch of FIG. 33. With static ordinary connections from the switch elements to single rotator and static transposed connections from the single rotator to the switch elements, a switch element j connects to inlet j (inlet port 2842($j$)) and with an ascending rotator 2845, inlet j connects to outlet ($j+t_1$) during a first part of a time slot $t_1$, $0 \leq t_1 < N$. Outlet ($j+t_1$) connects to a transit (intermediate) switch element 2830 of index (L−($j+t_1$)). Switch element (L−($j+t_1$)) has a channel to inlet port 2842 of inlet (L−($j+t_1$)). In order to reach destination switch element 2830($k$), transit data in switch element (L−($j+t_1$)) is transferred from inlet (L−($j+t_1$)) to outlet (L−k) during a time slot $t_2$=(L−k)−(L−($j+t_1$))=($j$−k+$t_1$). Thus, the transit delay is $t_2$−$t_1$=$j$−k.

Likewise, with static transposed connections from the switch elements to single rotator and static ordinary connections from the single rotator to the switch elements, a switch element j connects to inlet (L−j) and with an ascending rotator 2845, inlet (L−j) connects to outlet (L−j+$t_1$) during a first part of a time slot $t_1$, $0 \leq t_1 < N$. Outlet (L−j+$t_1$) connects to a transit (intermediate) switch element 2830 of index (L−j+$t_1$). Switch element (L−j+$t_1$) has a channel to inlet port 2842 of inlet (j−$t_1$). In order to reach destination switch element 2830($k$), transit data in switch element (L−j+$t_1$) is transferred from inlet (j−$t_1$) to outlet k during a time slot $t_2$=k−j+$t_1$. Thus, the transit delay is $t_2$−$t_1$=k−j.

During a rotation cycle, each inlet of rotator 2845 connects to each outlet during a time slot of predefined duration. Thus, rotator 2845 completes a rotation cycle of N time slots. Controller 3680 receives control signals from the switch elements 2830, schedules exchange of data among the switch elements, and communicates data-transfer schedules to the switch elements 2830. A scheduling time frame having a number Γ of time slots may be used to facilitate data-transfer scheduling. The number Γ is at least equal to the number N of rotator inlets which is also the number of time slots in a rotation cycle. To simplify communications between controller 3680 and individual controllers (not illustrated) of the switch elements 2830, the switch elements may be allocated non-overlapping control time slots within the scheduling time frame. With a large value of N, 1024 for example, the number Γ of time slots in a scheduling time frame may be selected to equal the number N of time slots of the rotation cycle. However, the number Γ may be any arbitrary integer exceeding N, and may substantially exceed N.

Figure 38:
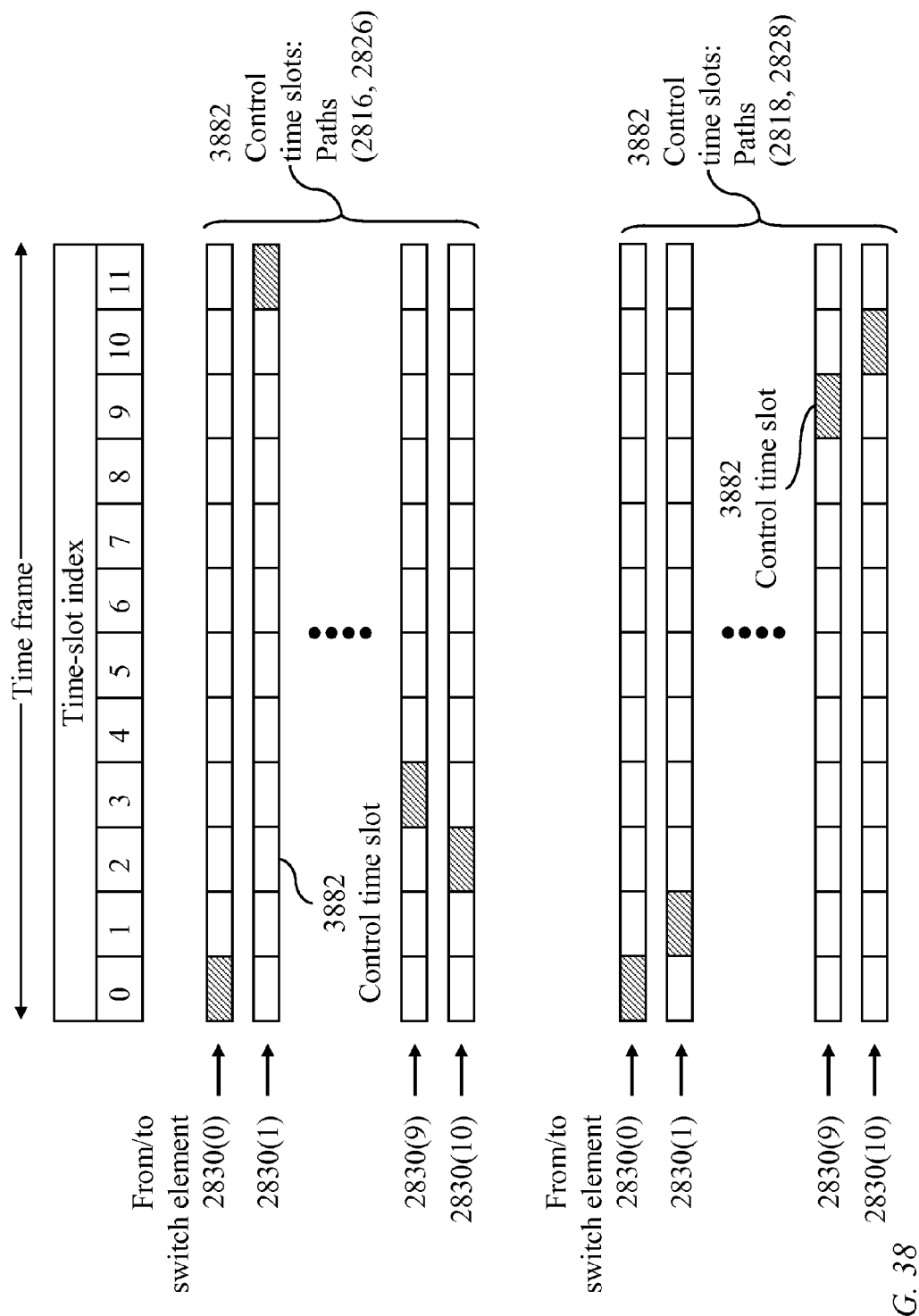
FIG. 38 illustrates allocation of control time slots for the two-phase single-rotator circulating switch of FIG. 37, in accordance with an embodiment of the present invention.

FIG. 38 illustrates an exemplary allocation of control time slots for the two-phase single-rotator circulating switch of FIG. 36 for a case where Γ=N=12. The controller 3680 has a channel 2816 to inlet 2844(N−1), a channel 2818 to inlet 2844(0), a channel 2826 from outlet 2846(0), and a channel 2828 from outlet 2846(N−1). Controller 3660 replaces switch element 2830(N−1). Each switch element 2830($j$), $0 \leq j < $(N−2), has a first path to controller 3680 traversing channels 2816 and 2826, and a second path traversing channels 2818 and 2828. As illustrated in FIG. 37, a switch element 2830($j$) has a first path to a switch element 2830 of index $\{L-j-t_1\}_{modulo\ N}$, and a second path to a switch element 2830 of index $\{L-j+t_1\}_{modulo\ N}$, during a time slot $t_1$, $0 \leq t_1 < N$.

The time slot τ during which the first path from switch element 2830($j$) to the controller 3680 is established is determined from $\{L-j-\tau\}_{modulo\ N} = $(N−1). The configuration of FIG. 36 uses transposed connections of order L=(N−1). Thus, $\tau = \{-j\}_{modulo\ N} = $(N−j). The time slot ξ during which the second path from switch element 2830($j$) to the controller 3680 is established is determined from $\{L-j+\xi\}_{modulo\ N} = $(N−1). Thus, ξ=j. Time slot τ is allocated as a control time slot 3882 and time slot ξ is allocated as a control time slot for switch element 2830($j$). Thus, switch elements 2830(0), 2830(1), 2830(2), . . . , 3830(N−3), and 2830(N−2), have paths through channels 2816 and 2826 to the controller 3680, during control time slots 3882 of indices 0, (N−1), (N−2), . . . , 3, and 2, respectively, and paths through channels 2818 and 2828 to the controller 3680 during control time slots 3884 of indices 0, 1, 2, . . . , (N−2), and (N−1), respectively.

Single-Rotator Latent-Space Switch

Figure 39:
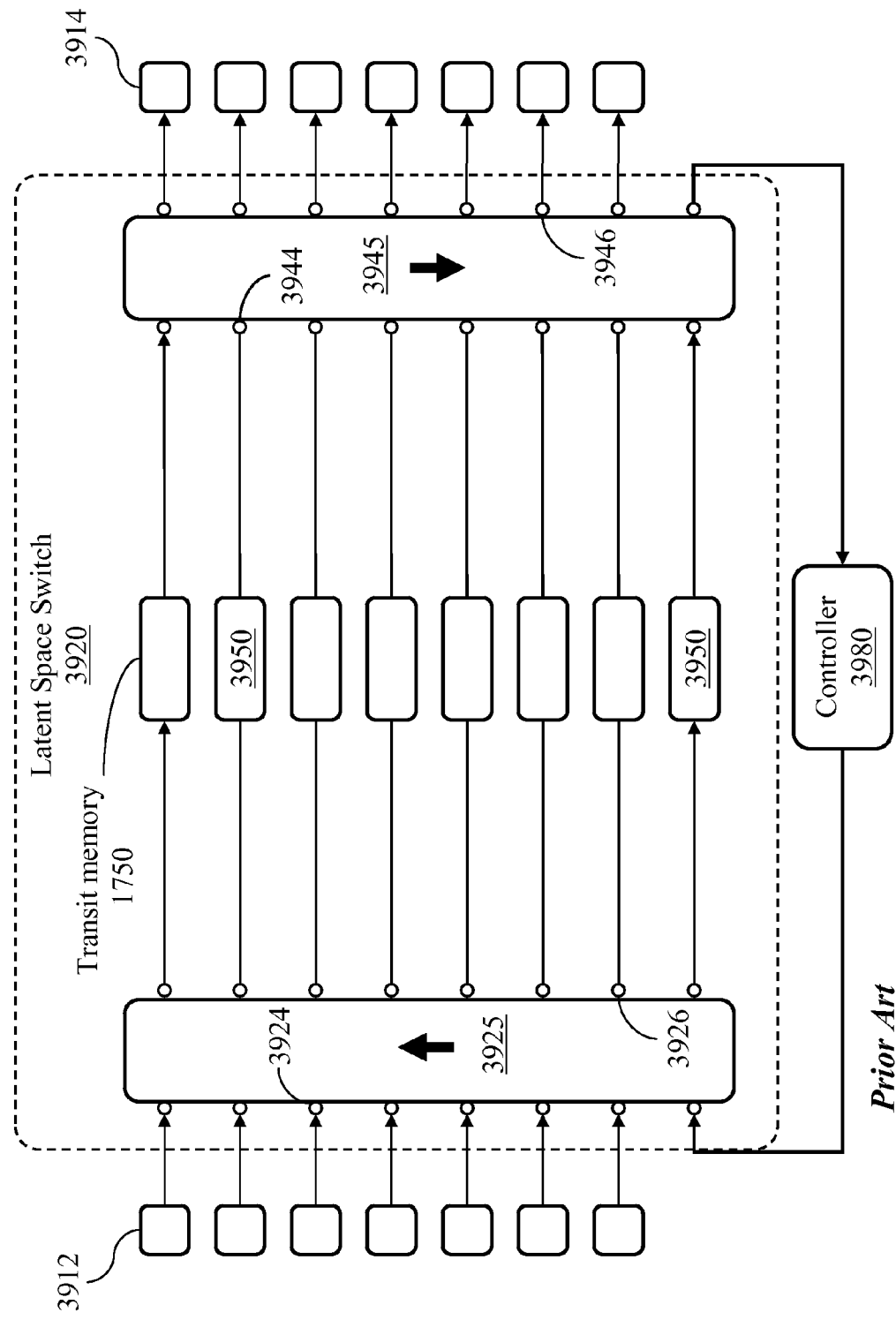
FIG. 39 illustrates a prior art latent space switch comprising a bank of transit memory devices between a first rotator and a second rotator and a controller connecting to an inlet of the first rotator and an outlet of the second rotator, where the first and second rotators are of opposite rotation directions so that the switching delay for a connection is independent of the transit memory device used.

FIG. 39 illustrates a known rotating access packet switch (U.S. Pat. Nos. 5,168,492, 5,745,486, and Publication 2006/0123162) comprising a latent space switch 3920, input buffers 3912 and output buffers 3914. The latent space switch 3920 comprises an input rotator 3925 having N inlets 3924 and N outlets 3926 and an output rotator 3945 having N inlets 3944 and N outlets 3946; N=8 in the illustrated exemplary rotating-access switch. A bank of N transit memory devices 3950 connects to the N outlets 3926 of input rotators 3925 and N inlets 3944 of output rotator 3945. A controller 3980 is connected to an outlet 3946 of output rotator 3945 and an inlet 3924 of input rotator 3925 leaving (N−1) inlets 3924 of input rotator 3925 to connect to (N−1) input buffers 3912 and (N−1) outlets 3946 of output rotator 3945 to connect to (N−1) output buffers 3914. One of the two rotators 3925 and 3945 is an ascending rotator and the other is a descending rotator. The input buffers are individually identified as 3912($j$), $0 \leq j < N$. Likewise output buffers 3914 are individually identified as 3914($j$) and transit memory devices 3950 are individually identified as 3950($j$), $0 \leq j < N$. During a time slot t in a repetitive time frame having N time slots, input rotator 3925 connects input buffer j to transit memory device $\{j+\beta \times t\}_{modulo\ N}$, and output rotator 3945 connects transit memory device j to output buffer $(j-\beta \times t)_{modulo\ N}$ where β=1 if rotator 3925 is an ascending rotator and rotator 3945 is a descending rotator and β=−1 if rotator 3925 is a descending rotator and rotator 3945 is an ascending rotator. A data unit transferred from an input buffer 3912(j) to an output buffer 3914(k) through any transit memory device 3950 is delayed in the transit memory device 3950 for a period of $\{j-k\}_{modulo\ N}$, if rotator 3925 is an ascending rotator and rotator 3945 is a descending rotator, or delayed for a period of $\{k-j\}_{modulo\ N}$, if rotator 3925 is a descending rotator and rotator 3945 is an ascending rotator.

Figure 40:
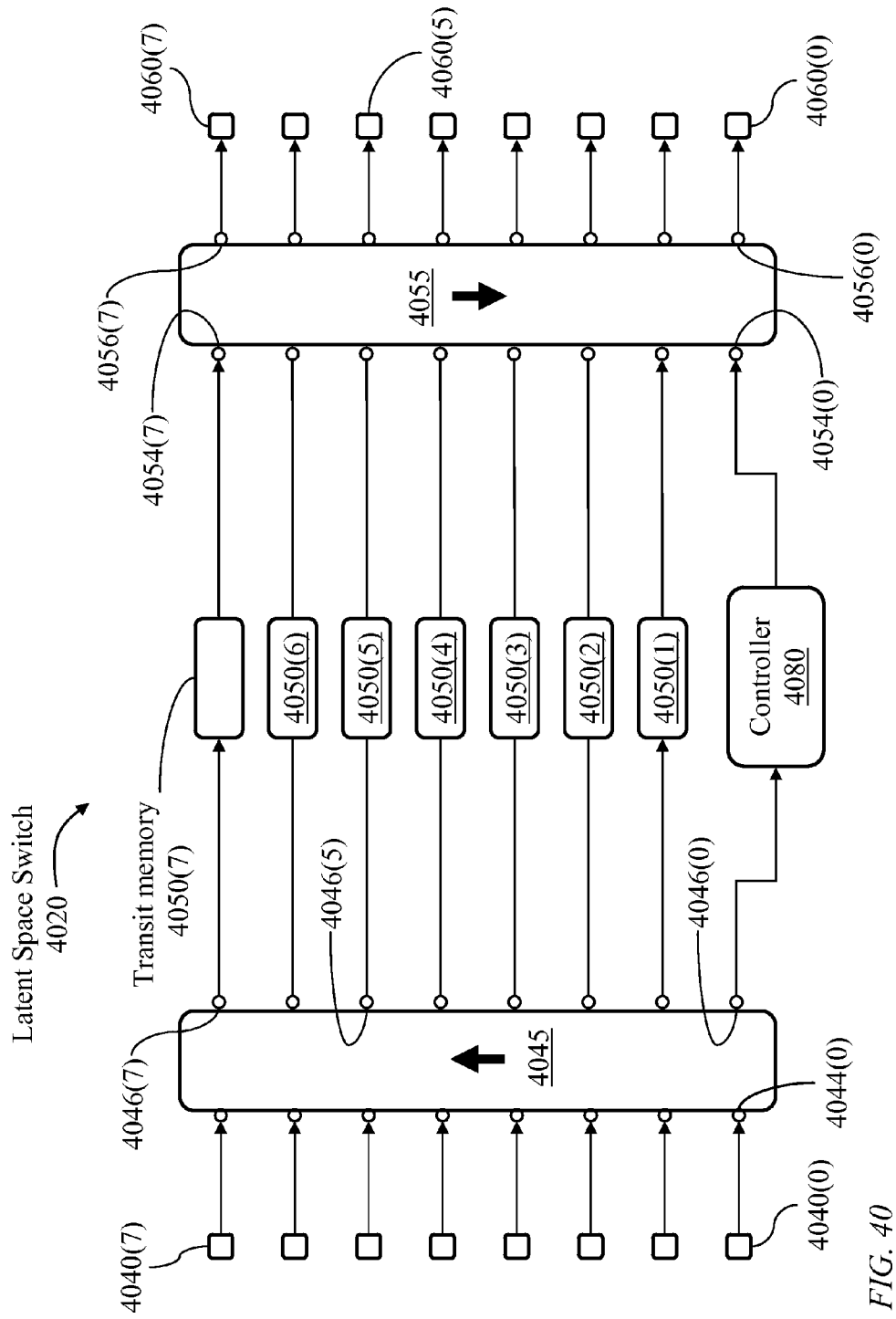
FIG. 40 illustrates a latent space switch comprising a bank of transit memory devices between a first rotator and a second rotator and a controller connecting to an outlet of the first rotator and an inlet of the second rotator, where the first and second rotators are of opposite rotation directions so that the switching delay for a connection is independent of the transit memory device used, in accordance with an embodiment of the present invention.

FIG. 40 illustrates a latent space switch 4020 comprising an input rotator 4045 having N inlets 4044 and N outlets 4046 and an output rotator 4055 having N inlets 4054 and N outlets 4056; N=8 in the illustrated latent space switch. A bank of (N−1) transit memory devices 4050 connects to (N−1) outlets 4046 of input rotator 4045 and (N−1) inlets 4054 of output rotator 4055. A controller 4080 is connected to an outlet 4046 of input rotator 4045 and an inlet 4054 of output rotator 4055. As in latent-space switch 3920, one of the two rotators 4045 and 4055 is an ascending rotator and the other is a descending rotator. The inlets 4044 are individually identified as 4044(j), $0 \leq j < N$. Likewise outlets 4056 are individually identified as 4056(j) and transit memory devices 4050 are individually identified as 4050(j), $0 \leq j < N$. During a time slot t in a repetitive time frame having N time slots, input rotator 4045 connects inlet 4044(j) to transit memory device $\{j+\beta \times t\}_{modulo\ N}$, and output rotator 4055 connects transit memory device j to outlet 4056(k), $k=\{j-\beta \times t\}_{modulo\ N}$, where $\beta=1$ if rotator 4045 is an ascending rotator and rotator 4055 is a descending rotator and $\beta=-1$ if rotator 4045 is a descending rotator and rotator 4055 is an ascending rotator. A data unit transferred from an inlet 4044(j) to an outlet 4056(k) through any transit memory device 4050 is delayed in the transit memory device 4050 for a period of $\{j-k\}_{modulo\ N}$, if rotator 4045 is an ascending rotator and rotator 4055 is a descending rotator, or delayed for a period of $\{k-j\}_{modulo\ N}$, if rotator 4045 is a descending rotator and rotator 4045 is an ascending rotator.

An ingress port 4040 connecting to inlet 4044 dedicates a time slot within the time frame for receiving control signals from respective external sources and transferring the control signals to controller 4080. An egress port 4060 connecting to an outlet 4056 dedicates a time slot within the time frame for transmitting control signals from controller 4080 to respective external sinks.

Latent space switch 3920 uses N transit memory devices 3950 and supports (N−1) ingress ports and (N−1) egress ports. A control data unit transferred from an ingress port to controller 3980 is first written in a transit memory device 3950 then transferred to controller 3980. A control data unit transferred from controller 3980 to an egress port is first written in a transit memory device 3950 then transferred to the egress port. Latent space switch 4020 uses (N−1) transit memory devices 4050, supports N ingress ports and N egress ports, and simplifies access to the controller 4080.

During a first part of a time slot, data is transferred from inlets 4044 to controller 4080 and to transit memory devices 4050 through input rotator 4045. During a second part of the time slot, data is transferred from controller 4080 and transit memory devices 4050 to outlets 4056 through output rotator 4055. The two rotators 4045 and 4055 may, therefore, be replaced by a single rotator. However, rotators 4045 and 4055 should rotate in opposite directions, one being an ascending rotator and the other a descending rotator, in order to guarantee a transit delay for a path from an inlet 4044(j) to an outlet 4056(k) which is independent of the transit memory device 4050 used and depends only on the indices j and k.

A single rotator may be devised to be an ascending rotator during a first part of each time slot and a descending rotator during a second part of each time slot. Preferably, in accordance with an embodiment of the present invention, the connectivity of the transit memory devices to the input side and output side of a single rotator rotating in one direction, either ascending or descending, may be configured to realize delay independence of the transit memory devices traversed by a data stream.

Figure 41:
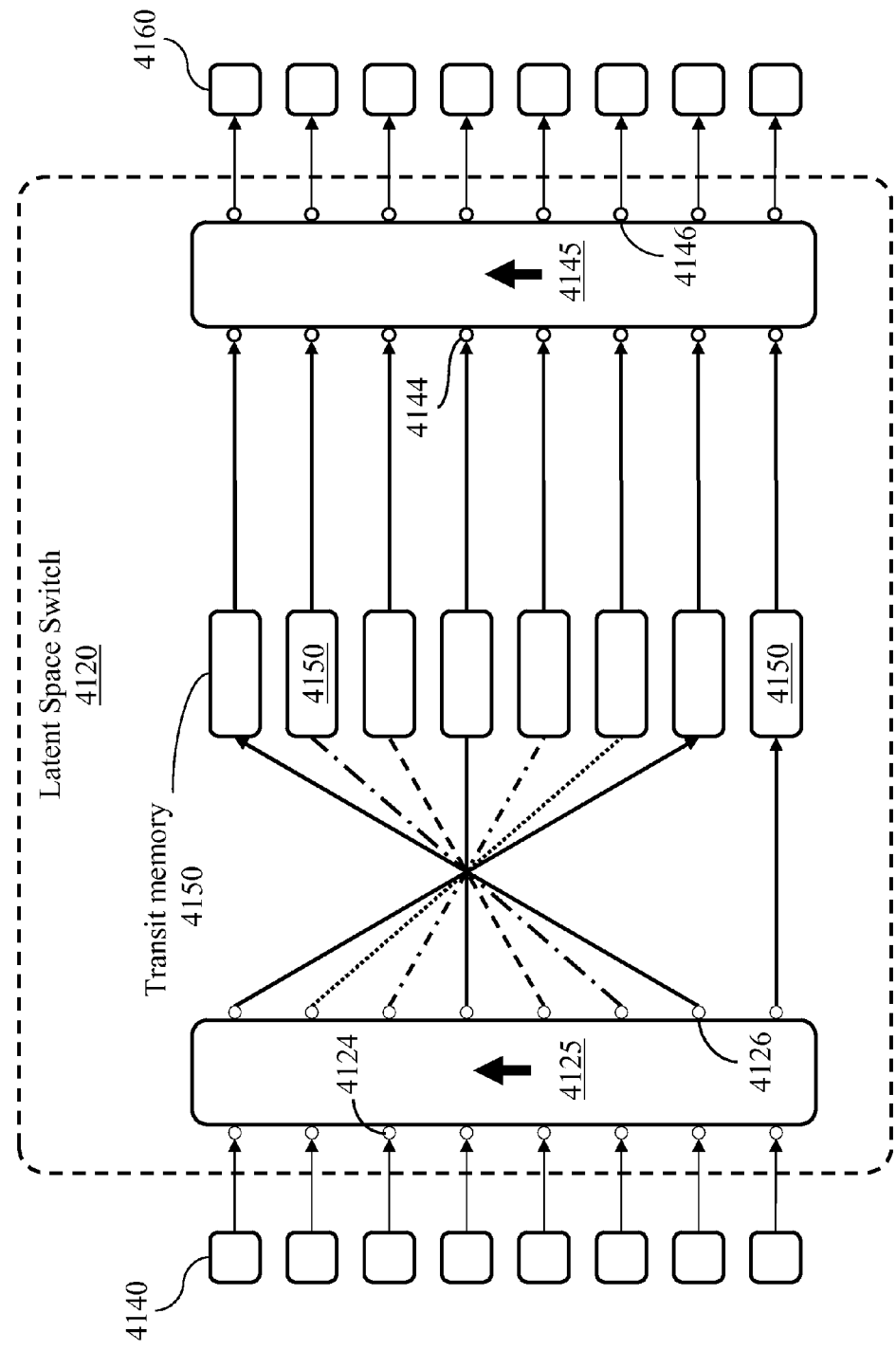
FIG. 41 illustrates a latent space switch comprising a first ascending rotator having transposed connections of order 0 to a bank of eight transit memory devices with the bank of transit memory devices having ordinary connection to a second ascending rotator, so that the switching delay for a connection is independent of the transit memory device used, in accordance with an embodiment of the present invention.

FIG. 41 illustrates a latent space switch 4120 comprising a first ascending rotator 4125 having eight inlets 4124 and eight outlets 4126, a bank of eight transit memory devices 4150, and a second ascending rotator 4145 having eight inlets 4144 and eight outlets 4146. The eight outlets 4126 of the first ascending rotator have static transposed connections of order 0 to the bank of transit memory devices 4150, and the bank of transit memory devices 4150 has ordinary connection to the inlets 4144 of the second ascending rotator. The inlets 4124 of the first ascending rotator may have ordinary connections to ingress ports 4140 and the outlets 4146 of the second ascending rotator may have ordinary connections to egress ports 4160.

An inlet 4124(j) of the first ascending rotator connects to outlet 4126|j+t₁|, where |j+t₁| denotes $(j+t_1)_{modulo\ N}$, during a time slot $t_1$, $0 \leq t_1 < N$. Outlet 4126|j+t₁| connects to a transit memory device 4150|L−(j+t₁)|. Transit memory device |L−(j+t₁)| connects to inlet 4144|L−(j+t₁)| of the second ascending rotator. In order to reach outlet 4146(k) of the second ascending rotator, transit data in transit memory device 4150|L−(j+t₁)| is transferred from inlet 4144|L−(j+t₁)| to outlet 4146(k) during a time slot $t_2=|k-(L-(j+t_1))|=|j+k-L+t_1|$. Thus, the transit delay is $t_2-t_1=|j+k-L|$, which is independent of the transit memory device used. The transit delay depends on the indices j and k of the ingress and egress ports and the order L, $0 \leq L < N$, of the transposed connection, which is a fixed parameter for a specific configuration of a latent space switch 4120. The value of L is 0 in the configuration of FIG. 41.

To render the delay from an ingress port 4112(j) to an egress port 4146(k), $0 \leq j < N$, $0 \leq k < N$, independent of the transposition order L, the outlets 4146 of the second ascending rotator may have transposed connections of the same order L to the egress ports. Thus, in order to reach egress port 4114(k), transit data in transit memory device 4150|L−(j+t₁)| is transferred from inlet 4144|L−(j+t₁)| to outlet 4146|L−k| during a time slot $t_2=|(L-k)-(L-(j+t_1))|=|j-k+t_1|$, and the transit delay is $t_2-t_1=|j-k|$, which is independent of the transposition order L.

Figure 42:
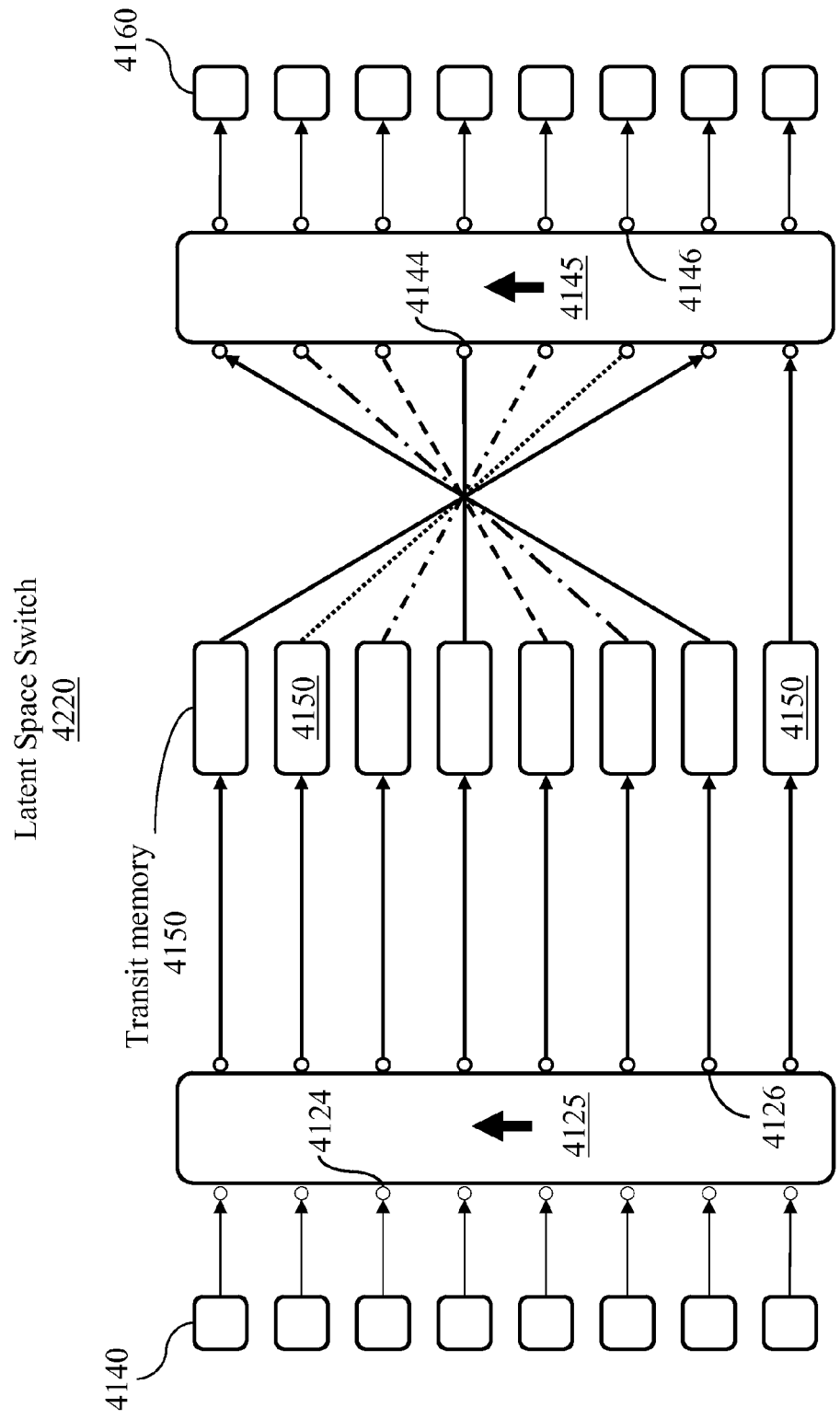
FIG. 42 illustrates a latent space switch comprising a first ascending rotator having ordinary connections to a bank of eight transit memory devices with the bank of transit memory devices having transposed connections of order 0 to a second ascending rotator, so that the switching delay for a connection is independent of the transit memory device used, in accordance with an embodiment of the present invention.

FIG. 42 illustrates a latent space switch 4220 comprising a first ascending rotator 4125 having eight inlets 4124 and eight outlets 4126, a bank of eight transit memory devices 4150, and a second ascending rotator 4145 having eight inlets 4144 and eight outlets 4146. The eight outlets 4126 of the first ascending rotator have static ordinary connections to the bank of transit memory devices 4150, and the bank of transit memory devices 4150 has transposed connections to the inlets 4144 of the second ascending rotator. The inlets 4124 of the first ascending rotator may have ordinary connections to ingress ports 4140 and the outlets 4146 of the second ascending rotator may have ordinary connections to egress ports 4160.

An inlet 4124(j) of the first ascending rotator connects to outlet 4126|j+t₁| during a time slot $t_1$, $0 \leq t_1 < N$. Outlet 4126|j+t₁| connects to a transit memory device 4150|j+t₁|. Transit memory device 4150|j+t₁| connects to inlet 4144|L−(j+t₁)| of the second ascending rotator. In order to reach outlet 4146(k), transit data in transit memory device 4150|j+t₁| is transferred from inlet 4144|L−(j+t₁)| to outlet 4146(k) during a time slot $t_2=|k-(L-(j+t_1))|=|j+k-L+t_1|$. Thus, the transit delay is $t_2-t_1=|j+k-L|$. The value of L is 0 in the configuration of FIG. 42.

To render the delay from an ingress port 4140(*j*) to an egress port 4160(*k*), $0 \leq j < N$, $0 \leq k < N$, independent of the transposition order L, the outlets 4146 of the second ascending rotator may have transposed connections of the same order L to the egress ports 4160, resulting in a transit delay of $|j-k|$.

Figure 43:
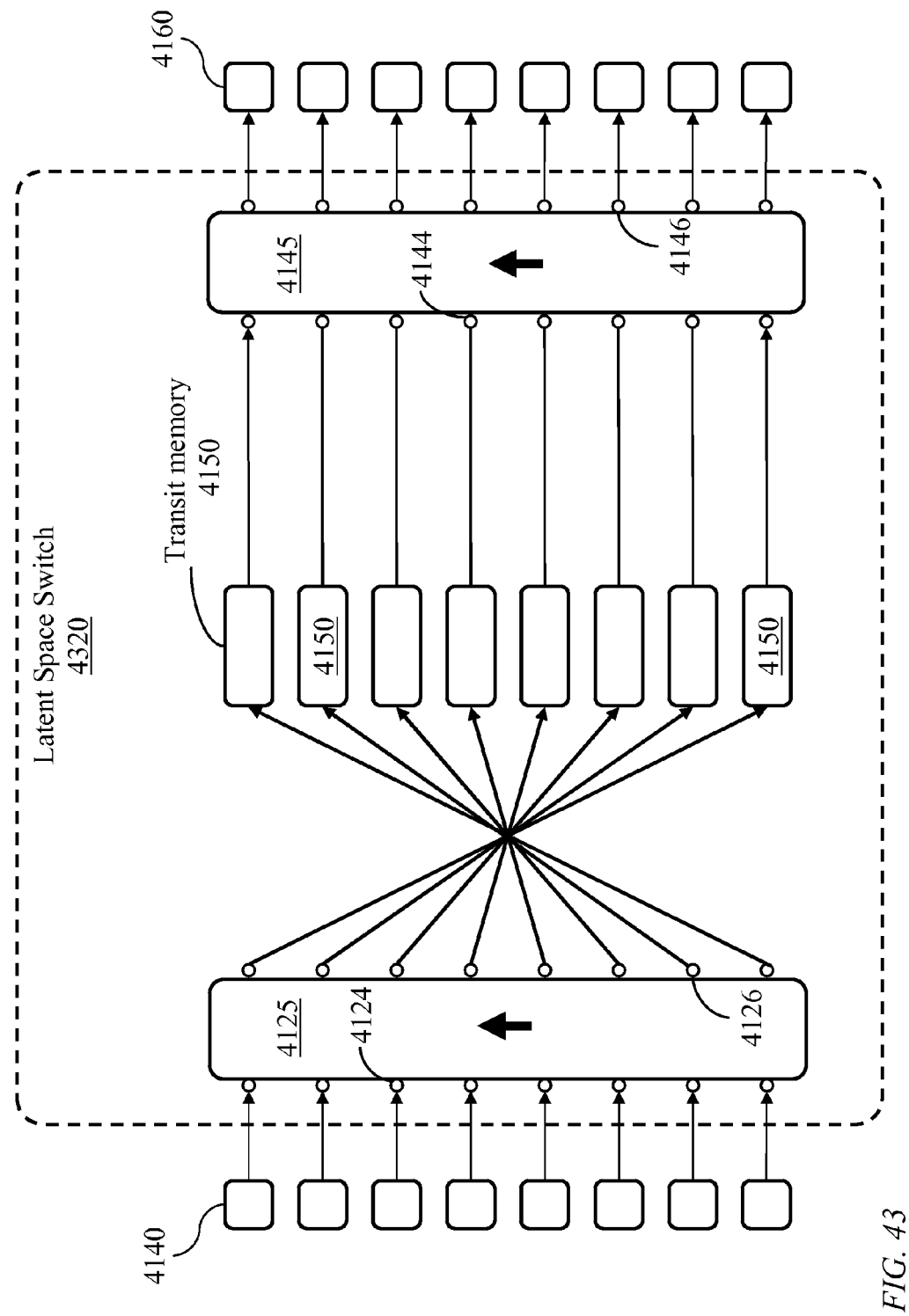
FIG. 43 illustrates a latent space switch similar to the latent space switch of FIG. 41 but with the first ascending rotator having transposed connections of order 7 to a bank of transit memory devices.

FIG. 43 illustrates a latent space switch similar to the latent space switch of FIG. 41 but with the first ascending rotator having transposed connections of order 7 to a bank of transit memory devices. The transit delay for a connection from an ingress port 4112(*j*) to an egress port 4114(*k*) is then $|j+k-7|$ if the outlets 4146 of the second ascending rotator have ordinary connections to the egress ports 4160. With transposed connections of order 7 from the outlets 4146 of the second ascending rotator to the egress ports 4160, the transition delay from an ingress port 4140(*j*) to an egress port 4160(*k*) is $|j-k|$.

Figure 44:
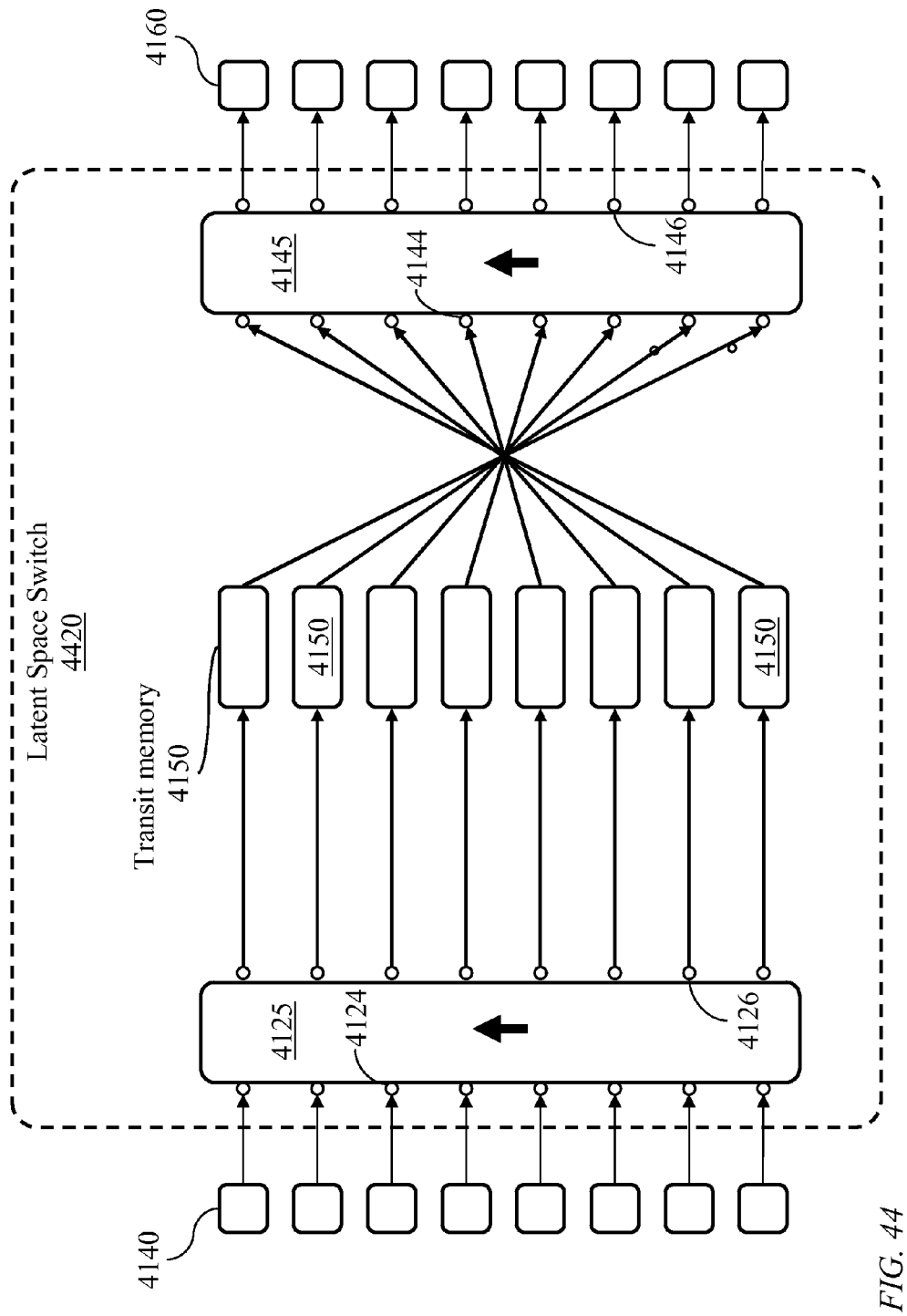
FIG. 44 illustrates a latent space switch similar to the latent space switch of FIG. 42 but with the bank of transit memory devices having transposed connections of order 7 to the second ascending rotator.

FIG. 44 illustrates a latent space switch similar to the latent space switch of FIG. 42 but with the bank of transit memory devices having transposed connections of order 7 to the inlets 4144 of the second ascending rotator. The transit delay for a connection from an ingress port 4112(*j*) to an egress port 4114(*k*) is then $|j+k-7|$ if the outlet 4146 of the second ascending rotator have ordinary connections to the egress ports 4160. With transposed connections of order L from the outlets 4146 of the second ascending rotator to the egress ports 4160, the transition delay from an ingress port 4112(*j*) to an egress port 4114(*k*) is $|j-k|$.

Figure 45:
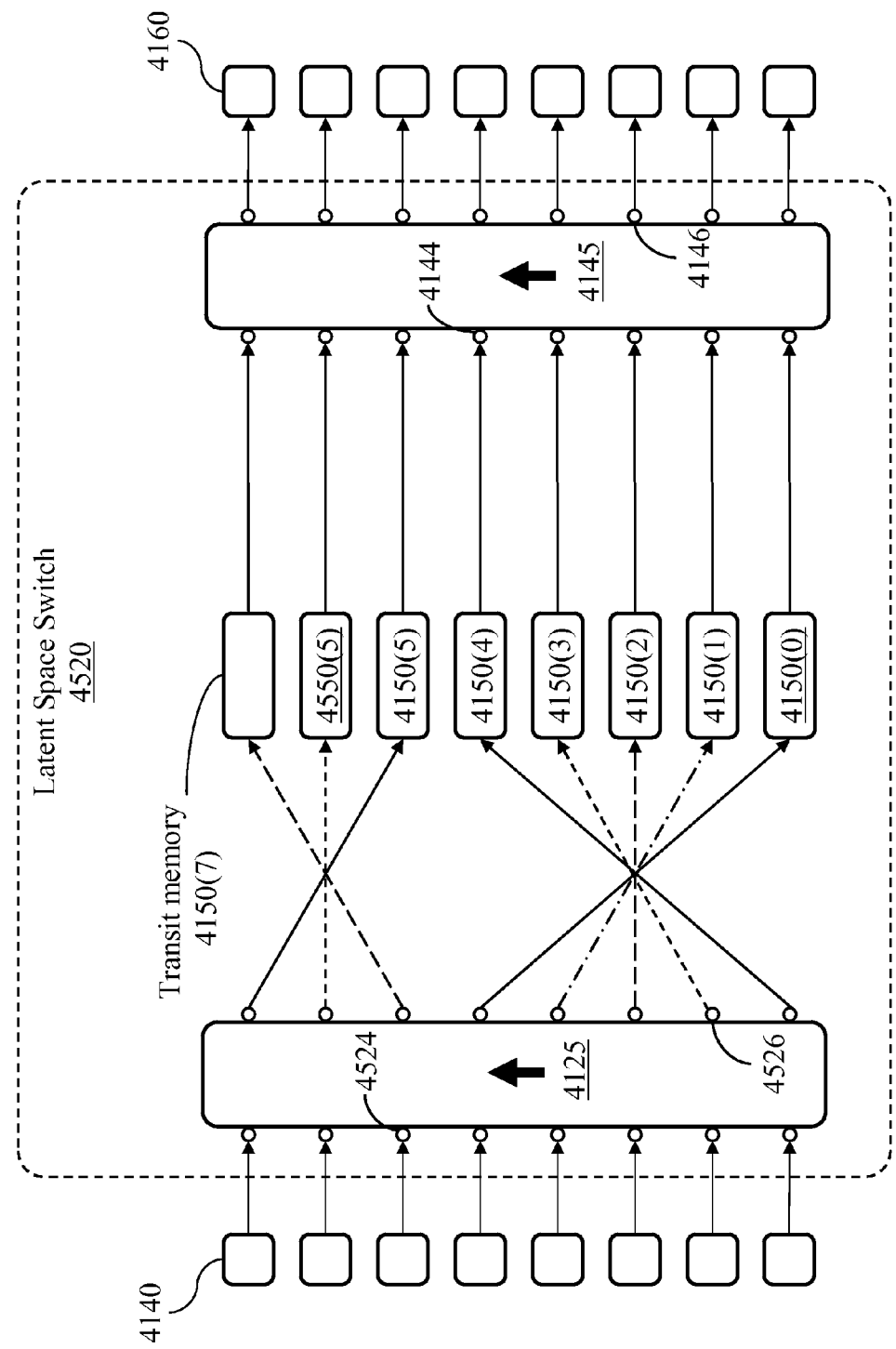
FIG. 45 illustrates a latent space switch similar to the latent space switch of FIG. 41 but with the first ascending rotator having transposed connections of index 4 to a bank of transit memory devices.

FIG. 45 illustrates a latent space switch similar to the latent space switch of FIG. 41 but with the first ascending rotator having transposed connections of order 4 to a bank of transit memory devices. The transit delay for a connection from an ingress port 4112(*j*) to an egress port 4114(*k*) is then $|j+k-4|$ if the outlets 4146 of the second ascending rotator have ordinary connections to the egress ports 4160. With transposed connections of order 4 from the outlets 4146 of the second ascending rotator to the egress ports 4160, the transition delay from an ingress port 4140(*j*) to an egress port 4160(*k*) is $|j-k|$.

Figure 46:
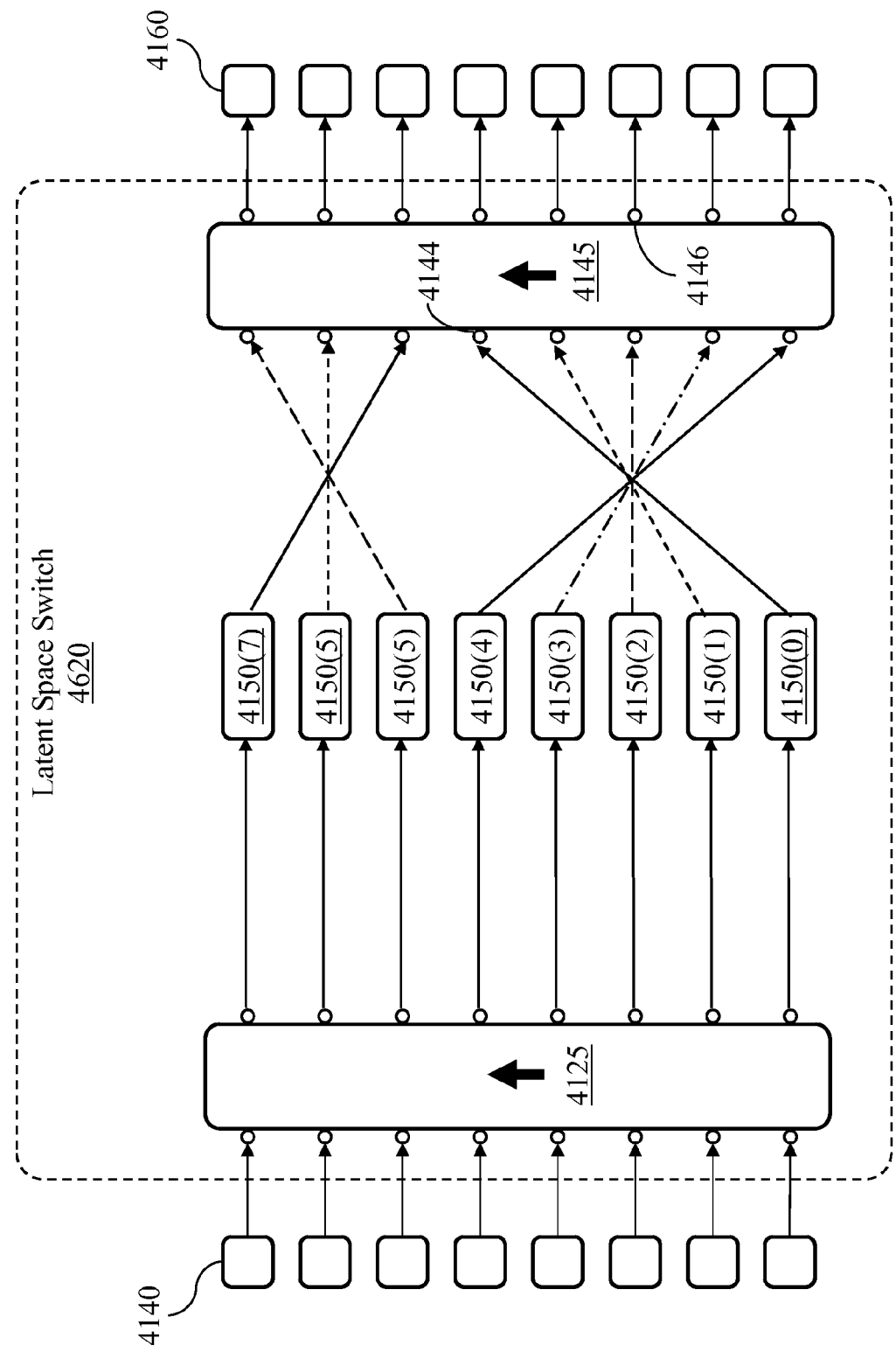
FIG. 46 illustrates a latent space switch similar to the latent space switch of FIG. 42 but with the bank of transit memory devices having transposed connections of order 4 to the second ascending rotator.

FIG. 46 illustrates a latent space switch similar to the latent space switch of FIG. 42 but with the bank of transit memory devices having transposed connections of order 4 to the inlets 4144 of the second ascending rotator. The transit delay for a connection from an ingress port 4112(*j*) to an egress port 4114(*k*) is then $|j+k-4|$ if the outlets 4146 of the second ascending rotator have ordinary connections to the egress ports 4160. With transposed connections of order L from the outlets 4146 of the second ascending rotator to the egress ports 4114, the transition delay from an ingress port 4140(*j*) to an egress port 4160(*k*) is $|j-k|$.

FIG. 47 tabulates data-transfer timing of a latent space switch of the type illustrated in FIG. 41 to FIG. 46, with an arbitrary number of ports and an arbitrary value of the order of transposed connections.

Figure 48:
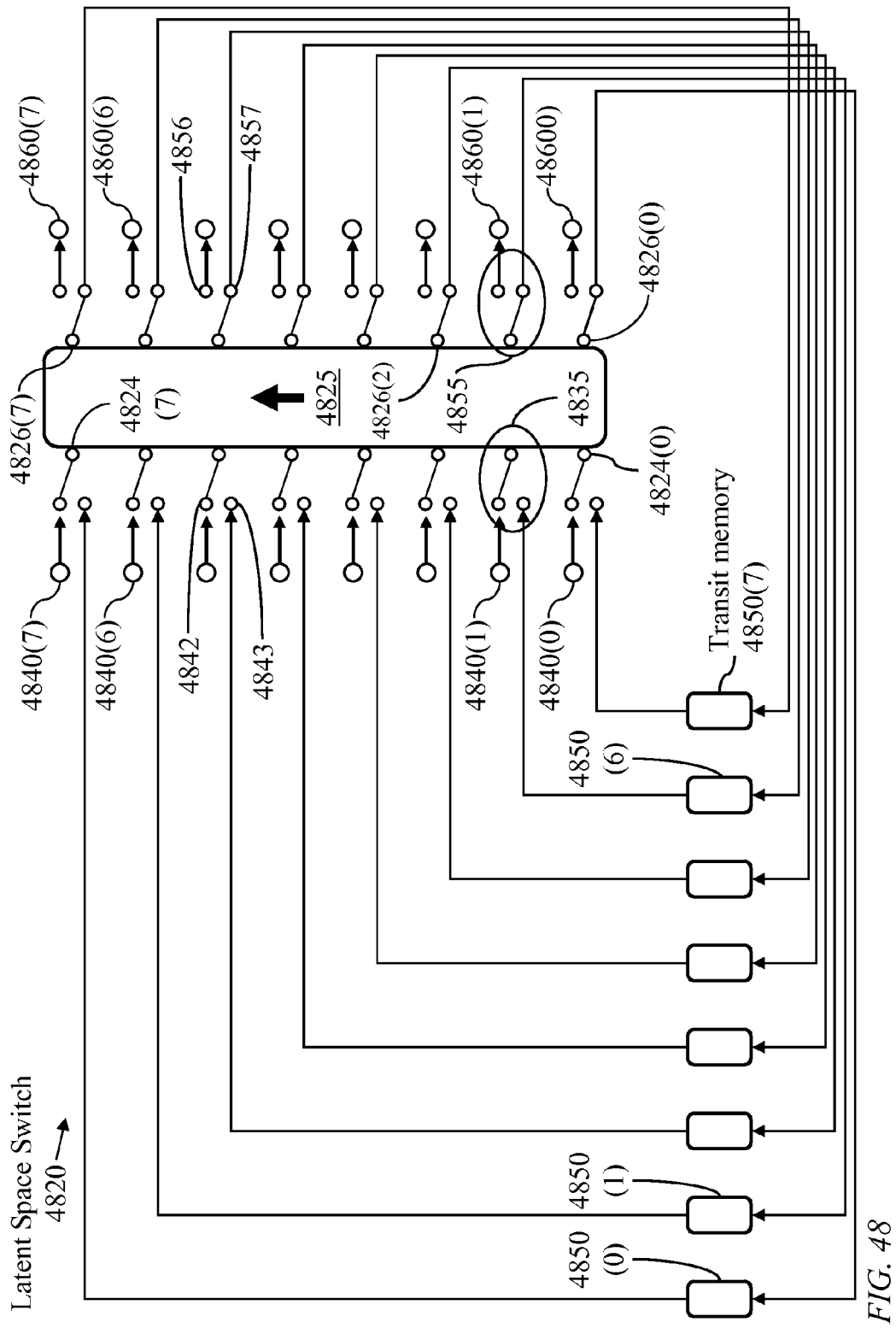
FIG. 48 illustrates a single-rotator latent space switch 4820, in accordance with an embodiment of the present invention, comprising a bank of eight transit memory devices connecting to inlet selectors and outlet selectors of a single rotator with transposed connections of order 7 from the transit memory devices to the inlet selectors and ordinary connections from the transit memory devices to the outlet selector, thus realizing a constant switching delay from an ingress port to an egress port, the figure illustrates a setting of the selectors during data transfer from data sources to the transit memory devices.

The two rotators 4125 and 4145 of latent space switches 4120, 4220, 4320, 4420, 4520, and 4620 are of the same rotation direction and they are not active simultaneously. Thus, they may be replaced with a single rotator. FIG. 48 illustrates a latent space switch 4820 having a single rotator 4825 with N inlets 4824 and N outlets 4826; N=8 in the exemplary configuration of FIG. 48. Each inlet 4824(*j*) is provided with an inlet selector 4835(*j*), $0 \leq j < N$. A selector 4835(*j*) has one inlet port 4842 connecting to ingress port 4840(*j*) and one inlet port 4843 connecting to transit memory device 4850|L-j|; L=N-1. Each outlet 4826(*j*) is provided with an outlet selector 4855($\chi$), $0 \leq \chi < N$. A selector 4855($\chi$) has one outlet port 4856 connecting to egress port 4860($\chi$) and one outlet port 4857 connecting to transit memory device 4850($\chi$). Thus, the transit memory devices 4850 have transposed connections of order (N-1), to the single rotator 4825 and ordinary connections from the single rotator. Notably, an ingress port 4840 may have a short buffer for holding a data unit received from an external source and an egress port may have a short buffer for holding a data unit to be transmitted to an external sink.

Figure 49:
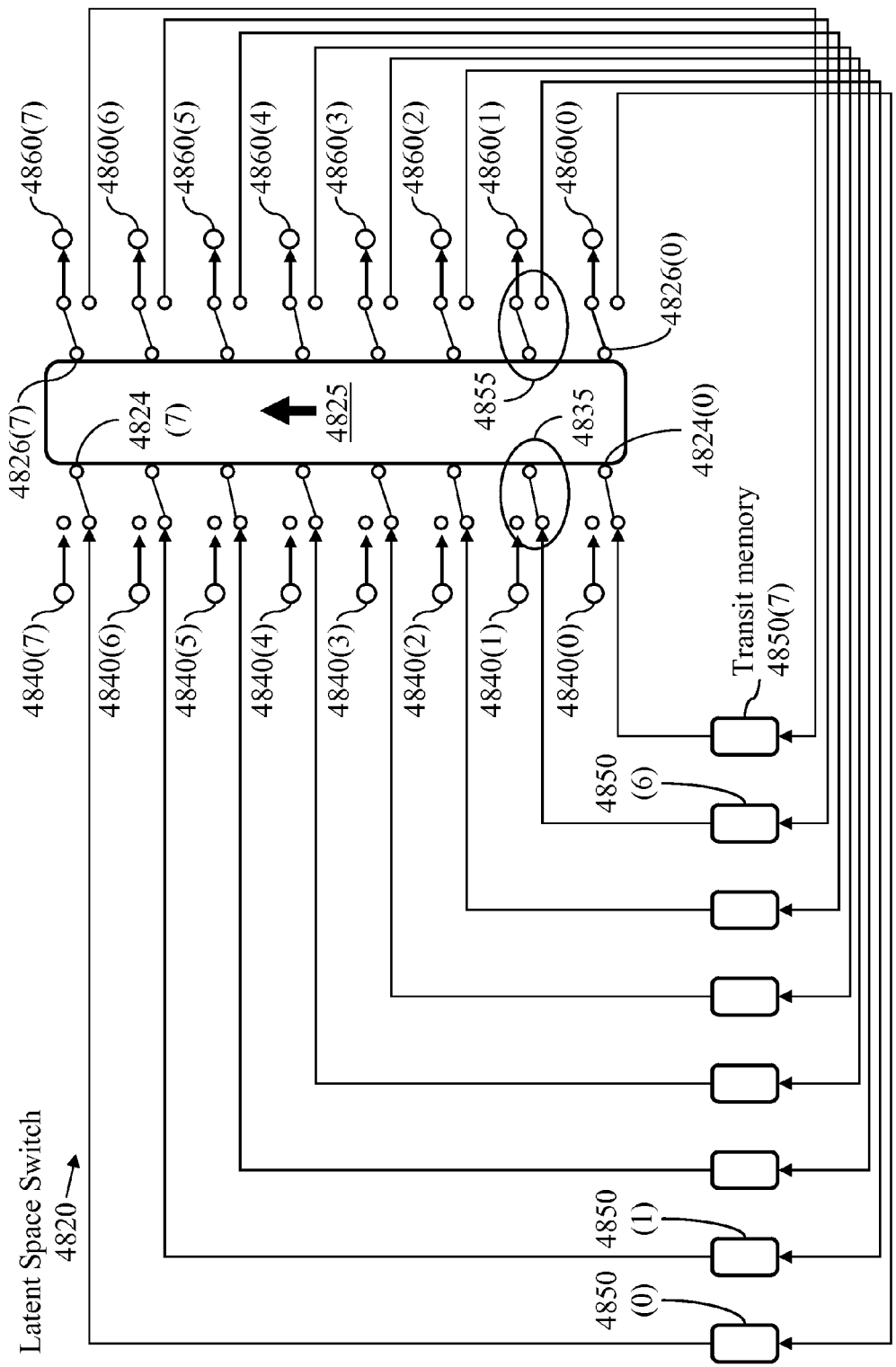
FIG. 49 illustrates a setting of the selectors in the latent space switch of FIG. 48 during data transfer from the transit memory devices to data sinks.

The transit delay for data units received at an ingress port 4840(*x*) and destined to egress port 4860(*y*) is $|x-y|$ (i.e., $(x-y)_{modulo\ N}$) if rotator 4825 is an ascending rotator or $|x-y|$ (i.e., $(y-x)_{modulo\ N}$) if rotator 4825 is a descending rotator. FIG. 48 illustrates the states of the selectors 4835 and 4855 during a first part of a time slot. FIG. 49 illustrates the states of the selectors 4835 and 4855 of switch 4820 during a second part of a time slot. During the first part of the time slot, data is transferred from ingress ports 4840 to the transit memory devices 4850 and data is transferred from egress ports 4860 to respective external sinks. During the second part of the time slot, data is transferred from the transit memory devices 4850 to the egress ports 4860 and data is received at the ingress ports 4840 from respective external sources.

Figure 50:
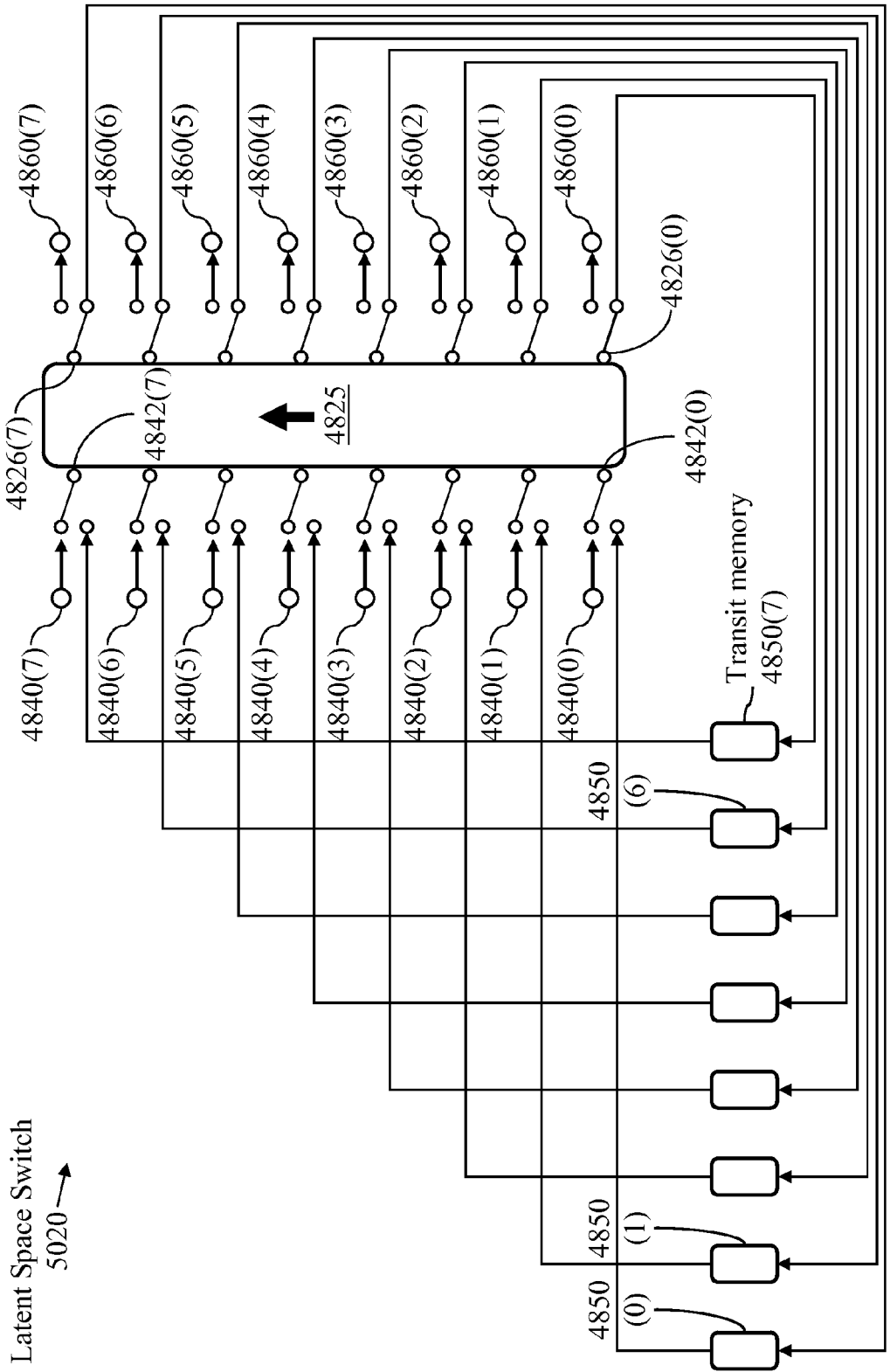
FIG. 50 illustrates a single-rotator latent space switch 5020, in accordance with an embodiment of the present invention, comprising a bank of eight transit memory devices connecting to inlet selectors and outlet selectors of a single rotator with ordinary connections from the transit memory devices to the inlet selectors and transposed connections of order 7 from the transit memory devices to the outlet selector, thus realizing a constant switching delay from an ingress port to an egress port, the figure illustrates a setting of the selectors during data transfer from data sources to the transit memory devices.

FIG. 50 illustrates a single-rotator latent space switch 5020 having the same single rotator, the same inlet selectors 4835, the same outlet selectors 4855, and the same transit-memory devices 4850, of switch 4820 of FIG. 48. However, the transit memory devices 4850 have ordinary connections to the single rotator and transposed connections of order (N-1) from the rotator. The transit delay for a connection from an ingress port 4840(*x*) to an egress port 4860(*y*) is $|y-x|$ if rotator 4825 is an ascending rotator or $|x-y|$ if rotator 4825 is a descending rotator. FIG. 50 indicates the states of the selectors 4835 and 4855 during a first part of a time slot, i.e. during data transfer from external data sources to the transit memory devices.

Figure 51:
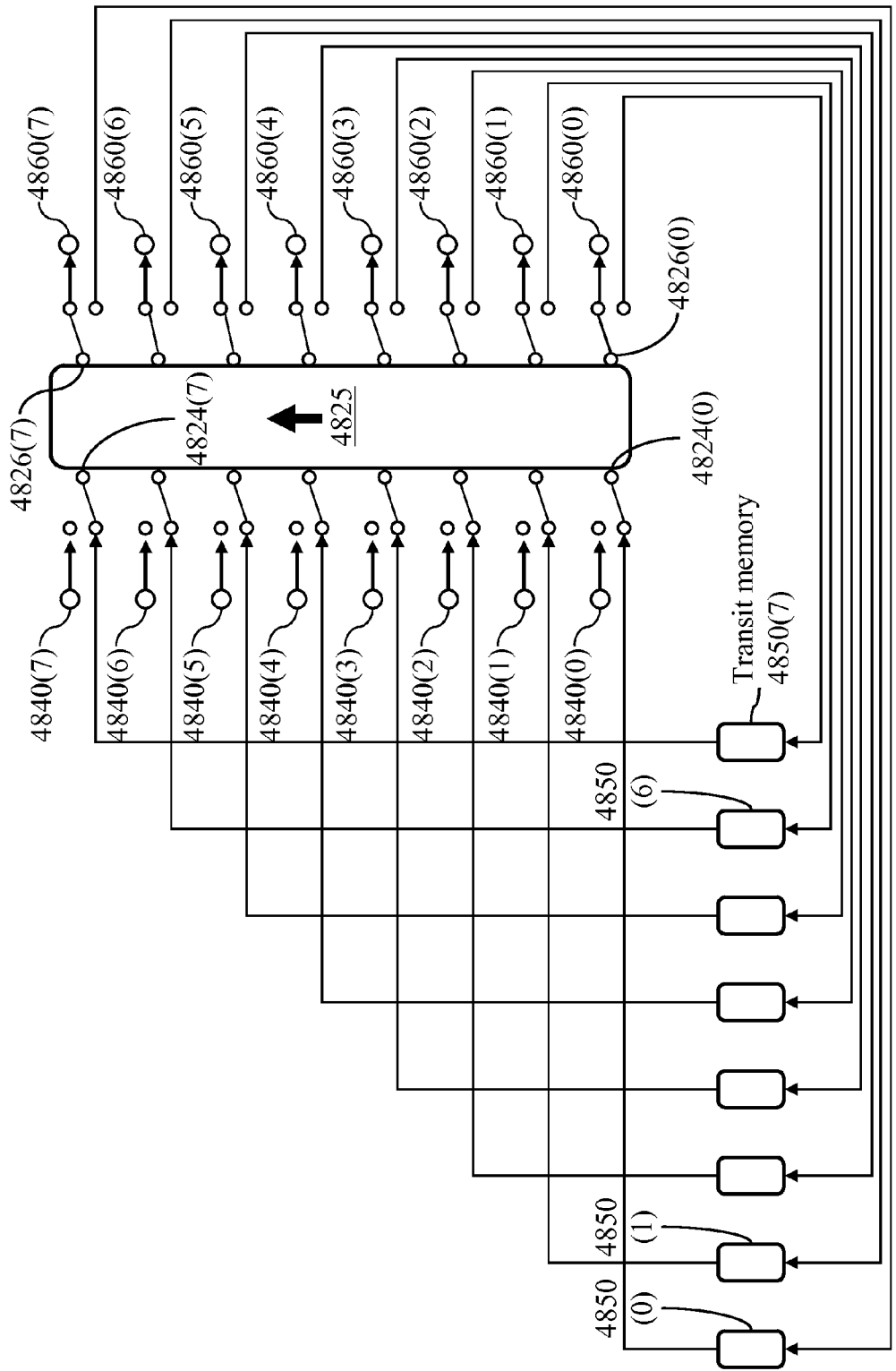
FIG. 51 illustrates a setting of the selectors in the latent space switch of FIG. 50 during data transfer from the transit memory devices to data sinks.

FIG. 51 illustrates the states of the selectors 4835 and 4855 of switch 5020 during a second part of a time slot, i.e. during data transfer from the transit memory devices to external data sinks.

Figure 52:
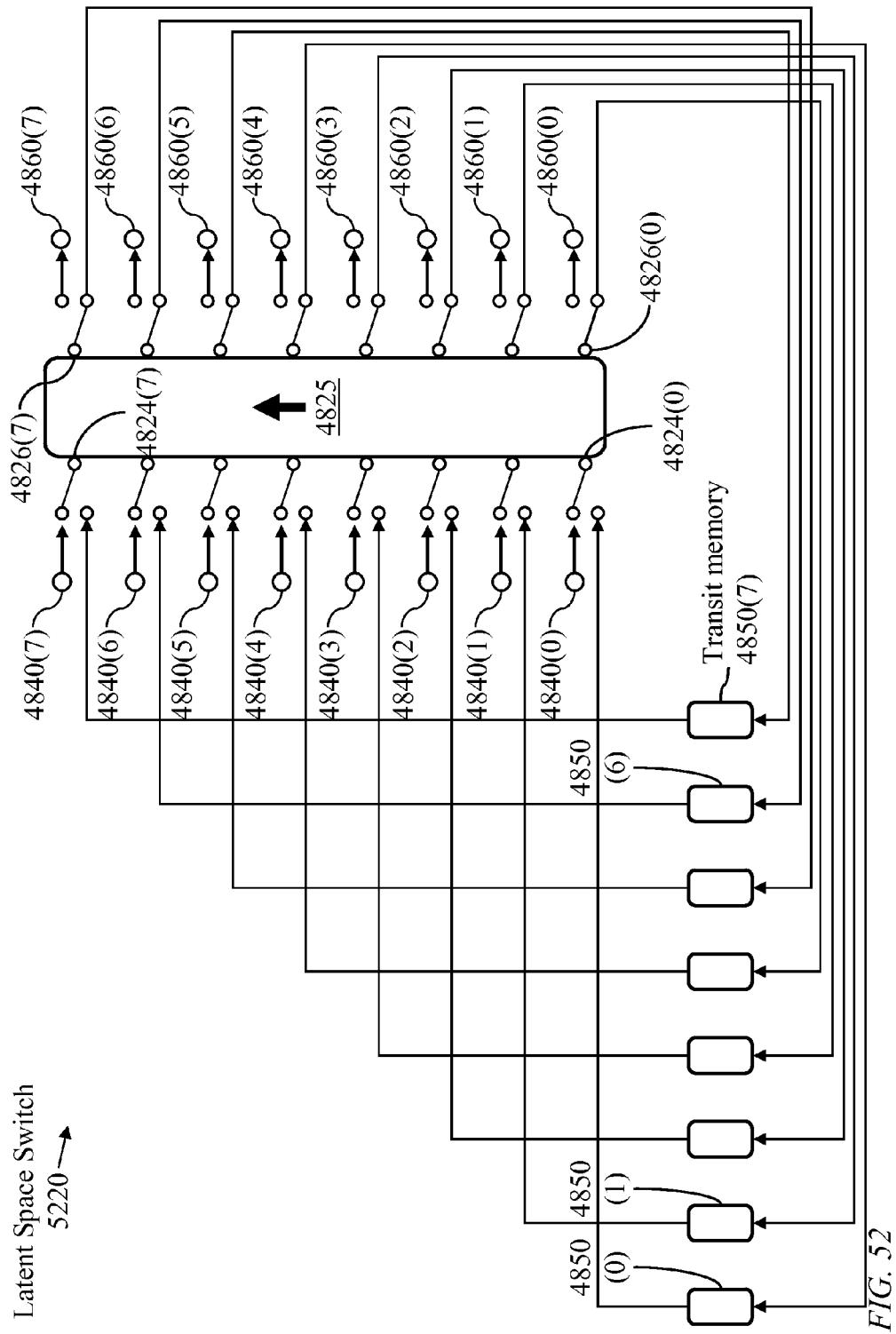
FIG. 52 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 4 from the transit memory devices to the outlet selector, thus realizing a constant switching delay from an ingress port to an egress port, the figure illustrates a setting of the selectors during data transfer from data sources to the transit memory devices.

FIG. 52 illustrates a single-rotator latent space switch 5220 having the same single rotator, the same inlet selectors 4835, the same outlet selectors 4855, and the same transit-memory devices 4850, of switch 4820 of FIG. 50. However, the transit memory devices 4850 have transposed connections of order 4 from the single rotator. The transit delay is the same as that of the single-rotator space switch 5020.

Figure 53:
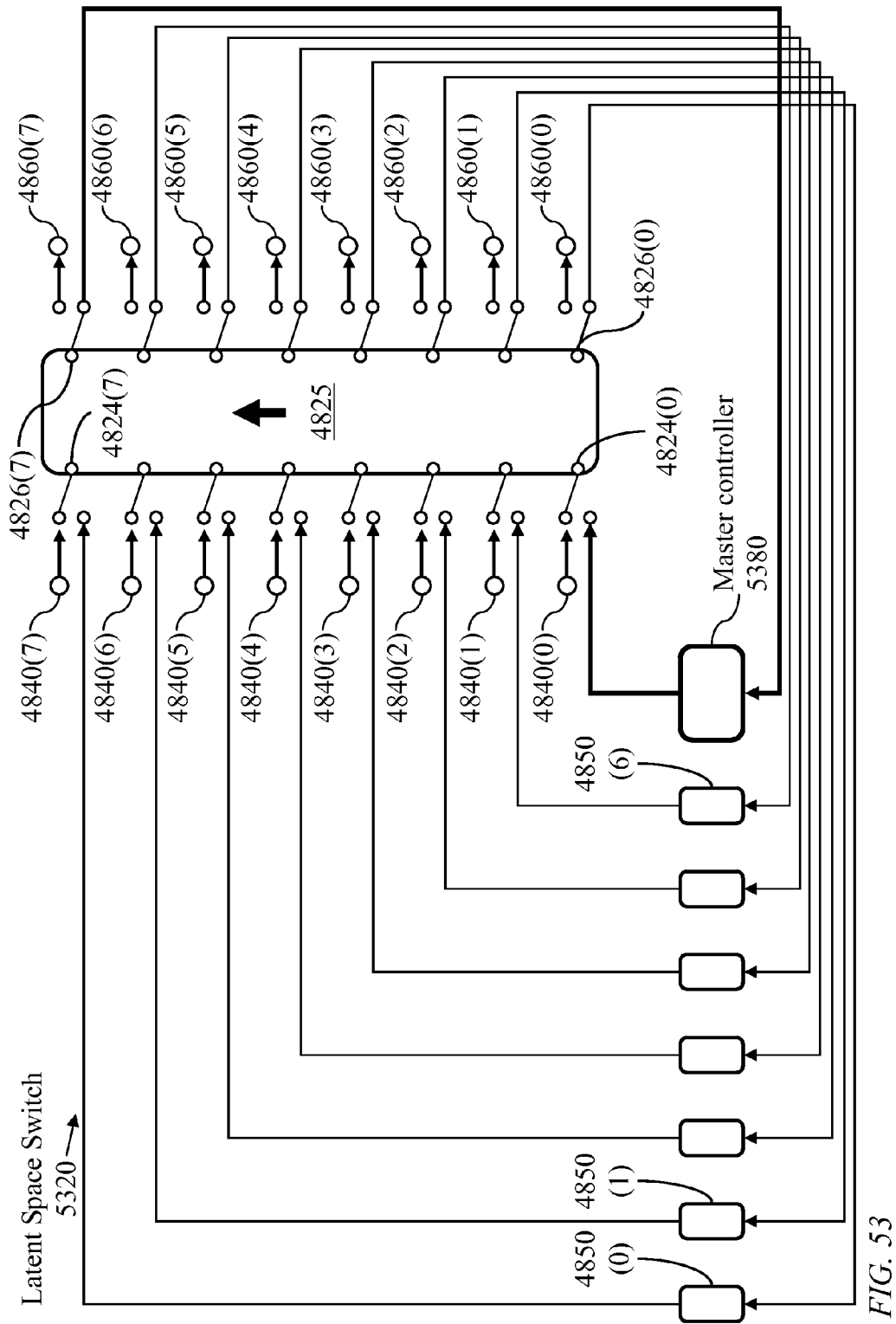
FIG. 53 illustrates the latent space switch of FIG. 48 comprising a controller connecting to an inlet and an outlet of the single rotator in accordance with an embodiment of the present invention.

FIG. 53 illustrates a latent space switch 5320 similar to latent space switch 4820 of FIG. 48 but with a controller 5380 replacing transit memory device 4850(7).

Figure 54:
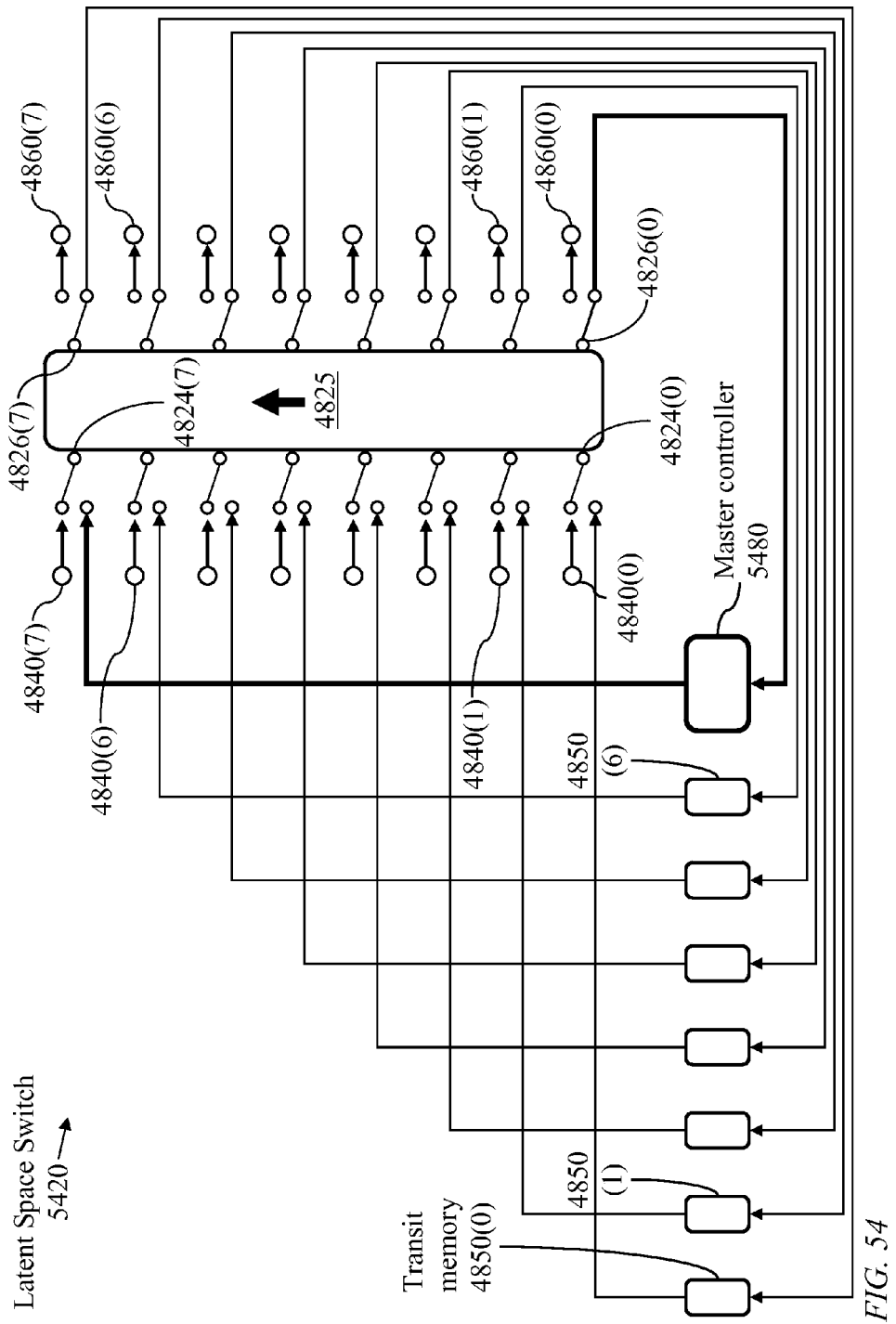
FIG. 54 illustrates the latent space switch of FIG. 50 comprising a controller connecting to an inlet and an outlet of the single rotator in accordance with an embodiment of the present invention.

FIG. 54 illustrates a latent space switch 5420 similar to latent space switch 5020 of FIG. 50 but with a controller 5480 replacing transit memory device 4850(7).

FIG. 55 tabulates data-transfer timing of a single-rotator latent space switch of the type illustrated in FIG. 48, FIG. 50, and FIG. 52, with an arbitrary number of ports and an arbitrary value of the order of transposed connections.

Referring to FIG. 48, ingress port 4840(*j*) connects to outlet $|j+t_1|$ during a first part of a time slot $t_1$, $0 \leq t_1 < N$. With static ordinary connections from the ascending rotator 4825 to the transit memory devices, outlet $|j+t_1|$ connects to a transit memory device 4850$|j+t_1|$. With static transposed connections of order L (L=7, N=8) from the transit memory devices 4850 to the ascending rotator 4825, a transit memory device 4850$|j+t_1|$ connects to inlet $|L-j-t_1|$ of the ascending rotator 4825. In order to reach egress port 4860(*k*), transit data in transit memory device 4850$|j+t_1|$ is transferred from inlet $|L-j-t_1|$ to outlet k during a time slot $t_2 = |k-(L-j-t_1)| = |(j+k-L+t_1)|$. Thus, the transit delay is $t_2 - t_1 = |j+k-L|$.

Referring to FIG. 50 and FIG. 52, ingress port 4840(*j*) connects to outlet $|j+t_1|$ during a first part of a time slot $t_1$, $0 \leq t_1 < N$. With static transposed connections of order L (L=7 in latent space switch 5000 and L=4 in latent space switch 5200) from the ascending rotator 4825 to the transit memory devices, outlet $|j+t_1|$ connects to a transit memory device 4850$|L-j-t_1|$. With static ordinary connections from the transit memory devices 4850 to the ascending rotator 4825, a transit memory device 4850$|L-j-t_1|$ connects to inlet $|L-j-t_1|$ of the ascending rotator 4825. In order to reach egress port 4860(k), transit data in transit memory device 4850$|L-j-t_1|$ is transferred from inlet $|L-j-t_1|$ to outlet k during a time slot $t_2=|k-(L-j-t_1)|=|j+k-L+t_1|$. Thus, the transit delay is $t_2-t_1=|j+k-L|$, as in the configuration of FIG. 48.

To render the delay from an ingress port 4840(j) to an egress port 4860(k), $0 \leq j < N$, $0 \leq k < N$, independent of the transposition order L, the outlets 4826 of the ascending rotator 4825 may have transposed connections of the same order L to the egress ports 4860. Thus, in order to reach egress port 4860(k), transit data is transferred from inlet 4842$|L-j-t_1|$ to outlet 4826$|L-k|$, hence to egress port 4860(k), during a time slot $t_2=|(L-k)-(L-(j+t_1))|=|j-k+t_1|$, and the transit delay is $t_2-t_1=|j-k|$, which is independent of the transposition order L.

FIG. 56 tabulates data-transfer timing of a single-rotator latent space switch of the type illustrated in FIG. 48, FIG. 50, and FIG. 52, with an arbitrary number of ports and an arbitrary value of the order of transposed connections, and with transposed connections (not illustrated) from the outlets 4826 of the single rotator 4825 to the output ports 4860 of the single-rotator latent space switch. In the latent space switches 4820, 5020, 5220, egress port 4860(k) connects to outlet 4826(k), $0 \leq k < N$. With transposed connections (not illustrated), of the same respective order L, from the rotator outlets 4826 to egress ports 4860, egress port 4860(k) connects to outlet 4826$|L-j|$. This results in a transit delay, for a given data stream, which depends only on the indices of an ingress port 4840 and an egress port 4860 as indicated in FIG. 56.

Scheduling Cycle Versus Rotation Cycle

During a rotation cycle of N time slots, rotator 4825 connects each inlet 4824(j) to each outlet 4826(k), $0 \leq j < N$, $0 \leq k < N$. In the exemplary configuration of FIG. 53, N=8 and the master controller 5380 has a channel to inlet port 4842(0) of rotator 4825 and a channel from outlet port 4860(7) of rotator 4825. An ingress port 4840(j), $0 \leq j < 8$, connects to the master controller 5380 once per rotation cycle, during every relative time slot $|7-j|$ of a rotation cycle, i.e., during absolute time slots $(7-j)+8\times\chi$, $0 \leq \chi < \infty$. The master controller 5380 connects to an egress port 4860(k), $0 \leq k < N$, once per rotation cycle, during every relative time slot k, i.e., during absolute time slots $(k+8\times\chi)$, $0 \leq \chi < \infty$. The master controller 5380 receives control signals from ingress port 4840(j) during time slots $(7-j)+8\times\chi$ and transmits control signal to egress port k during time slots $(k+8\times\chi)$, $0 \leq \chi < \infty$. Preferably, each egress port is integrated with an ingress port so that master controller 5380 may send control data, including data transfer schedules, to a specific ingress port through an egress port integrated with the specific ingress port.

Master controller 5380 receives control signals from the ingress ports 4840 and schedules transfer of data from ingress ports 4840(j) to egress ports 4860(k), $0 \leq j < N$, $0 \leq k < N$, over a predefined scheduling time frame. The scheduling time frame is preferably selected to cover an integer number, exceeding zero, of rotation-cycle periods. However, the scheduling cycle may have any number of time slots, greater than or equal to N, that need not be an integer multiple of N.

Figure 57:
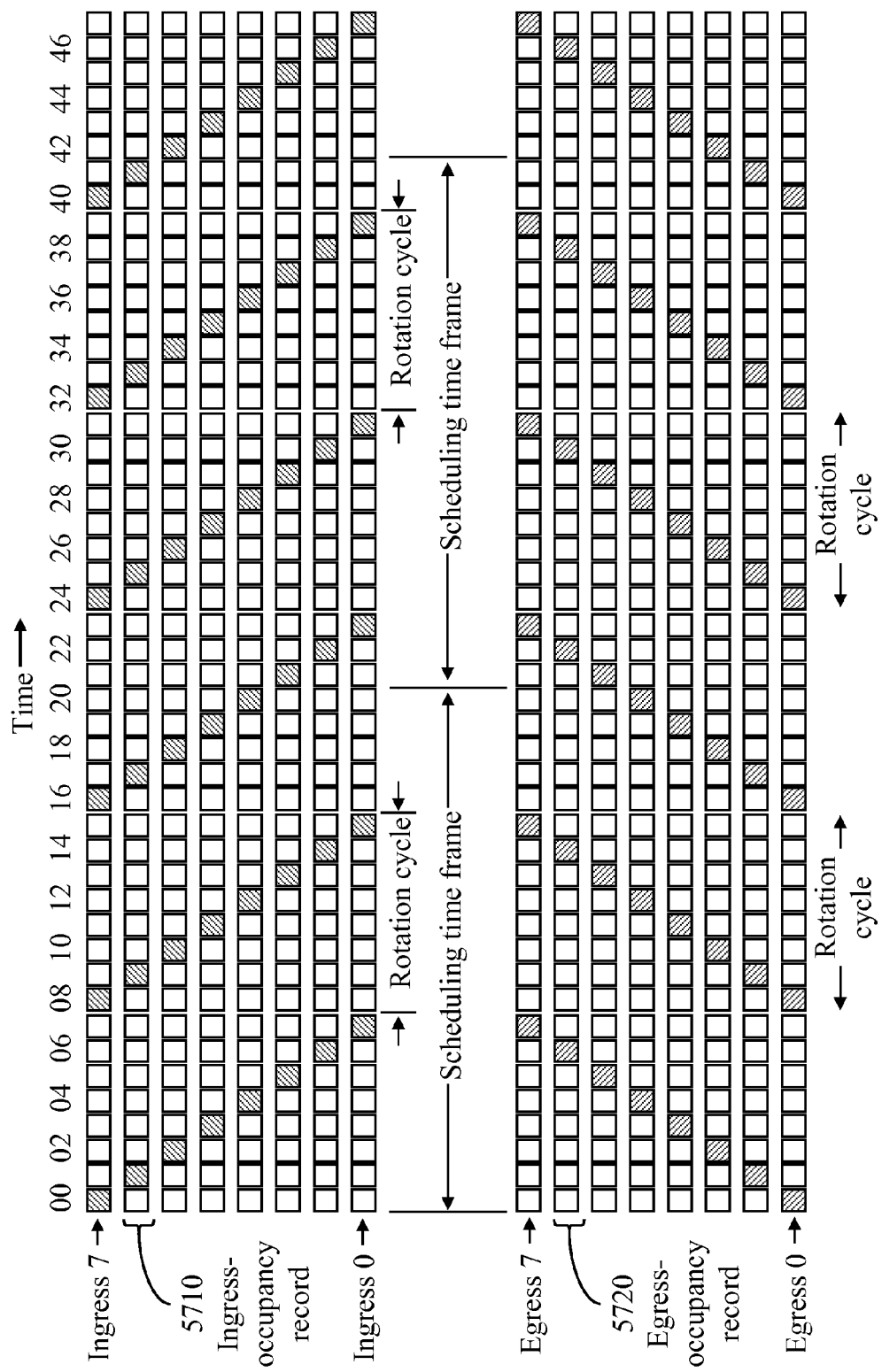
FIG. 57 illustrates occupancy records, over a scheduling time frame, used for scheduling data transfer in the latent space switch of FIG. 53 in accordance with an embodiment of the present invention.

The transfer of payload data from an ingress port to an egress port is subject to contention, hence the need for scheduling. FIG. 57 illustrates an exemplary scheduling frame of 21 time slots. The master controller maintains an ingress occupancy record (or a vacancy record) 5710 for each ingress port 4840 and an egress occupancy record (or vacancy record) 5720 for each egress port 4860. As indicated in FIG. 55, a data segment transferred from an ingress port 4840(j) at time $t_1$ relative to a rotation cycle is transferred to an egress port 4860(k) during a time slot $t_2$, relative to a rotation cycle, where $t_2=\{j+k-L+t_1\}_{modulo\ N}$, where L=7 in the exemplary configuration of FIG. 48. Thus, to establish a connection from ingress port 4840(j) to egress port 4860(k), the master controller examines the occupancy state of ingress port 4840(j) during time slot $t_1$ and the occupancy state egress port 4860(k) during time slot $t_2$.

Preferably, the exchange of control data between the master controller 5380 and controllers of the ingress ports 4840 and egress ports 4860 take place during dedicated time slots. Each ingress port 4840(j) is preferably integrated with a corresponding egress port, such as egress port 4860(j), in order to simplify exchange of control data.

As illustrated, ingress port 4840(0) connects to the master controller 5380 during time slots $\{7, 15, 23, 31, \ldots\}$, ingress port 4840(1) connects to the master controller during time slots $\{6, 14, 22, 30, \ldots\}$, and ingress port 4840(7) connects to the master controller during time slots $\{0, 8, 16, 24, \ldots\}$. The master controller 5380 connects to egress port 4860(0) during time slots $\{0, 8, 16, 24, \ldots\}$, connects to egress port 4860(1) during time slots $\{1, 9, 17, 25, \ldots\}$, and connects to egress port 4860(7) during time slots $\{7, 15, 23, 30, \ldots\}$.

Figure 58:
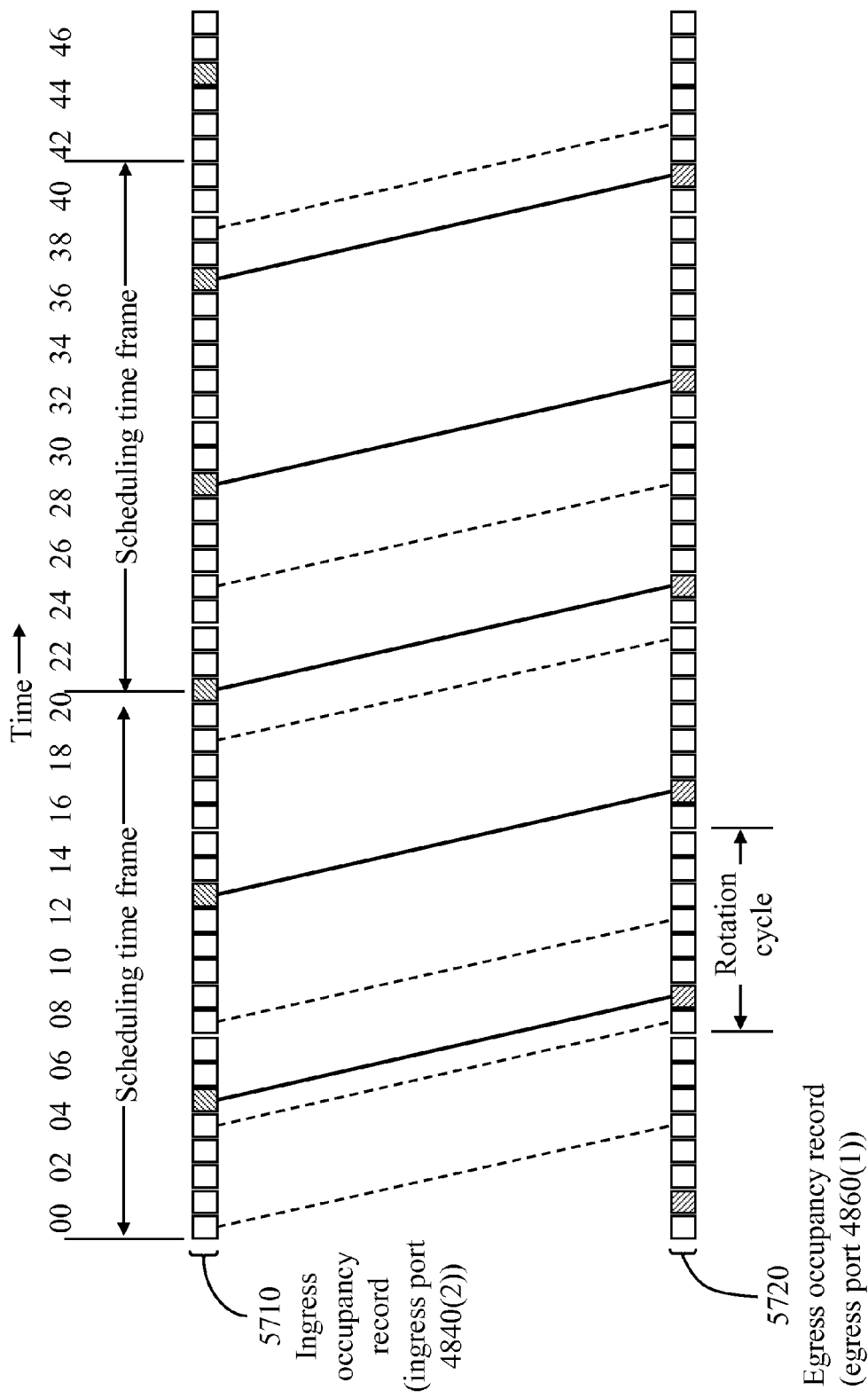
FIG. 58 illustrates a time-slot-matching process for scheduling a connection from an ingress port to an egress port in the latent space switch of FIG. 53 in accordance with an embodiment of the present invention.

FIG. 58 illustrates an ingress occupancy record 5710 of ingress port 4840(2) and egress occupancy record 5720 of egress port 4860(1) of latent space switch 5300 of FIG. 53. Each occupancy record has a number of entries equal to the number of time slots per scheduling time frame. A data segment received at an ingress port 4840(j) at time $t_1$ is delivered to an egress port 4860(k) during a time slot $t_2=t_1+(j+k-L)_{modulo\ N}$, where N is the number of ingress ports (or egress ports) and L is the transposition index as described earlier. In the configuration of FIG. 53, N=8 and L=7. A data segment received during time slot $t_1$ is delivered to egress 4860(1) during time slot $t_2=t_1+4$. Corresponding values of $t_1$ and $t_2$ are indicated in FIG. 58. A path from ingress port 4840(2) to egress port 4860(1) is available for a new connection request when ingress port 4840(2) is free (i.e., not in use and not reserved) during a time slot $t_1$ and egress port 4860(1) is free during time slot=$t_1+4$. To establish a connection, requiring a number $\sigma>0$ of time slots per scheduling frame, any ingress port 4840 to any egress port 4860, a number $\sigma$ of available paths need be reserved. When a path is reserved, corresponding entries in an ingress occupancy record 5710 and an egress occupancy record are marked as busy. When the path is released, the corresponding entries are marked as available.

Figure 59:
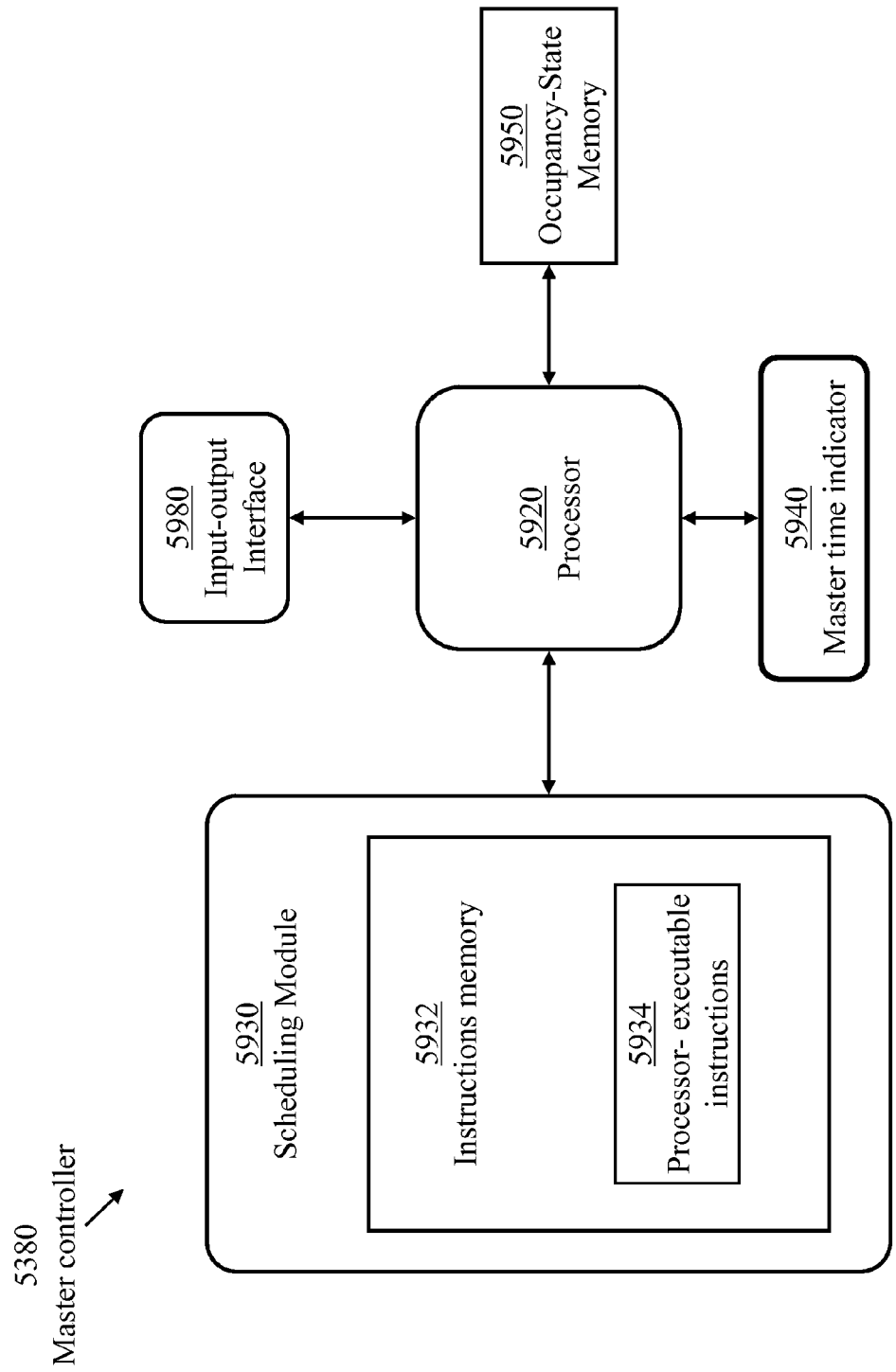
FIG. 59 details a master controller of the latent space switch of FIG. 53 in accordance with an embodiment of the present invention.

FIG. 59 illustrates a master controller 5380 of a latent space switch 5320 (FIG. 53). The master controller 5380 has a processor 5920 and a scheduling module 5930 which includes a memory device 5932 storing processor executable instructions 5934 which causes the processor to implement the time-locking and scheduling functions described above. Processor 5920 communicates with input and output ports of the latent space switch through an input-output interface 5980. Upon receiving a time indication from an edge controller of an edge node 120, processor 5920 communicates a corresponding reading of the master time indicator 5940 to the edge node. The edge controller then determines a reference time for an outbound port of the edge node leading to the master controller of the latent space switch 5320.

In view of the description above, it will be understood that modifications and variations of the described and illustrated embodiments may be made within the scope of the inventive concepts. For example, while each of the exemplary single-rotator circulating switches employs an ascending rotator, the ascending single rotator may be replaced by a descending rotator having the same number of inlets and the same number of outlets. Likewise, any of the exemplary single-rotator latent space switches may employ an ascending rotator or a descending rotator.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A time-coherent network comprising:
   a plurality of primary switch units arranged in a first matrix having μ columns and μ rows, each primary switch unit having a primary controller, m bufferless inlet ports and m outlet ports, μ>1, m>1; and
   a plurality of secondary switch units arranged in a second matrix having ν columns and ν rows, each secondary switch unit having a secondary controller, n bufferless inlet ports and n outlet ports, ν≧μ, 1<n≦m;
   a plurality of edge nodes, each edge node having:
      an edge controller;
      a primary upstream channel carrying payload and control signals to a primary switch unit in each column of said first matrix;
      a secondary upstream channel carrying payload and control signals to a secondary switch unit in each column of said second matrix;
      a primary downstream channel carrying payload and control signals from a primary switch unit in each row of said first matrix;
      a secondary downstream channel carrying payload and control signals from a secondary switch unit in each row of said second matrix;
   wherein μ, m, ν, and n are selected so that μ×m=ν×n.

2. The time-coherent network of claim 1 wherein said primary upstream channel is a time-locked channel and said secondary upstream channel is a time-locked channel.

3. The network of claim 1 wherein:
   primary downstream channels directed to a same edge node originate from primary switch units of a same column of said first matrix; and
   secondary downstream channels directed to said same edge node originate from secondary switch units of a same column of said second matrix.

4. The network of claim 1 wherein said each edge node is a single-rotator circulating switch comprising:
   a single rotator having input ports and output ports;
   said edge controller; and
   a plurality of switch elements connecting to said single rotator where an input port and an output port to which a switch element connects are transposed.

5. The network of claim 1 wherein said each primary switch unit in said first matrix is a single-rotator latent space switch comprising:
   a single rotator having input ports and output ports;
   said primary controller; and
   a plurality of transit-memory devices connecting to said single rotator where an input port and an output port to which a transit-memory device connects are transposed.

6. The network of claim 1 wherein at least one secondary switch unit in said second matrix is a photonic switch.

7. The time-coherent network of claim 1 wherein:
   said primary upstream channel carries control signals, generated by said edge controller, during a first number of dedicated time slots in a cyclical time-slotted frame; and
   said secondary upstream channel carries control signals, generated by said edge controller, during a second number of dedicated time slots in said cyclical time-slotted frame.

8. The time-coherent network of claim 1 wherein:
   said primary downstream channel carries control signals generated by a respective primary controller during a third number of dedicated time slots in a cyclical time-slotted frame; and
   said secondary downstream channel carries control signals generated by a respective secondary controller during a fourth number of dedicated time slots in said cyclical time-slotted frame.

9. The network of claim 1 wherein a first set of primary switch units connecting to primary upstream channels from a same edge node and a second set of primary switch units connecting to primary downstream channels to said same edge node have only one primary switch unit in common in said first matrix.

10. The network of claim 1 wherein a first set of secondary switch units connecting to secondary upstream channels from a same edge node and a second set of secondary switch units connecting to secondary downstream channels to said same edge node have only one secondary switch unit in common in said second matrix.

11. The network of claim 1 wherein:
   primary switch units connecting to primary upstream channels from a same edge node belong to different rows of said first matrix; and
   primary switch units connecting to primary downstream channels to said same edge node belong to a same column of said first matrix.

12. The network of claim 1 wherein:
   secondary switch units connecting to secondary upstream channels from a same edge node belong to different rows of said second matrix; and
   secondary switch units connecting to secondary downstream channels to said same edge node belong to a same column of said second matrix.

13. A time-coherent network comprising:
   a plurality of electronic switch units arranged in a first square matrix, each electronic switch unit having a primary controller and a first number of bufferless dual ports;
   a plurality of photonic switch units arranged in a second square matrix, each photonic switch unit having a secondary controller and a second number of bufferless dual ports;
   and
   a plurality of edge nodes, each edge node having:
      a plurality of time-locked primary upstream channels to selected electronic switch units of different columns of said first matrix;
      a plurality of time-locked secondary upstream channels to selected photonic switch units of different columns of said second matrix;
      a plurality of primary downstream channels from designated electronic switch units of a same column of said first matrix;

a plurality of secondary downstream channels from designated photonic switch units of a same column of said second matrix; and
an edge controller configured to generate primary upstream control signals bound for said selected electronic switch units and secondary upstream control signals bound for said selected photonic switch units.

14. The time-coherent network of claim 13 wherein said edge controller is further configured to:
transmit said primary upstream control signals during at least one dedicated upstream control time slot in a cyclical time frame; and
transmit said secondary upstream control signals during at least one dedicated upstream control time slot in said cyclical time frame.

15. The time-coherent network of claim 13 wherein said primary controller is further configured to:
generate control signals to each subtending edge node having a downstream channel from said each electronic switch unit; and
transmit said control signals during at least one dedicated downstream control time slot in a cyclical time frame.

16. The time-coherent network of claim 13 wherein said secondary controller is configured to:
generate control signals to each subtending edge node having a downstream channel from said each photonic switch unit; and
transmit said control signals during at least one dedicated downstream control time slot in a cyclical time frame.

17. A time-coherent network comprising:
a plurality of electronic switch units arranged in a first square matrix, each electronic switch unit having a primary controller coupled to a respective primary time indicator;
a plurality of photonic switch units arranged in a second square matrix, having a number of columns equal to an integer multiple of a number of columns of said first matrix, each photonic switch unit having a secondary controller coupled to a respective secondary time indicator;
and
a plurality of edge nodes, each edge node connecting to respective data sources and data sinks and having:
an edge controller;
an upstream channel to a selected electronic switch unit in each column of said first matrix;
an upstream channel to a selected photonic switch unit in each column of said second matrix;
a downstream channel from each electronic switch unit of a selected column of said first matrix; and
a downstream channel from each photonic switch unit of a selected column of said second matrix.

18. The time-coherent network of claim 17 wherein said primary controller is accessible through a switch fabric of said each electronic switch unit, and said secondary controller is accessible through a switch fabric of said each photonic switch unit.

19. The time-coherent network of claim 17 wherein:
said respective primary time indicator of said each electronic switch unit is independent of all primary time indicators of all other electronic switch units and of all secondary time indicators of all photonic switch units; and
said respective secondary time indicator of said each photonic switch unit is independent of all other secondary time indicators of all other photonic switch units.

20. The time-coherent network of claim 17 wherein said primary controller is configured to exchange time indications with edge controllers of specific edge nodes connecting to said each electronic switch unit to enable said specific edge nodes to individually time lock to said each electronic switch unit.

21. The time-coherent network of claim 17 wherein said secondary controller is configured to exchange time indications with edge controllers of specific edge nodes connecting to said each photonic switch unit to enable said specific edge nodes to individually time lock to said each photonic switch unit.

22. The time-coherent network of claim 17 wherein said edge controller is configured to:
adjust transmission time of data sent to said selected electronic switch unit according to a primary time indicator of said selected electronic switch unit; and
adjust transmission time of data sent to said selected photonic switch unit according to a secondary time indicator of said selected photonic switch unit.

23. The time-coherent network of claim 17 wherein said edge controller is configured to:
transmit control data to said selected electronic switch unit during respective dedicated upstream control time slots within a cyclical time frame organized into a predefined number of time slots; and
transmit control data to said selected photonic switch unit during respective dedicated upstream control time slots within said cyclical time frame.

24. The time-coherent network of claim 17 wherein:
said primary controller is configured to transmit control data to edge nodes connecting to said each electronic switch unit during respective dedicated downstream control time slots within a cyclical time frame organized into a predefined number of time slots; and
said secondary controller is configured to transmit control data to edge nodes connecting to said each photonic switch unit during respective dedicated downstream control time slots within said cyclical time frame.

25. The time-coherent network of claim 17 wherein each of said primary controller and said secondary controller is configured to:
receive a connection request from a specific edge node;
allocate at least one time slot for said connection request; and
communicate indications of said at least one time slot to said specific edge node.

* * * * *